(12) United States Patent
Kawai et al.

(10) Patent No.: US 10,780,793 B2
(45) Date of Patent: Sep. 22, 2020

(54) POWER STORAGE SYSTEM, TRANSFER MECHANISM, TRANSPORT MECHANISM, VEHICLE, AND AUTOMOBILE

(71) Applicant: Murata Manufacturing Co., Ltd., Nagaokakyo-shi, Kyoto-fu (JP)

(72) Inventors: Toru Kawai, Nagaokakyo (JP); Gaku Kamitani, Nagaokakyo (JP); Masahiro Otsuka, Nagaokakyo (JP); Ryoji Yamato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 262 days.

(21) Appl. No.: 15/926,085

(22) Filed: Mar. 20, 2018

(65) Prior Publication Data

US 2018/0257507 A1    Sep. 13, 2018

Related U.S. Application Data

(63) Continuation of application No. PCT/JP2016/078294, filed on Sep. 26, 2016.

(30) Foreign Application Priority Data

Sep. 29, 2015 (JP) ................................ 2015-190931

(51) Int. Cl.
*H01M 10/06* (2006.01)
*H01M 10/0525* (2010.01)
(Continued)

(52) U.S. Cl.
CPC ........... *B60L 58/15* (2019.02); *B60L 11/1868* (2013.01); *B60L 58/20* (2019.02); *H01M 2/1077* (2013.01);
(Continued)

(58) Field of Classification Search
CPC ... H01M 10/06; H01M 10/0525; H01M 4/525
See application file for complete search history.

(56) References Cited

U.S. PATENT DOCUMENTS

2003/0198866 A1    10/2003 Tanjou et al.
2014/0138591 A1*    5/2014 Yoon ..................... C01B 25/45
                                          252/519.14
2017/0170699 A1    6/2017 Wang et al.

FOREIGN PATENT DOCUMENTS

CN    104319425 A    1/2015
JP    2003308817 A    10/2003
(Continued)

OTHER PUBLICATIONS

International Search Report issued in International Application No. PCT/JP2016/078294, dated Dec. 13, 2016
(Continued)

*Primary Examiner* — Osei K Amponsah
(74) *Attorney, Agent, or Firm* — Arent Fox LLP

(57) ABSTRACT

A power storage system that includes a first power storage pack and a second power storage pack. The second power storage pack is connected in parallel to the first power storage pack. The charge/discharge curve for the second power storage pack has a step passing through the open-circuit voltage of the first power storage pack at a SOC of 50%. The average discharge voltage on the lower SOC side of the start point of the step of the charge/discharge curve for the second power storage pack is −25% or more of the open-circuit voltage of the first power storage pack at a SOC of 50%. The average charge voltage on the higher SOC side of the end point of the step of the charge/discharge curve for the second power storage pack is +25% or less of the open-circuit voltage of the first power storage pack at a SOC of 50%.

20 Claims, 39 Drawing Sheets

(51) Int. Cl.

| | | |
|---|---|---|
| *H01M 4/525* | (2010.01) | |
| *H01M 4/505* | (2010.01) | |
| *H01M 4/58* | (2010.01) | |
| *B60L 58/15* | (2019.01) | |
| *H02J 7/02* | (2016.01) | |
| *H01M 10/44* | (2006.01) | |
| *H01M 4/131* | (2010.01) | |
| *B60L 58/20* | (2019.01) | |
| *H01M 2/10* | (2006.01) | |
| *H01M 4/13* | (2010.01) | |
| *H01M 4/36* | (2006.01) | |
| *H01M 16/00* | (2006.01) | |
| *H02J 7/00* | (2006.01) | |
| *H02J 7/04* | (2006.01) | |
| *B60L 11/18* | (2006.01) | |
| *H01M 10/34* | (2006.01) | |
| *H01M 4/02* | (2006.01) | |

(52) U.S. Cl.
CPC ............ *H01M 4/13* (2013.01); *H01M 4/131* (2013.01); *H01M 4/364* (2013.01); *H01M 4/505* (2013.01); *H01M 4/525* (2013.01); *H01M 4/5825* (2013.01); *H01M 10/44* (2013.01); *H01M 10/441* (2013.01); *H01M 16/00* (2013.01); *H02J 7/0071* (2020.01); *H02J 7/0086* (2013.01); *H02J 7/02* (2013.01); *H02J 7/045* (2013.01); *B60L 2210/10* (2013.01); *H01M 10/0525* (2013.01); *H01M 10/06* (2013.01); *H01M 10/345* (2013.01); *H01M 2004/028* (2013.01); *H01M 2220/20* (2013.01)

(56) References Cited

FOREIGN PATENT DOCUMENTS

| | | |
|---|---|---|
| JP | 2006338889 A | 12/2006 |
| JP | 2007131134 A | 5/2007 |
| JP | 2009022099 A | 1/2009 |
| JP | 2012113866 A | 6/2012 |
| WO | 2013016426 A1 | 1/2013 |
| WO | 2014038099 A1 | 3/2014 |

OTHER PUBLICATIONS

Written Opinion of the International Searching Authority issued in International Application No. PCT/JP2016/078294, dated Dec. 13, 2016.

\* cited by examiner

POWER STORAGE SYSTEM, TRANSFER MECHANISM, TRANSPORT MECHANISM, VEHICLE, AND AUTOMOBILE

CROSS REFERENCE TO RELATED APPLICATIONS

The present application is a continuation of International application No. PCT/JP2016/078294, filed Sep. 26, 2016, which claims priority to Japanese Patent Application No. 2015-190931, filed Sep. 29, 2015, the entire contents of each of which are incorporated herein by reference.

FIELD OF THE INVENTION

The present invention relates to a power storage system, a transfer mechanism, a transport mechanism, a vehicle, and an automobile.

BACKGROUND OF THE INVENTION

Lead storage batteries are widely used in various applications, such as in-car applications for driving automobiles or for use as power supply to various types of electric loads, industrial applications for use as backup power supplies for commercial power supplies, and electric vehicle applications for use as main power supplies for golf carts, forklifts, and the like. Lead storage batteries are commonly used, such as six lead storage batteries connected in series for 12 V, and batteries configured for 24 V, 36V, 48V, 60V, 72V, and the like as multiples of 12 V.

Lead storage batteries are low in price as compared with storage batteries such as lithium ion storage batteries and nickel-metal-hydride storage batteries, but inferior in charge/discharge cycle characteristics as compared with the storage batteries. In particular, lead storage batteries have charge/discharge cycle characteristics degraded significantly on reaching an overcharge state or an overdischarge state. For example, when a lead storage battery reaches an overcharge state, gas generation and a decrease in amount of electrolytic solution, corrosion of a current collector, and loss of an active material due to electrolysis of sulfuric acid as an electrolytic solution will be caused, thereby degrading charge/discharge cycle characteristics. Alternatively, when a lead storage battery reaches an overdischarge state, positive and negative electrode surfaces covered with a lead sulfate which is a reaction product and an insulator will inhibit smooth charge/discharge reactions, thus degrading charge/discharge cycle characteristics.

Therefore, in particular, when only a lead storage battery is used as a storage battery for an in-car application or an electric vehicle, there is concern about early deterioration of the lead storage battery. When this concern is addressed by simply replacing the lead storage battery with a storage battery which is superior in charge/discharge cycle characteristics to lead storage batteries such as lithium ion storage batteries and nickel-metal-hydride storage batteries, an increase in the price of the storage battery will be caused.

Therefore, Patent Document 1 proposes a power storage system where an inexpensive lead storage battery and a high-performance storage battery which is superior in charge/discharge cycle characteristics to the lead storage battery are connected in parallel.

Patent Document 1: Japanese Patent Application Laid-Open No. 2007-131134

SUMMARY OF THE INVENTION

In the above regard, not only the lead storage batteries described previously, but also power storage devices commonly undergo early deterioration on reaching an overcharge state or an overdischarge state. Therefore, it is desirable to use the power storage devices to the extent that a SOC (State of Charge: the proportion of a charging capacity to the amount of charge in a full charge state) that represents a state of charging a storage battery reaches no overcharge/overdischarge state (SOC range of use).

When the lead storage battery and the high-performance storage battery such as a lithium ion storage battery differ in open-circuit voltage, directly connecting both of power storage batteries in parallel leads to concern about electric current flowing into the storage battery on the lower open-circuit voltage side from the storage battery on the higher open-circuit voltage side, or on the other hand, reaching an overcharge/overdischarge state with both of the storage batteries outside the SOC range of use.

Therefore, in the power storage system described in Patent Document 1 mentioned above, a DCDC converter is provided between the lead storage battery and the high-performance storage battery. For this reason, the terminal voltage of the storage battery on the higher open-circuit voltage side is adjusted by the DCDC converter. Therefore, current is prevented from flowing into the storage battery on the lower open-circuit voltage side from the storage battery on the higher open-circuit voltage side. In addition, both of the storage batteries are prevented from reaching an overcharge/overdischarge state.

However, the DCDC converter is high in price and large in size, and the power storage system described in Patent Document 1, which is provided with the DCDC converter, is thus high in price and large in size. As just described, the power storage system with the multiple types of storage batteries connected in parallel has the problem of high price, and the problem of large size.

A main object of the present invention is to achieve an increase in the life-span of a power storage system, a reduction in the price thereof, and a reduction in the size thereof.

A first power storage system according to the present invention includes a first power storage pack and a second power storage pack. The second power storage pack is connected in parallel to the first power storage pack. The charge/discharge curve for the second power storage pack has a step passing through the open-circuit voltage of the first power storage pack at a SOC of 50%. The average discharge voltage on the lower SOC side of the start point of the step of the charge/discharge curve for the second power storage pack is −25% or more of the open-circuit voltage of the first power storage pack at a SOC of 50%. The average charge voltage on the higher SOC side of the end point of the step of the charge/discharge curve for the second power storage pack is +25% or less of the open-circuit voltage of the first power storage pack at a SOC of 50%.

In the first power storage system according to the present invention, the charge/discharge curve for the second power storage pack has a step passing through the open-circuit voltage of the first power storage pack at a SOC of 50%. For this reason, when the voltage of the first power storage pack corresponds to a SOC around 50%, the voltage of the second power storage pack substantially coincides with the voltage of the first power storage pack at the step of the charge/discharge curve for the second power storage pack. The generation of a large voltage difference is eliminated between the second power storage pack and the first power storage pack. Therefore, there is not always a need to provide a DCDC converter between the second power storage pack and the first power storage pack. Accordingly, it becomes possible to reduce the price of the power storage system and reduce the size thereof.

The voltage region equal to or less than −25% of the open-circuit voltage (OCV) obtained when the power storage pack has a SOC of 50% is regarded as an overdischarge region. Accordingly, in the voltage region equal to or less than −25% of the open-circuit voltage (OCV) obtained when the power storage pack has a SOC of 50%, the power storage pack is significantly deteriorated. In the first power storage system according to the present invention, the average discharge voltage on the lower SOC side of the start point of the step of the charge/discharge curve for the second power storage pack is −25% or more of the open-circuit voltage of the first power storage pack at a SOC of 50%. For this reason, when the second power storage pack is required for large current output, the output from the second power storage pack is also provided in a condition in which the voltage of the first power storage pack is lower than the open-circuit voltage at the SOC 50%. Therefore, the voltage of the first power storage pack can be prevented from being lower than −25% of the open-circuit voltage at the SOC 50%. Consequently, deterioration due to an overdischarge state of the first power storage pack can be prevented, thereby allowing an increase in the life-span of the power storage system. In addition, there is not always a need for a special circuit for preventing an overdischarge state of the first power storage pack, thus allowing a reduction in the price of the power storage system.

The voltage region equal to or more than +25% of the open-circuit voltage (OCV) obtained when the power storage pack has a SOC of 50% is regarded as an overcharge region. Accordingly, in the voltage region equal to or more than +25% of the open-circuit voltage (OCV) obtained when the power storage pack has a SOC of 50%, the power storage pack is significantly deteriorated. In the first power storage system according to the present invention, the average charge voltage on the higher SOC side of the end point of the step of the charge/discharge curve for the second power storage pack is +25% or less of the open-circuit voltage of the first power storage pack at a SOC of 50%. For this reason, when the power storage system is required for large current input, the input to the second power storage pack is also provided in a condition in which the voltage of the first power storage pack is higher than the open-circuit voltage at the SOC 50%. Consequently, the voltage of the first power storage pack can be prevented from being higher than +25% of the open-circuit voltage at the SOC 50%. Therefore, deterioration due to an overcharge state of the first power storage pack can be prevented, thereby allowing an increase in the life-span of the power storage system. In addition, there is no need for a special circuit for preventing an overcharge state of the first power storage pack, thus allowing a reduction in the price of the power storage system.

In the first power storage system according to the present invention, the average discharge voltage on the lower SOC side of the start point of the step of the charge/discharge curve for the second power storage pack is preferably −2% or less of the open-circuit voltage of the first power storage pack at a SOC of 50%. In this case, the frequency of charging/discharging the second power storage pack can be reduced, and deterioration due to charging/discharging the second power storage pack can be prevented, thereby allowing an increase in the life-span of the power storage system. The average charge voltage on the higher SOC side of the end point of the step of the charge/discharge curve for the second power storage pack is preferably +2% or more of the open-circuit voltage of the first power storage pack at a SOC of 50%. In this case, the frequency of charging/discharging the second power storage pack can be reduced, and deterioration due to charging/discharging the second power storage pack can be prevented, thereby allowing an increase in the life-span of the power storage system.

A second power storage system according to the present invention includes a first power storage pack and a second power storage pack. The second power storage pack is connected in parallel to the first power storage pack. The charge/discharge curve for the second power storage pack has a step passing through the open-circuit voltage of the first power storage pack at a SOC of 50%. On the lower SOC side of the start point of the step of the charge/discharge curve for the second power storage pack, the voltage at the peak top obtained on the curve (dQ/dV curve) obtained by differentiating, with respect to voltage, the discharge curve for the second power storage pack is −25% or more of the open-circuit voltage of the first power storage pack at a SOC of 50%. On the higher SOC side of the end point of the step of the charge/discharge curve for the second power storage pack, the voltage at the peak top obtained on the curve (dQ/dV curve) obtained by differentiating, with respect to voltage, the charge curve for the second power storage pack is +25% or less of the open-circuit voltage of the first power storage pack at a SOC of 50%.

In the second power storage system according to the present invention, the charge/discharge curve for the second power storage pack has a step passing through the open-circuit voltage the first power storage pack of at a SOC of 50%. For this reason, when the voltage of the first power storage pack corresponds to a SOC around 50%, the voltage of the second power storage pack substantially coincides with the voltage of the first power storage pack at the step of the charge/discharge curve for the second power storage pack. The generation of a large voltage difference is eliminated between the second power storage pack and the first power storage pack. Therefore, there is not always a need to provide a DCDC converter between the second power storage pack and the first power storage pack. Accordingly, it becomes possible to reduce the price of the power storage system and reduce the size thereof.

In the second power storage system according to the present invention, on the lower SOC side of the start point of the step of the charge/discharge curve for the second power storage pack, the voltage at the peak top obtained on the curve (dQ/dV curve) obtained by differentiating, with respect to voltage, the discharge curve for the second power storage pack is −25% or more of the open-circuit voltage of the first power storage pack at a SOC of 50%. For this reason, when the second power storage pack is required for large current output, the output from the second power storage pack is also provided in a condition in which the voltage of the first power storage pack is lower than the open-circuit voltage at the SOC 50%. Therefore, the voltage of the first power storage pack can be prevented from being lower than −25% of the open-circuit voltage at the SOC 50%. Consequently, deterioration due to an overdischarge state of the first power storage pack 11 can be prevented, thereby allowing an increase in the life-span of the power storage system. In addition, there is not always a need for a special circuit for preventing an overdischarge state of the first power storage pack, thus allowing a reduction in the price of the power storage system.

In the second power storage system according to the present invention, on the higher SOC side of the end point of the step of the charge/discharge curve for the second power storage pack, the voltage at the peak top obtained on the curve (dQ/dV curve) obtained by differentiating, with respect to voltage, the charge curve for the second power storage pack is +25% or less of the open-circuit voltage of the first power storage pack at a SOC of 50%. For this reason, when the power storage system is required for large current input, the input to the second power storage pack is also provided in a condition in which the voltage of the first power storage pack is higher than the open-circuit voltage at the SOC 50%. Consequently, the voltage of the first power storage pack can be prevented from being higher than +25% of the open-circuit voltage at the SOC 50%. Therefore, deterioration due to an overcharge state of the first power storage pack can be prevented, thereby allowing an increase in the life-span of the power storage system. In addition, there is no need for a special circuit for preventing an overcharge state of the first power storage pack, thus allowing a reduction in the price of the power storage system.

In the second power storage system according to the present invention, on the lower SOC side of the start point of the step of the charge/discharge curve for the second power storage pack, the voltage at the peak top obtained on the curve (dQ/dV curve) obtained by differentiating, with respect to voltage, the discharge curve for the second power storage pack is preferably −2% or less of the open-circuit voltage of the first power storage pack at a SOC of 50%. In this case, the frequency of charging/discharging the second power storage pack can be reduced, and deterioration due to charging/discharging the second power storage pack can be prevented, thereby allowing an increase in the life-span of the power storage system. On the higher SOC side of the end point of the step of the charge/discharge curve for the second power storage pack, the voltage at the peak top obtained on the curve (dQ/dV curve) obtained by differentiating, with respect to voltage, the charge curve for the second power storage pack is preferably +2% or more of the open-circuit voltage of the first power storage pack at a SOC of 50%. In this case, the frequency of charging/discharging the second power storage pack can be reduced, and deterioration due to charging/discharging the second power storage pack can be prevented, thereby allowing an increase in the life-span of the power storage system.

In each of the first and second power storage systems according to the present invention, the first power storage pack may be a lead storage battery pack.

In the first and second power storage systems according to the present invention, the second power storage pack may be a lithium ion storage battery pack or a nickel-metal-hydride storage battery pack.

In the first and second power storage systems according to the present invention, the second power storage pack may be a lithium ion storage battery pack including a lithium ion storage battery. In such a case, the lithium ion storage battery may have a positive electrode including at least one selected from the group consisting of $Li[Ni_xMn_{(2-x)}]O_4$ (0.05≤x≤0.45), $Li[Co_xMn_{(2-x)}]O_4$ (0.1≤x≤1), $Li[Fe_xMn_{(2-x)}]O_4$ (0.05≤x≤0.45), $LiFe_aMn_bCo_cNi_dPO_4$ (0≤a≤1, 0≤b≤1, 0≤c≤1, 0≤d≤1, a+b+c+d=1), and $Li_3V_2(PO_4)_3$ as a positive electrode active material. In this case, the charge/discharge curve of the second power storage pack can be provided with a step.

In the first and second power storage systems according to the present invention, the lithium ion storage battery may have a positive electrode including multiple kinds of positive electrode active material. In this case, the charge/discharge curve of the second power storage pack can be provided with a step.

In the first and second power storage systems according to the present invention, the second power storage pack may be a lithium ion storage battery pack including a lithium ion storage battery, and the lithium ion storage battery may have a negative electrode including multiple kinds of negative electrode active material. In this case, the charge/discharge curve of the second power storage pack can be provided with a step.

In the first and second power storage systems according to the present invention, the second power storage pack may be composed of a plurality of power storage modules connected in parallel, which is composed of a plurality of power storage devices connected in series, and the plurality of power storage modules may include power storage modules that differ from each other in number of connection stages. In this case, the charge/discharge curve of the second power storage pack can be provided with a step.

In the first and second power storage systems according to the present invention, the second power storage pack may include multiple types of power storage modules that have different types of power storage devices. In this case, the charge/discharge curve of the second power storage pack can be provided with a step.

In each of the first and second power storage systems according to the present invention, the ratio preferably falls within the range of 10:90 to 90:10 between the capacity on the lower SOC side of the start point of the step of the charge/discharge curve for the second power storage pack and the capacity on the higher SOC side of the end point of the step of the charge/discharge curve for the second power storage pack in the second power storage pack.

In each of the first and second power storage systems according to the present invention, the first power storage pack preferably has a higher capacity than the second power storage pack.

In each of the first and second power storage systems according to the present invention, the ratio between the capacity of the first power storage pack and the capacity of the second power storage pack preferably falls within the range of 55:45 to 99:1.

A transfer mechanism according to the present invention includes the first or second power storage system according to the present invention.

A transport mechanism according to the present invention includes the first or second power storage system according to the present invention.

A vehicle according to the present invention includes the first or second power storage system according to the present invention.

An automobile according to the present invention includes the first or second power storage system according to the present invention.

According to the present invention, an increase in the life-span of a power storage system, a reduction in the price thereof, and a reduction in the size thereof can be achieved.

DETAILED DESCRIPTION OF THE INVENTION

An example of a preferred embodiment of the present invention will be described below. However, the following embodiment is considered by way of example only. The present invention is not limited to the following embodiment in any way. In addition, members that have substantially the same functions shall be denoted by the same reference symbols in the respective drawings referred to in the embodiment and the like.

Figure 1:
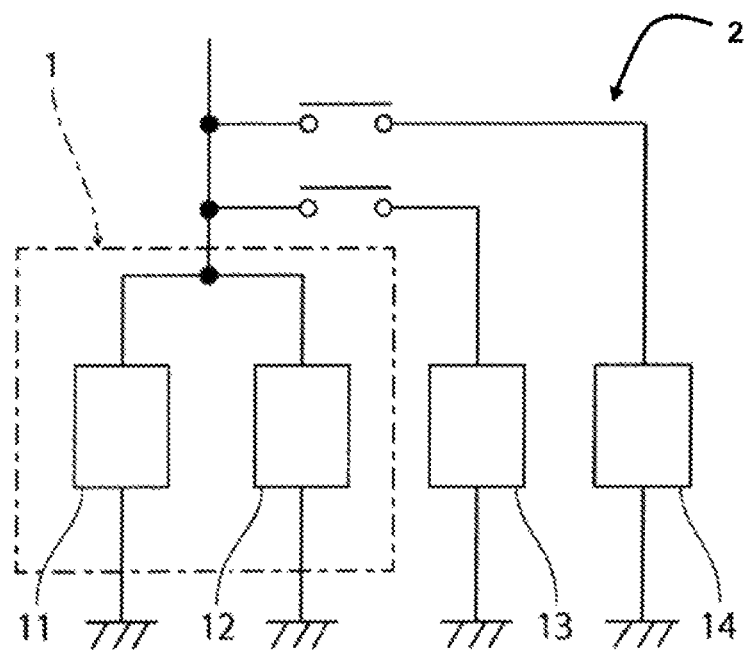
FIG. 1 is a schematic circuit diagram of a vehicle according to an embodiment of the present invention.

FIG. 1 is a schematic circuit diagram of a vehicle according to the present embodiment.

The vehicle 2 shown in FIG. 1 includes a power storage system 1. An example of using the power storage system 1 for the vehicle 2 will be described in the present embodiment, but the application of the power storage system 1 is not limited thereto. The power storage system 1 is used in a preferred manner, for example, for a power supply of a vehicle such as an automobile, a golf cart, a forklift, a rail vehicle, or an airplane, a transfer mechanism such as a ship, or a transport mechanism. For example, the power storage system 1 is also used in a preferred manner as a power supply for an idling stop mechanism of an automobile that has the idling stop mechanism. The power storage system 1 is preferred for, in particular, electric vehicles such as a golf cart, a forklift, an electric vehicle chair, a walker for an aged person, an electric scooter, an electric bicycle, an electric cart, an electric car, a Low Speed Vehicle (LSV), and an automated guided vehicle (AGV), which include a lead storage battery as a main power supply, and automobiles that have an idling stop function. It is to be noted that while FIG. 1 is a schematic conceptual diagram of a vehicle, the system in FIG. 1 is also used as well for a transfer mechanism and a transport mechanism.

In addition, the power storage system 1 is also preferred in power storage applications for power generators such as wind power generators, solar power generators, fuel cells, diesel generators, gasoline generators, and gas power generators.

The power storage system 1 includes a first power storage pack 11 and a second power storage pack 12.

The first storage pack 11 is not particularly limited, but can be composed of a lead storage battery pack, a lithium ion storage battery pack, a nickel-metal-hydride storage battery pack, or the like. Above all, the first power storage pack 11 is preferably composed of an inexpensive lead storage battery pack.

The second power storage pack 12 is connected in parallel to the first power storage pack 11. Specifically, the first power storage pack 11 and the second power storage pack are connected in parallel without any DCDC converter interposed therebetween.

The second power storage pack 12 can be composed of, for example, a power storage pack such as a lithium ion storage battery pack and a nickel-metal-hydride storage battery pack. In addition, the second power storage pack 12 can be also composed of a capacitor such as a lithium ion capacitor (LIC) or an electric double layer capacitor (EDLC).

It is to be noted that in the present invention the "power storage device" means a storage battery such as a lead storage battery, a lithium ion storage battery, and a nickel-metal-hydride storage battery, and a unit cell such as a capacitor.

In the present invention, the "power storage pack" includes at least one power storage device. Among power storage packs, a pack composed of at least one storage battery is referred to as a "storage battery pack". Accordingly, the lithium ion storage battery pack means a storage battery pack composed of at least one lithium ion storage battery. The lead storage battery pack means a storage battery pack composed of at least one lead storage battery. The nickel-metal-hydride storage battery pack means a storage battery pack composed of at least one nickel-metal-hydride storage battery.

The power storage pack may be composed of one power storage module. The power storage pack may be composed of a plurality of power storage modules connected in parallel. The power storage pack may have a power storage module connected in parallel to at least one of a plurality of power storage modules connected in series.

In the present invention, the "power storage module" means at least one power storage device connected in series. Accordingly, the power storage pack can have a power storage module.

According to the present invention, when a power storage pack has a plurality of power storage devices, the plurality of power storage devices may have the same type of devices, or include multiple types of power storage devices.

Figure 2:
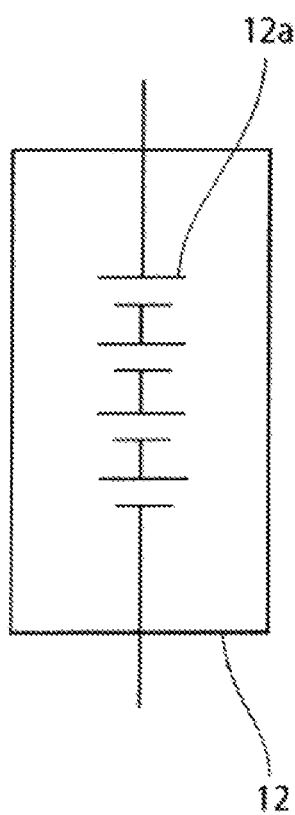
FIG. 2 is a schematic circuit diagram of a second power storage pack according to an embodiment of the present invention.

As shown in FIG. 2, an example of the second power storage pack 12 with a plurality of power storage devices 12a connected in series will be described in the present embodiment. Specifically, an example of the second power storage pack 12 composed of four lithium ion storage batteries 12a connected in series will be described in the present embodiment.

Figure 3:
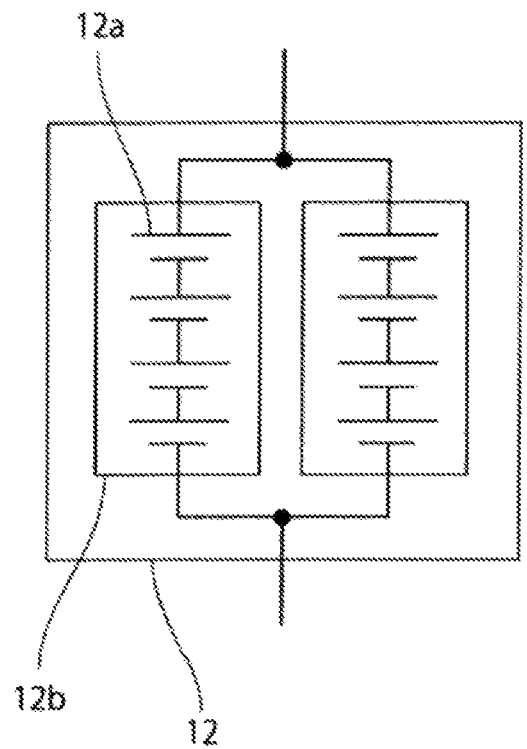
FIG. 3 is a schematic circuit diagram of a second power storage pack according to a first modification example.
Figure 4:
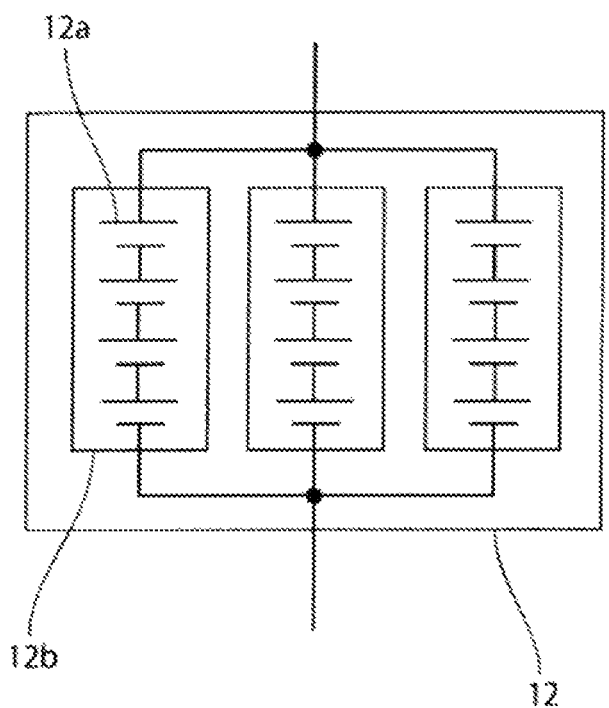
FIG. 4 is a schematic circuit diagram of a second power storage pack according to a second modification example.
Figure 5:
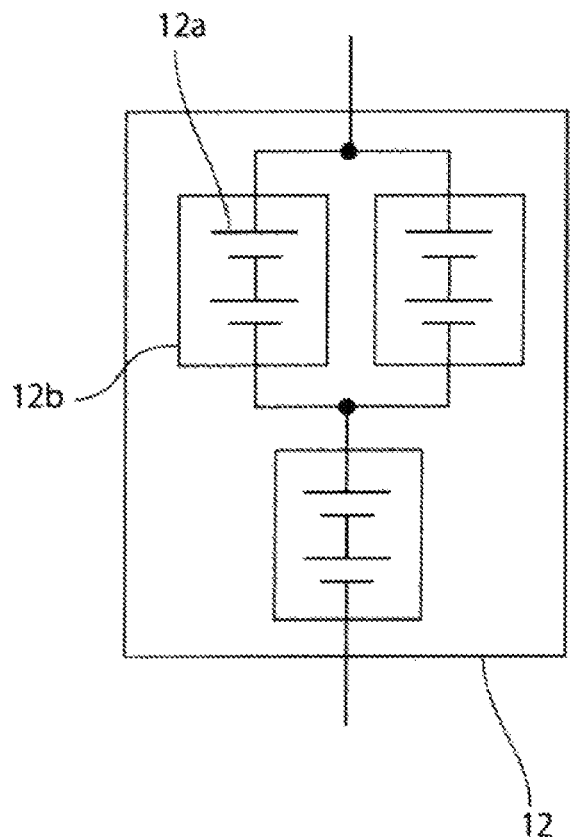
FIG. 5 is a schematic circuit diagram of a second power storage pack according to a third modification example.

According to the present invention, the second power storage pack is not necessarily required to be composed of one power storage module. For example, as shown in FIGS. 3 and 4, a plurality of power storage modules 12b may be connected in parallel in the second power storage pack 12. For example, as shown in FIG. 5, a power storage module may be connected in parallel to at least one of a plurality of power storage modules 12b connected in series in the second power storage pack 12.

It is to be noted that each of the first and second power storage packs 11, 12 may further have a control unit for controlling a battery constituting each of the packs 11, 12.

When the second power storage pack 12 is a lithium ion storage battery pack, examples of a positive electrode active material included in a positive electrode of the lithium ion storage battery include inorganic compounds such as a composite oxide of a transition metal and lithium, a transition metal oxide, and a transition metal sulfide, and organic compounds. Specifically, the examples include composite oxides of transition metals and lithium, such as $LiCoO_2$, $LiNiO_2$, $LiMnO_2$, $LiMn_2O_4$, $Li_{(1+a)}Ni_xMn_yCo_zO_2$ ($0 \le a \le 0.5$, $0 \le x \le 1$, $0 \le y \le 1$, $0 \le z \le 1$, $x+y+z=1$), $Li[Ni_xMn_{(2-x)}]O_4$ ($0 \le x \le 0.5$), $Li[Co_xMn_{(2-x)}]O_4$ ($0 \le x \le 1$), $Li[Fe_xMn_{(2-x)}]O_4$ ($0 \le x \le 1$), $LiNiVO_4$, $LiFePO_4$, $LiMnPO_4$, $LiCoPO_4$, $LiNiPO_4$, $LiFe_aMn_bCo_cNi_dPO_4$ ($0 \le a \le 1$, $0 \le b \le 1$, $0 \le c \le 1$, $0 \le d \le 1$, $a+b+c+d=1$), $Li_3V_2(PO_4)_2$, and $LiVOPO_4$; transition metal oxides such as $MnO_2$, $MnO$, and $V_2O_5$; transition metal sulfides such as FeS and TiS; and organic compounds such as quinone compounds, disulfide compounds, diazine compounds, radialene compounds, rubeanic acid compounds, and organic radical compounds. The above-mentioned compounds with transition metal elements substituted with different types of elements may be used for the inorganic compounds. One of these positive electrode active materials may be used alone, or two or more thereof may be used concurrently.

Examples of a negative electrode active material included in a negative electrode of the lithium ion storage battery include inorganic compounds such as a composite oxide of a transition metal and lithium, a metal oxide, an alloy material, and a transition metal sulfide, carbon materials, organic compounds, and lithium metals. Specifically, the examples include composite oxides of transition metals and lithium, such as $LiMn_2O_4$, $Li_4Ti_5O_2$, $Li_2Ti_3O_7$, $LiMg_{1/2}Ti_{3/2}O_4$, $LiCo_{1/2}Ti_{3/2}O_4$, $LiZn_{1/2}Ti_{3/2}O_4$, $LiFeTiO_4$, $LiCrTiO_4$, $Li_2SrTi_6O_{14}$, and $Li_2BaTi_6O_{14}$; metal oxides such as $TiO_2$, $WO_3$, $MoO_2$, $MnO_2$, $V_2O_5$, $SiO_2$, $SiO$, and $SnO_2$; alloy materials of Si, Sn, or the like; transition metal sulfides such as FeS and TiS; carbon materials such as graphite, non-graphitizable carbon, and graphitizable carbon; and organic compounds such as quinone compounds, disulfide compounds, diazine compounds, radialene compounds, rubeanic acid compounds, and organic radical compounds. The above-mentioned compounds with transition metal elements substituted with different types of elements may be used for the inorganic compounds. One of these negative electrode active materials may be used alone, or two or more thereof may be used concurrently. In addition, the above-mentioned negative electrode active materials subjected to pre-doping treatment with lithium ions may be used for the negative electrode active material.

According to the present embodiment, an electric load 13 composed of a motor or the like and a recharger 14 are connected in parallel to the power storage system 1. Between the power storage system 1 and each of the electric load 13 and the recharger 14, a switch is provided.

Further, in order to enhance the safety of the power storage system 1, a fuse or an FET switch may be provided between the first power storage pack 11 and the second power storage pack 12, if necessary.

The electric power supplied from the recharger 14 is supplied to the first power storage pack 11 and the second power storage pack 12. When the electric load 13 is operated without connecting the recharger 14, electric power is supplied from the first power storage pack 11 and the second power storage pack 12 to the electric load 13. The first power storage pack 11 and the second power storage pack 12 are provided with a control device, if necessary, to be controlled such that no abnormality occurs, such as an overcharge/overdischarge state or overheat.

According to the present embodiment, the electric load 13 is specifically an electric motor, and during deceleration of the vehicle 2, decelerating regeneration is carried out in which regenerative energy is converted to electrical energy by the electric motor as the electric load 13 to charge the first power storage pack 11 and the second power storage pack 12.

Figure 6:
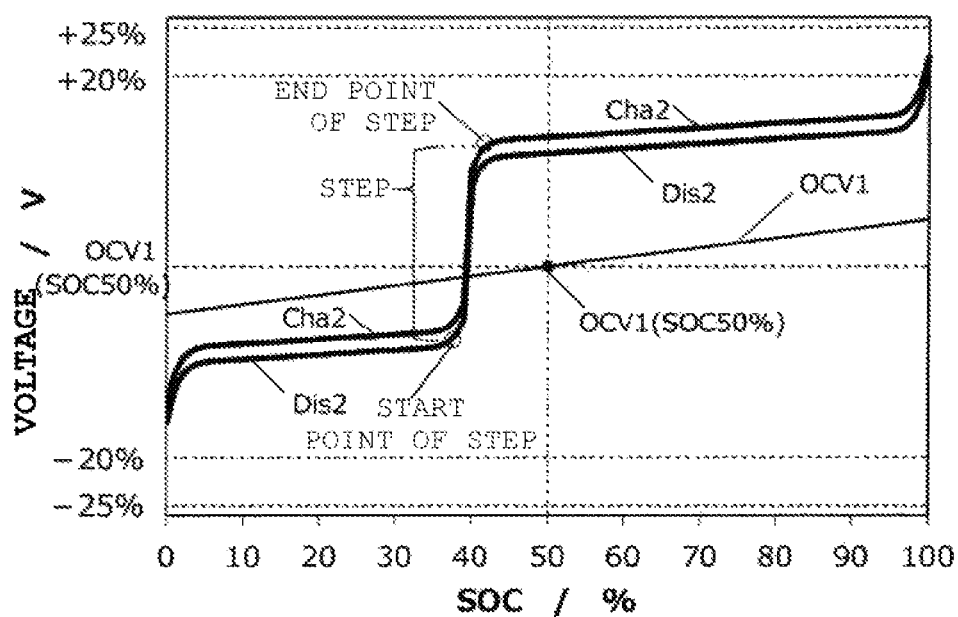
FIG. 6 is a diagram for explaining an open-circuit voltage of a first power storage pack and a charge/discharge curve for a second power storage pack.

FIG. 6 is a diagram for explaining an open-circuit voltage of the first power storage pack and a charge/discharge curve for the second power storage pack. More particularly, the charge/discharge curve for the second power storage pack 12, shown in FIG. 6, refers to a charge/discharge curve in the case of constant-current charging/discharging in the voltage range from a discharge cutoff voltage to a charge cutoff voltage at a current value of 0.2 C in an atmosphere at 25° C.±5° C.

As shown in FIG. 6, the power storage system 1 satisfies the following conditions (a), (b), and (c). It is to be noted that a line OCV1 represents the open-circuit voltage (OCV) of the first power storage pack 11 at a SOC in FIG. 6. In FIG. 6, a point OCV1 (SOC 50%) represents the open-circuit voltage (OCV) of the first power storage pack 11 at a SOC 50%. In FIG. 6, Cha2 represents a charge curve for the second power storage pack 12. In FIG. 6, Dis2 represents a discharge curve for the second power storage pack 12.

In this regard, "the open-circuit voltage (OCV) of the first power storage pack 11 at a SOC 50%" refers to a voltage value after the fully charged first power storage pack 11 is discharged to the SOC 50% at a current value of 0.2 C in an atmosphere at 25° C.±5° C., and after the completion of the discharge, left in the open-circuit condition for 24 hours. The "current value of 1 C" refers to a current value for charging or discharging to a rating capacity for 1 hour.

(a) The charge/discharge curve for the second power storage pack 12 has a step passing through the open-circuit voltage of the first power storage pack 11 at a SOC of 50%.

(b) The average discharge voltage on the lower SOC side of the start point of the step of the charge/discharge curve for the second power storage pack 12 is −25% or more of the open-circuit voltage of the first power storage pack 11 at a SOC of 50%.

(c) The average charge voltage on the higher SOC side of the end point of the step of the charge/discharge curve for the second power storage pack 12 is +25% or less of the open-circuit voltage of the first power storage pack 11 at a SOC of 50%.

Figure 7:
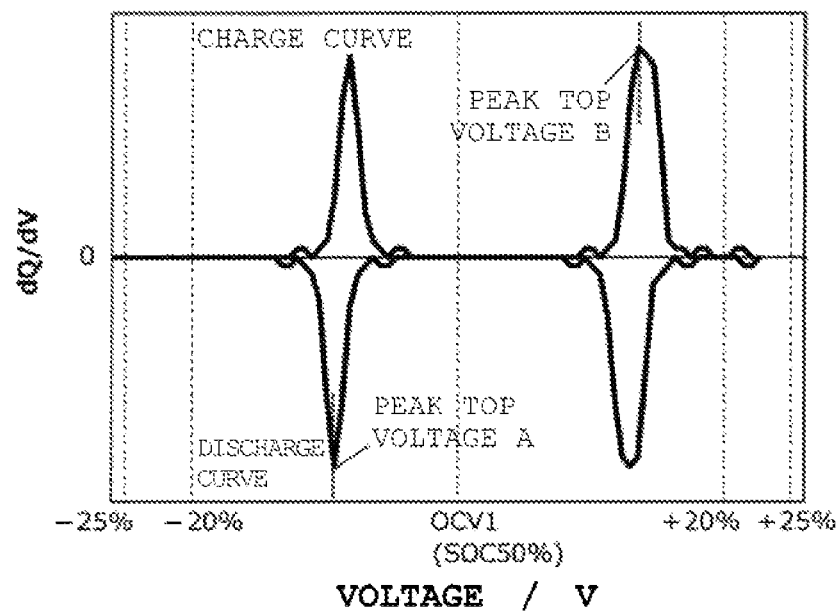
FIG. 7 is a diagram for explaining an open-circuit voltage of a first power storage pack and a dQ/dV curve for a second power storage pack.

FIG. 7 is a diagram for explaining the open-circuit voltage of the first power storage pack and a dQ/dV curve for the second power storage pack. More particularly, the dQ/dV curve for the second power storage pack 12, shown in FIG. 7, refers to a curve (dQ/dV curve) obtained by differentiating, with respect to voltage, a charge/discharge curve in the case of constant-current charging/discharging in the voltage range from a discharge cutoff voltage to a charge cutoff voltage at a current value of 0.2 C in an atmosphere at 25° C.±5° C.

It is to be noted that when there are multiple peaks of the dQ/dV curve (discharge curve) for the second power storage pack 12 at lower voltages than the open-circuit voltage of the first power storage pack 11 at the SOC 50%, or when there are multiple peaks of the dQ/dV curve (charge curve) for the second power storage pack 12 at higher voltages than the open-circuit voltage of the first power storage pack 11 at the SOC 50%, the voltage at the maximum peak is regarded as a peak top voltage.

As shown in FIG. 7, the power storage system 1 further satisfies the following conditions (d) and (e).

(d) On the lower SOC side of the start point of the step of the charge/discharge curve for the second power storage pack 12, the voltage at the peak top obtained on the curve (dQ/dV curve) obtained by differentiating, with respect to voltage, the discharge curve for the second power storage pack 12 is −25% or more of the open-circuit voltage of the first power storage pack 11 at a SOC of 50%.

(e) On the higher SOC side of the end point of the step of the charge/discharge curve for the second power storage pack 12, the voltage at the peak top obtained on the curve (dQ/dV curve) obtained by differentiating, with respect to voltage, the charge curve for the second power storage pack 12 is +25% or less of the open-circuit voltage of the first power storage pack 11 at a SOC of 50%.

In the present invention, "the step of a charge/discharge curve" refers to a range in which the voltage varies significantly in the range of 5% or more and 95% or less in the SOC of the second power storage pack, and specifically, refers to a range in which the absolute value of ΔV/ΔSOC that is the proportion of the amount of change in voltage (ΔV) on at least one of the charge curve or the discharge curve to the amount of change in SOC (ΔSOC) is (0.008× OCV1(SOC50%))V/% or more in the range of 5% or more and 95% or less in the SOC. In this regard, the OCV1 (SOC 50%) refers to the value (unit: V) of the OCV of the first power storage pack at the SOC 50%.

"The start point of a step" means the minimum voltage of a discharge curve in the range of one step, and the SOC at the voltage.

"The average discharge voltage on the lower SOC side of the start point of a step" refers to an arithmetic mean value of voltage for a discharge curve in the range from a SOC of 0% to a SOC at the start point of the step.

"The end point of the step" means the maximum voltage of a charge curve in the range of the same step, and the SOC at the voltage.

"The average charge voltage on the higher SOC side of the end point of a step" refers to an arithmetic mean value of voltage for a charge curve in the range from a SOC at the end point of the step to a SOC of 100%.

As shown in FIG. 6, the start point of the step for the second power storage pack 12 is equal to or lower than the open-circuit voltage of the first power storage pack 11 at the SOC 50%. The end point of the step for the second power storage pack 12 is equal to or higher than the open-circuit voltage of the first power storage pack 11 at the SOC 50%.

It is to be noted that the power storage system 1 according to the present embodiment satisfies all of the conditions (a), (b), (c), (d), and (e), but there is no need to limit the present invention thereto. The power storage system according to the present invention may satisfy only the conditions (a), (b), and (c). Alternatively, the power storage system according to the present invention may satisfy only the conditions (a), (d), and (e).

The power storage system 1 according to the present embodiment satisfies the condition (a). For this reason, when the voltage of the first power storage pack 11 corresponds to a SOC around 50%, the voltage of the second power storage pack 12 substantially coincides with the voltage of the first power storage pack 11 at the step of the charge/discharge curve for the second power storage pack 12, and the generation of a large voltage difference is eliminated between the second power storage pack 12 and the first power storage pack 11. Therefore, there is not always a need to provide a DCDC converter between the second power storage pack 12 and the first power storage pack 11. Accordingly, it becomes possible to reduce the price of the power storage system 1 and reduce the size thereof.

The voltage region equal to or less than −25% of the open-circuit voltage (OCV) obtained when the power storage pack has a SOC of 50% is regarded as an overdischarge region. Accordingly, in the voltage region equal to or less than −25% of the open-circuit voltage (OCV) obtained when the power storage pack has a SOC of 50%, the power storage pack is significantly deteriorated. In this regard, the power storage system 1 satisfies at least one of the condition (b) and the condition (d). For this reason, when the second power storage pack 12 is required for large current output, the output from the second power storage pack 12 is also provided in a condition in which the voltage of the first power storage pack 11 is lower than the open-circuit voltage at the SOC 50%. Therefore, the voltage of the first power storage pack 11 can be prevented from being lower than the discharge cutoff voltage. Consequently, deterioration due to an overdischarge state of the first power storage pack 11 can be prevented, thereby allowing an increase in the life-span of the power storage system 1. In addition, there is not always a need for a special circuit for preventing an overdischarge state of the first power storage pack 11, thus allowing a reduction in the price of the power storage system 1.

From the perspective of increasing the life-span of the power storage system 1, the average discharge voltage on the lower SOC side of the start point of the step of the charge/discharge curve for the second power storage pack 12 is preferably −2% or less, more preferably −4% or less of the open-circuit voltage of the first power storage pack 11 at a SOC of 50%. On the lower SOC side of the start point of the step of the charge/discharge curve for the second power storage pack 12, the voltage at the peak top obtained on the curve (dQ/dV curve) obtained by differentiating, with respect to voltage, the discharge curve for the second power storage pack 12 is preferably −2% or less, more preferably −4% or less of the open-circuit voltage of the first power storage pack 11 at a SOC of 50%.

The voltage region equal to or more than +25% of the open-circuit voltage (OCV) obtained when the power storage pack has a SOC of 50% is regarded as an overcharge region. Accordingly, in the voltage region equal to or more than +25% of the open-circuit voltage (OCV) obtained when the power storage pack has a SOC of 50%, the power storage pack is significantly deteriorated. In this regard, the power storage system 1 satisfies at least one of the condition (c) and the condition (e). For this reason, when the power storage system 1 is required for large current input, the input to the second power storage pack 12 is also provided in a condition in which the voltage of the first power storage pack 11 is higher than the open-circuit voltage at the SOC 50%. Consequently, the voltage of the first power storage pack 11 can be prevented from being higher than the charge cutoff voltage. Therefore, deterioration due to an overcharge state of the first power storage pack 11 can be prevented, thereby allowing an increase in the life-span of the power storage system 1. In addition, there is no need for a special circuit for preventing an overcharge state of the first power storage pack 11, thus allowing a reduction in the price of the power storage system 1.

From the perspective of increasing the life-span of the power storage system 1, the average charge voltage on the higher SOC side of the end point of the step of the charge/discharge curve for the second power storage pack 12 is preferably +2% or more, more preferably +4% or more of the open-circuit voltage of the first power storage pack 11 at a SOC of 50%. On the higher SOC side of the end point of the step of the charge/discharge curve for the second power storage pack 12, the voltage at the peak top obtained on the curve (dQ/dV curve) obtained by differentiating, with respect to voltage, the charge curve for the second power storage pack 12 is preferably +2% or more, more preferably +4% or more of the open-circuit voltage of the first power storage pack 11 at a SOC of 50%.

The following methods are conceivable as a method for configuring the power storage system 1 to satisfy the conditions (a), (b), (c), (d), and (e).

(Method 1)

A method of adopting, as the second power storage pack 12, a lithium ion storage battery pack including a lithium ion storage battery, and using a positive electrode active material that causes a charge/discharge curve for the lithium ion storage battery to have a step, as a positive electrode active material for a positive electrode of the lithium ion storage battery. Alternatively, a method of using a negative electrode active material that causes a charge/discharge curve for the lithium ion storage battery to have a step, as a negative electrode active material for a negative electrode of the lithium ion storage battery.

Specific examples of the positive electrode active material that causes a charge/discharge curve for the lithium ion storage battery to have a step include, for example, $Li[Ni_xMn_{(2-x)}]O_4$ ($0.05 \leq x \leq 0.45$), $Li[Co_xMn_{(2-x)}]O_4$ ($0.1 \leq x \leq 1$), $Li[Fe_xMn_{(2-x)}]O_4$ ($0.05 \leq x \leq 0.45$), $LiFe_aMn_bCo_cNi_dPO_4$ ($0 \leq a \leq 1$, $0 \leq b \leq 1$, $0 \leq c \leq 1$, $0 \leq d \leq 1$, $a+b+c+d=1$), and $Li_3V_2(PO_4)_3$. Only one of these positive electrode active materials may be used, or two or more thereof may be used in mixture.

Specific examples of the negative electrode active material that causes a charge/discharge curve for the lithium ion storage battery to have a step include, for example, $LiMn_2O_4$, $Li_4Ti_5O_{12}$, $LiMg_{1/2}Ti_{3/2}O_4$, $LiCo_{1/2}Ti_{3/2}O_4$, $LiZn_{1/2}Ti_{3/2}O_4$, $LiFeTiO_4$, $LiCrTiO_4$, $Li_2SrTi_6O_{14}$, $Li_2BaTi_6O_{14}$, $TiO_2$, $WO_3$, $MoO_2$, and $MnO_2$. Only one of these negative electrode active materials may be used, or two or more thereof may be used in mixture.

(Method 2)

A method of adopting, as the second power storage pack 12, a lithium ion storage battery pack including a lithium ion storage battery, and causing a positive electrode of the lithium ion storage battery to include multiple types of positive electrode active materials.

For example, it is conceivable that the positive electrode of the lithium ion storage battery is adapted to include the positive electrode active materials below.

1) $LiFePO_4$ and $LiCoO_2$
2) $LiFePO_4$ and $LiMn_2O_4$
3) $LiFePO_4$ and $Li_{(1+a)}Ni_xMn_yCo_zO_2$ ($0 \leq a \leq 0.5$, $0 \leq x \leq 1$, $0 \leq y \leq 1$, $0 \leq z \leq 1$, $x+y+z=1$)
4) $LiFePO_4$ and $Li[Ni_xMn_{(2-x)}]O_4$ ($0 \leq x \leq 0.5$)
5) $LiFePO_4$ and $LiMnPO_4$
6) $LiFePO_4$ and $LiCoPO_4$
7) $LiMn_2O_4$ and $Li[Ni_xMn_{(2-x)}]O_4$ ($0 \leq x \leq 0.5$)
8) $LiMn_2O_4$ and $LiCoPO_4$ (Method 3)

A method of adopting, as the second power storage pack 12, a lithium ion storage battery pack including a lithium ion storage battery, and causing a negative electrode of the lithium ion storage battery to include multiple types of negative electrode active materials.

For example, it is conceivable that the negative electrode of the lithium ion storage battery is adapted to include the negative electrode active materials below.

1) graphite and $Li_4Ti_5O_{12}$
2) graphite and SiO
3) graphite and $SnO_2$
4) graphite and Si
5) graphite and Sn
6) non-graphitizable carbon and $Li_4Ti_5O_{12}$
7) non-graphitizable carbon and SiO
8) non-graphitizable carbon and $SnO_2$
9) non-graphitizable carbon and Si
10) non-graphitizable carbon and Sn
11) $Li_4Ti_5O_{12}$ and SiO
12) $Li_4Ti_5O_{12}$ and $SnO_2$ 13) $Li_4Ti_5O_{12}$ and Si
14) $Li_4Ti_5O_{12}$ and Sn (Method 4)

A method of configuring the second power storage pack 12 to have a plurality of power storage devices, and to have a parallel-connected power storage modules that differ in number of connection stages.

(Method 5)

A method of configuring the second power storage pack 12 to have multiple types of power storage modules including different types of power storage devices.

For example, it is conceivable that the second power storage pack 12 is adapted to include lithium ion storage batteries that differ in positive electrode active material, as with the following 1) to 8).

1) A lithium ion storage battery including $LiFePO_4$ as a positive electrode active material and a lithium ion storage battery including $LiCoO_2$ as a positive electrode active material.

2) A lithium ion storage battery including $LiFePO_4$ as a positive electrode active material and a lithium ion storage battery including $LiMn_2O_4$ as a positive electrode active material.

3) A lithium ion storage battery including $LiFePO_4$ as a positive electrode active material and a lithium ion storage battery including $Li_{(1+a)}Ni_xMn_yCo_zO_2$ ($0 \leq a \leq 0.5$, $0 \leq x \leq 1$, $0 \leq y \leq 1$, $0 \leq z \leq 1$, x+y+z=1) as a positive electrode active material.

4) A lithium ion storage battery including $LiFePO_4$ as a positive electrode active material and a lithium ion storage battery including $Li[Ni_xMn_{(2-x)}]O_4$ ($0 \leq x \leq 0.5$) as a positive electrode active material.

5) A lithium ion storage battery including $LiFePO_4$ as a positive electrode active material and a lithium ion storage battery including $LiMnPO_4$ as a positive electrode active material.

6) A lithium ion storage battery including $LiFePO_4$ as a positive electrode active material and a lithium ion storage battery including $LiCoPO_4$ as a positive electrode active material.

7) A lithium ion storage battery including $LiMn_2O_4$ as a positive electrode active material and a lithium ion storage battery including $Li[Ni_xMn_{(2-x)}]O_4$ ($0 \leq x \leq 0.5$) as a positive electrode active material.

8) A lithium ion storage battery including $LiMn_2O_4$ as a positive electrode active material and a lithium ion storage battery including $LiCoPO_4$ as a positive electrode active material.

For example, it is conceivable that the second power storage pack 12 is adapted to include lithium ion storage batteries that differ in negative electrode active material, as with the following 9) to 22).

9) A lithium ion storage battery including graphite as a negative electrode active material and a lithium ion storage battery including $Li_4Ti_5O_{12}$ as a negative electrode active material.

10) A lithium ion storage battery including graphite as a negative electrode active material and a lithium ion storage battery including SiO as a negative electrode active material.

11) A lithium ion storage battery including graphite as a negative electrode active material and a lithium ion storage battery including $SnO_2$ as a negative electrode active material.

12) A lithium ion storage battery including graphite as a negative electrode active material and a lithium ion storage battery including Si as a negative electrode active material.

13) A lithium ion storage battery including graphite as a negative electrode active material and a lithium ion storage battery including Sn as a negative electrode active material.

14) A lithium ion storage battery including non-graphitizable carbon as a negative electrode active material and a lithium ion storage battery including $Li_4Ti_5O_{12}$ as a negative electrode active material.

15) A lithium ion storage battery including non-graphitizable carbon as a negative electrode active material and a lithium ion storage battery including SiO as a negative electrode active material.

16) A lithium ion storage battery including non-graphitizable carbon as a negative electrode active material and a lithium ion storage battery including $SnO_2$ as a negative electrode active material.

17) A lithium ion storage battery including non-graphitizable carbon as a negative electrode active material and a lithium ion storage battery including Si as a negative electrode active material.

18) A lithium ion storage battery including non-graphitizable carbon as a negative electrode active material and a lithium ion storage battery including Sn as a negative electrode active material.

19) A lithium ion storage battery including $Li_4Ti_5O_{12}$ as a negative electrode active material and a lithium ion storage battery including SiO as a negative electrode active material.

20) A lithium ion storage battery including $Li_4Ti_5O_{12}$ as a negative electrode active material and a lithium ion storage battery including $SnO_2$ as a negative electrode active material.

21) A lithium ion storage battery including $Li_4Ti_5O_{12}$ as a negative electrode active material and a lithium ion storage battery including Si as a negative electrode active material.

22) A lithium ion storage battery including $Li_4Ti_5O_{12}$ as a negative electrode active material and a lithium ion storage battery including Sn as a negative electrode active material.

In addition, for example, the second power storage pack 12 may be adapted to include at least two types of power storage modules selected from the group consisting of a lithium ion storage battery module, a nickel-metal-hydride storage battery module, a lead storage battery module, and a capacitor.

(Method 6)

A method of configuring the second power storage pack 12 to have a plurality of parallel-connected power storage modules that differ in voltage from each other, a switch provided for at least one of the power storage modules, and a control unit that turns on/off the switch. In the case of the method 6, turning on/off the switch forms a step in a charge/discharge curve.

In the method 6, the power storage module which is relatively low in voltage is preferably provided with the switch. In this case, turning off the switch before the power storage module provided with the switch is overcharged can form a step in a charge/discharge curve.

On the other hand, when the power storage module which is relatively high in voltage is provided with the switch, turning off the switch before the power storage module provided with the switch is overdischarged can form a step in a charge/discharge curve.

It is to be noted that the (Method 1) to (Method 6) can be appropriately combined and implemented.

In the power storage systems 1, the ratio preferably falls within the range of 10:90 to 90:10 between the capacity on the lower SOC side of the start point of the step of the charge/discharge curve for the second power storage pack 12 and the capacity on the higher SOC side of the end point of the step of the charge/discharge curve for the second power storage pack 12 in the second power storage pack. In this case, the second power storage pack 12 can effectively prevent deterioration due to both an overcharge state and an overdischarge state of the first power storage pack 11, thereby allowing a further increase in the life-span of the power storage system 1.

In the power storage system 1, the first power storage pack 11 is preferably higher in capacity than the second power storage pack 12. In addition, the ratio between the capacity of the first power storage pack 11 and the capacity of the second power storage pack 12 preferably falls within the range of 55:45 to 99:1. In this case, when an inexpensive lead storage battery pack is adopted for the first power storage pack 11, the inexpensive lead storage battery accounts for most of the capacity of the power storage system 1, thus allowing a further reduction in the price of the power storage system 1.

EXAMPLES

Example 1

A 12 V lead storage battery pack with six lead storage batteries of 50 Ah each in capacity connected in series was adopted as the first power storage pack 11. The open-circuit voltage of the first power storage pack 11 at SOC 50% was 12.3 V.

Figure 8:
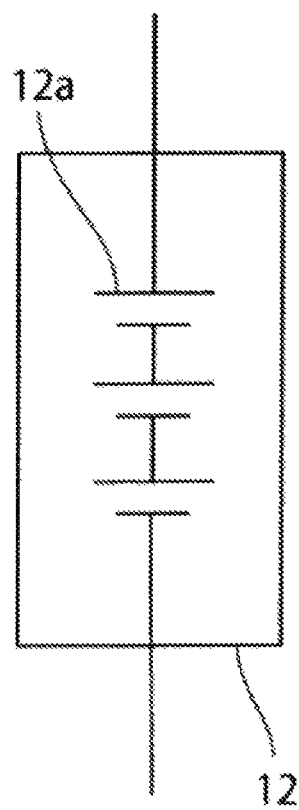
FIG. 8 is a schematic circuit diagram of the second power storage pack 12 fabricated according to Example 1.
Figure 9:
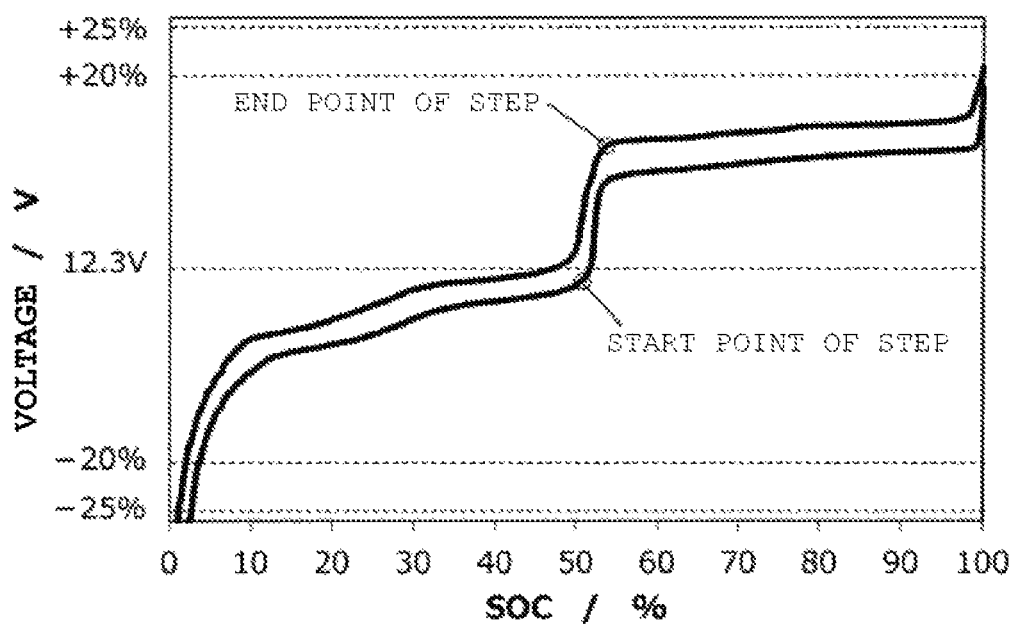
FIG. 9 is a charge/discharge curve for the second power storage pack 12 fabricated according to Example 1.
Figure 10:
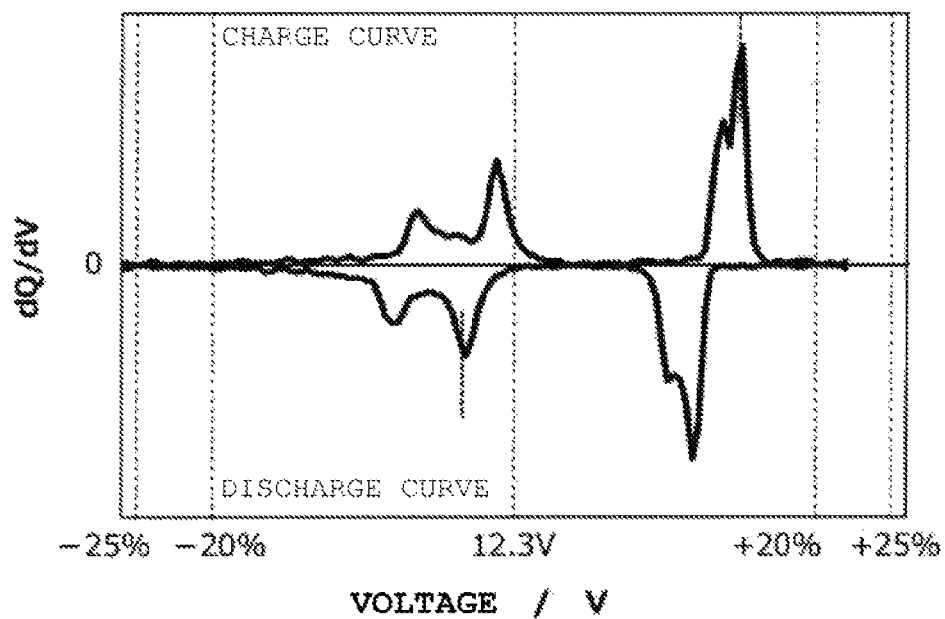
FIG. 10 is a curve (dQ/dV curve) obtained by differentiating the charge/discharge curve for the second power storage pack 12 fabricated according to Example 1 with respect to voltage.

Lithium ion storage batteries 12a with A/C ratio=1.2 and capacity of 10 Ah were prepared with the use of $Li[Ni_{0.25}Mn_{1.75}]O_4$ for a positive electrode active material and the use of graphite for a negative electrode active material. Three of the lithium ion storage batteries 12a were connected in series as shown in FIG. 8, thereby fabricating a second power storage pack 12, and a charge/discharge curve was measured. FIG. 9 shows a charge/discharge curve for the second power storage pack 12 fabricated according to Example 1. FIG. 10 is a curve (dQ/dV curve) obtained by differentiating the charge/discharge curve for the second power storage pack 12 fabricated according to Example 1 with respect to voltage.

The first power storage pack 11 and second power storage pack 12 fabricated as mentioned above were connected in series, thereby fabricating a power storage system.

Example 2

Figure 11:
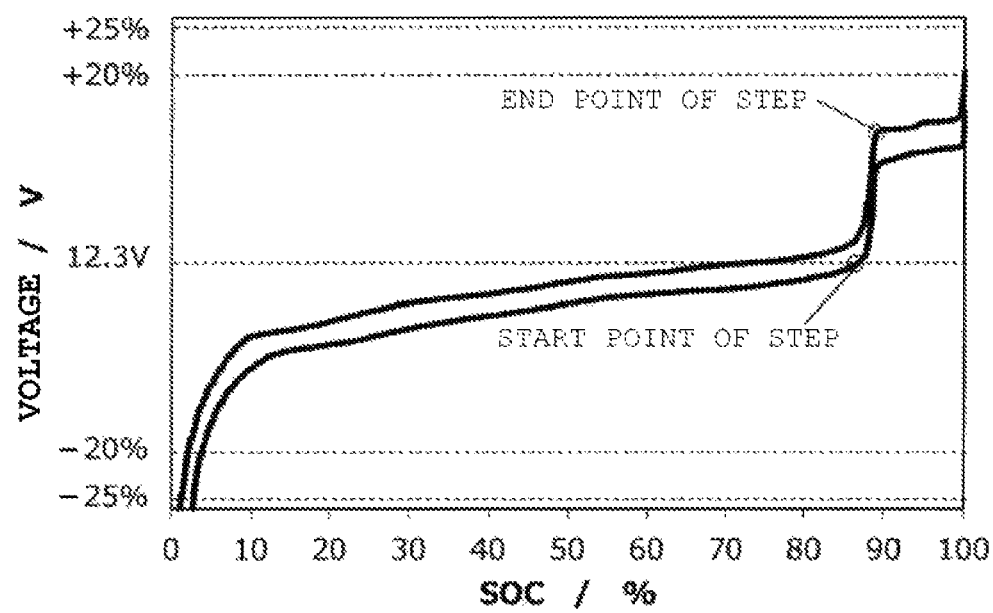
FIG. 11 is a charge/discharge curve for a second power storage pack 12 fabricated according to Example 2.
Figure 12:
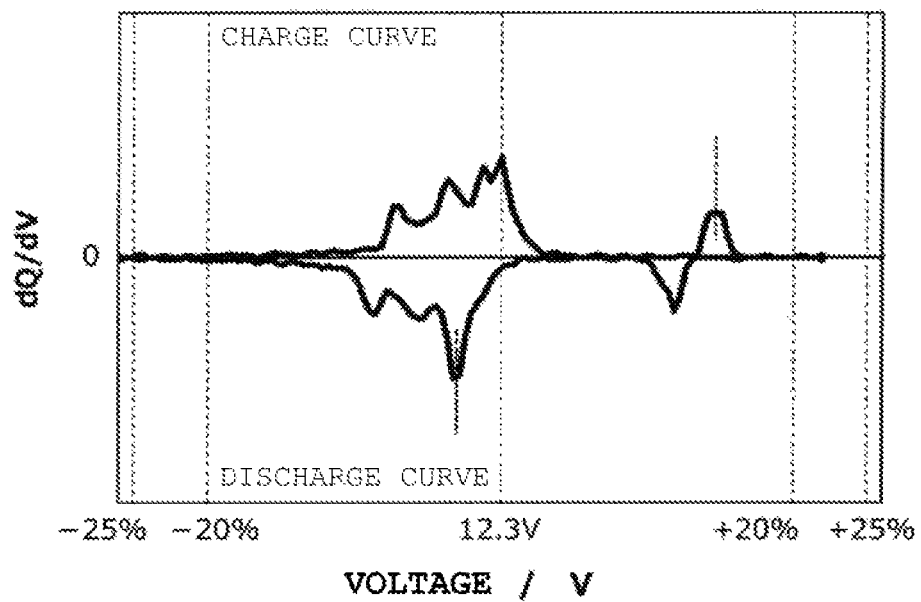
FIG. 12 is a curve (dQ/dV curve) obtained by differentiating the charge/discharge curve for the second power storage pack 12 fabricated according to Example 2 with respect to voltage.

In the same way as in Example 1, except for the use of $Li[Ni_{0.05}Mn_{1.95}]O_4$ as a positive electrode active material, a second power storage pack 12 was fabricated, and a charge/discharge curve was measured. FIG. 11 shows therein a charge/discharge curve for the second power storage pack 12, and FIG. 12 shows therein a dQ/dV curve therefor.

In addition, the first power storage pack 11 fabricated in the same way as in Example 1 and the second power storage pack 12 fabricated according to Example 2 were connected in parallel, thereby fabricating a power storage system.

Example 3

Figure 13:
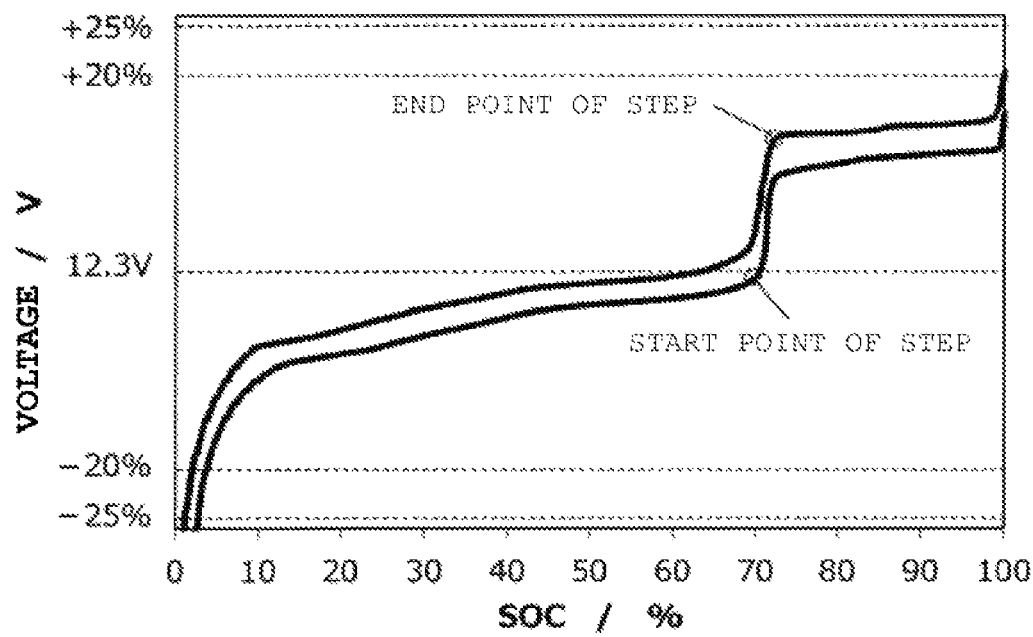
FIG. 13 is a charge/discharge curve for a second power storage pack 12 fabricated according to Example 3.
Figure 14:
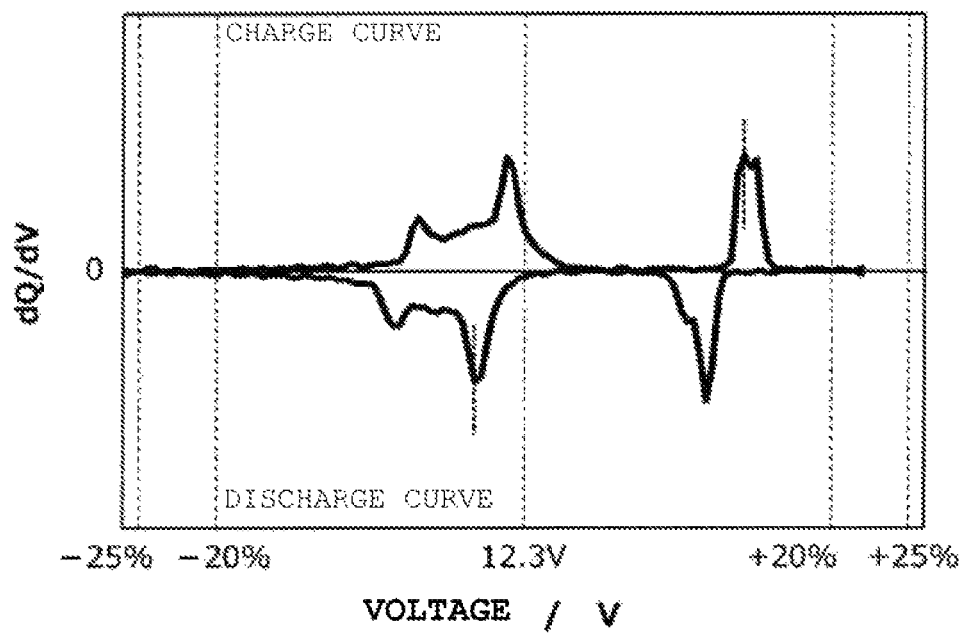
FIG. 14 is a curve (dQ/dV curve) obtained by differentiating the charge/discharge curve for the second power storage pack 12 fabricated according to Example 3 with respect to voltage.

In the same way as in Example 1, except for the use of $Li[Ni_{0.15}Mn_{1.85}]O_4$ as a positive electrode active material, a second power storage pack 12 was fabricated, and a charge/discharge curve was measured. FIG. 13 shows therein a charge/discharge curve for the second power storage pack 12, and FIG. 14 shows therein a dQ/dV curve therefor.

In addition, the first power storage pack 11 fabricated in the same way as in Example 1 and the second power storage pack 12 fabricated according to Example 3 were connected in parallel, thereby fabricating a power storage system.

Example 4

Figure 15:
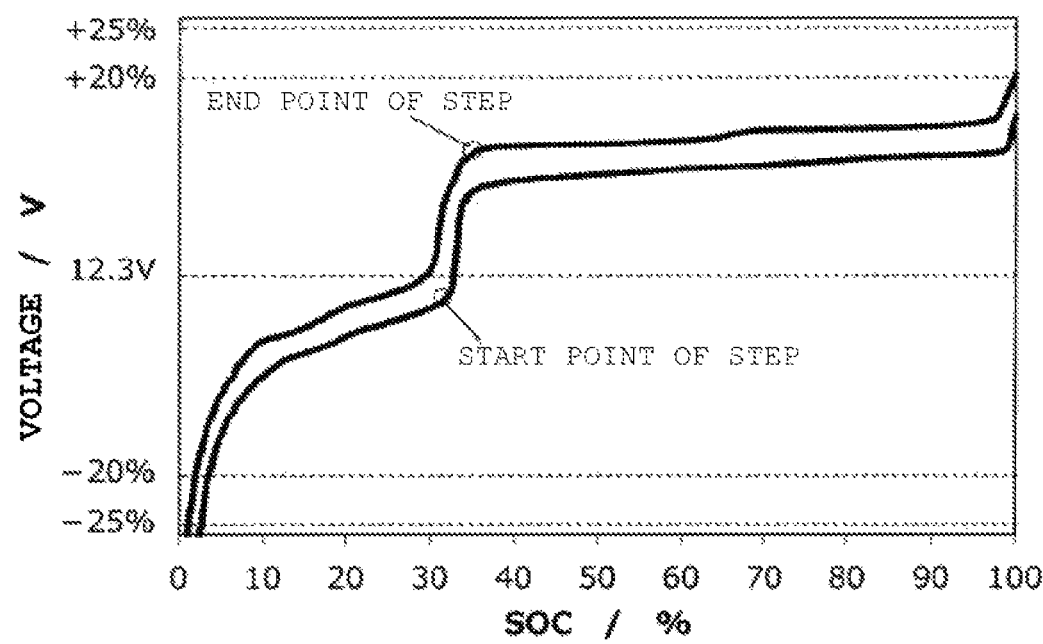
FIG. 15 is a charge/discharge curve for a second power storage pack 12 fabricated according to Example 4.
Figure 16:
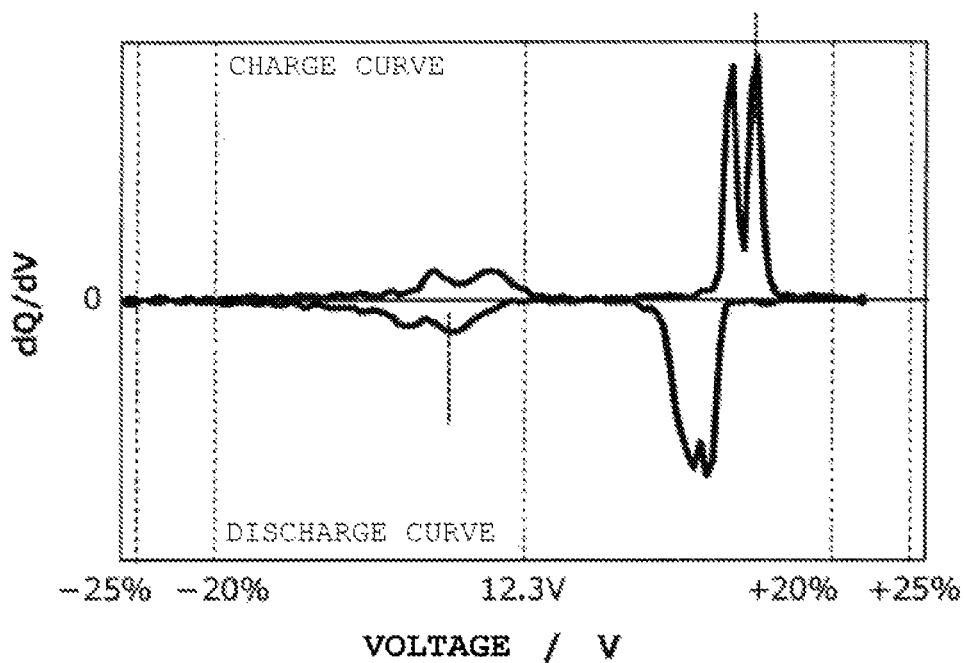
FIG. 16 is a curve (dQ/dV curve) obtained by differentiating the charge/discharge curve for the second power storage pack 12 fabricated according to Example 4 with respect to voltage.

In the same way as in Example 1, except for the use of $Li[Ni_{0.35}Mn_{1.65}]O_4$ as a positive electrode active material, a second power storage pack 12 was fabricated, and a charge/discharge curve was measured. FIG. 15 shows therein a charge/discharge curve for the second power storage pack 12, and FIG. 16 shows therein a dQ/dV curve therefor.

In addition, the first power storage pack 11 fabricated in the same way as in Example 1 and the second power storage pack 12 fabricated according to Example 4 were connected in parallel, thereby fabricating a power storage system.

Example 5

Figure 17:
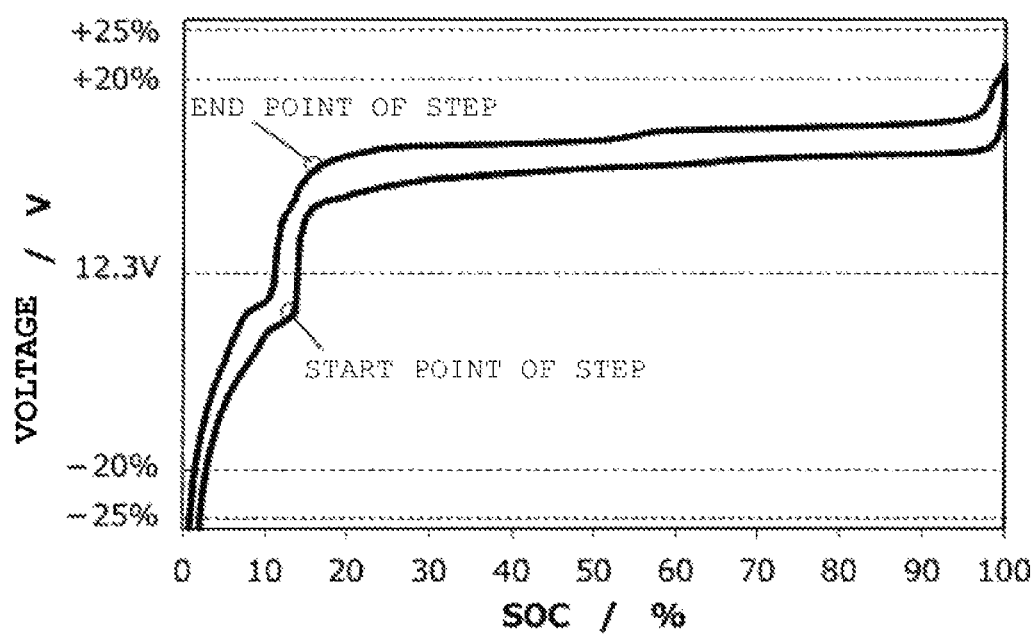
FIG. 17 is a charge/discharge curve for a second power storage pack 12 fabricated according to Example 5.
Figure 18:
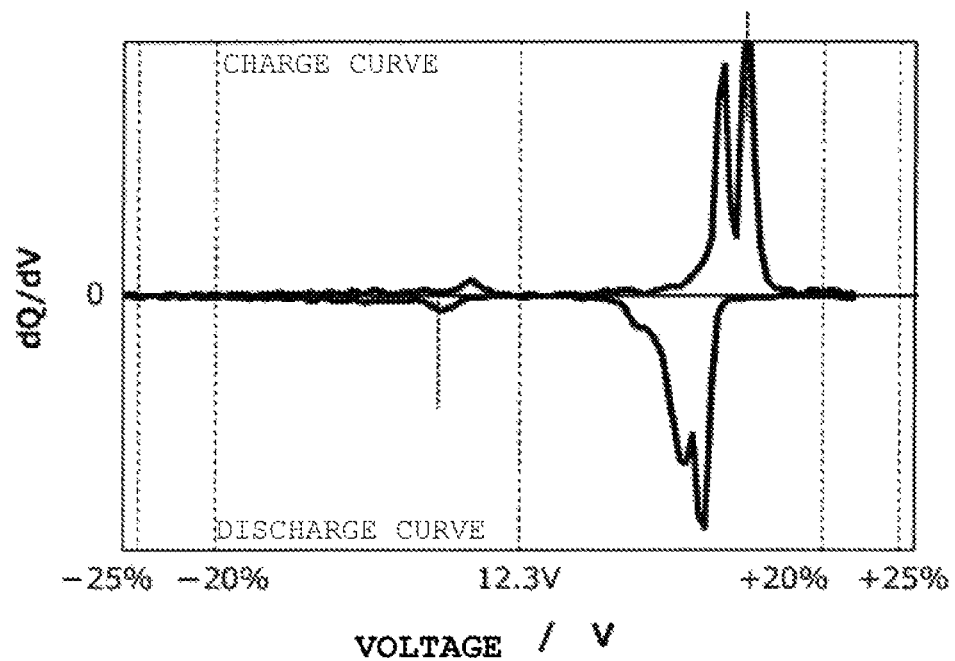
FIG. 18 is a curve (dQ/dV curve) obtained by differentiating the charge/discharge curve for the second power storage pack 12 fabricated according to Example 5 with respect to voltage.

In the same way as in Example 1, except for the use of $Li[Ni_{0.45}Mn_{1.55}]O_4$ as a positive electrode active material, a second power storage pack 12 was fabricated, and a charge/discharge curve was measured. FIG. 17 shows therein a charge/discharge curve for the second power storage pack 12, and FIG. 18 shows therein a dQ/dV curve therefor.

In addition, the first power storage pack 11 fabricated in the same way as in Example 1 and the second power storage pack 12 fabricated according to Example 5 were connected in parallel, thereby fabricating a power storage system.

Reference Example 1

Figure 19:
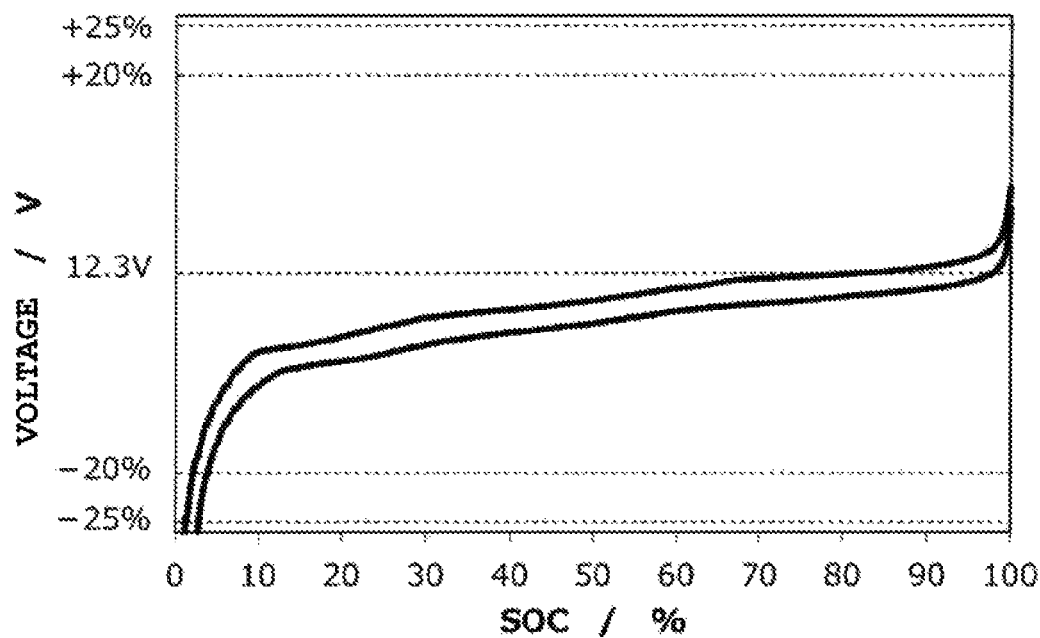
FIG. 19 is a charge/discharge curve for a second power storage pack 12 fabricated according to Reference Example 1.
Figure 20:
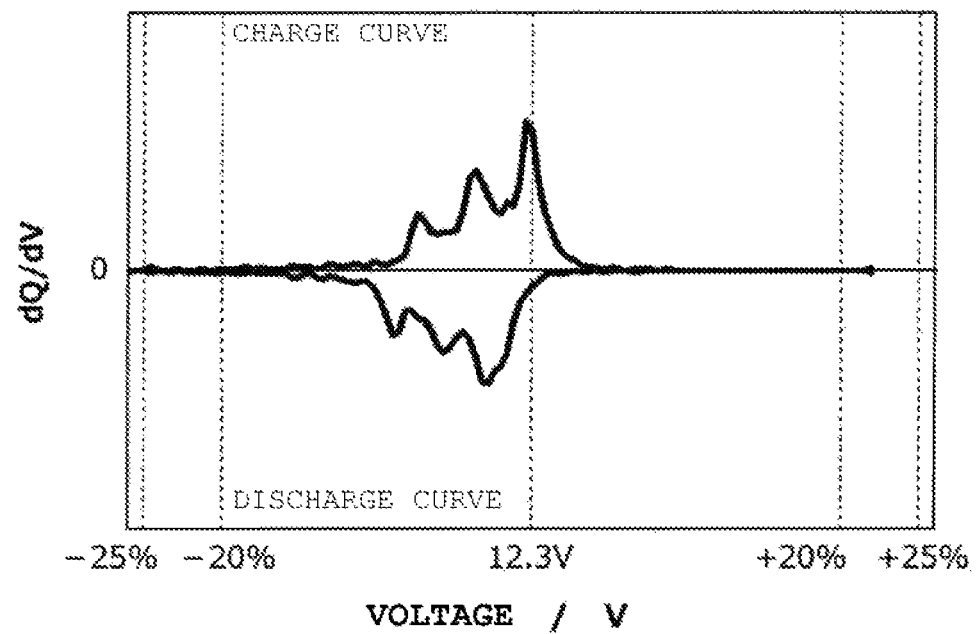
FIG. 20 is a curve (dQ/dV curve) obtained by differentiating the charge/discharge curve for the second power storage pack 12 fabricated according to Reference Example 1 with respect to voltage.

In the same way as in Example 1, except for the use of $LiMn_2O_4$ as a positive electrode active material, a second power storage pack 12 was fabricated, and a charge/discharge curve was measured. FIG. 19 shows therein a charge/discharge curve for the second power storage pack 12, and FIG. 20 shows therein a dQ/dV curve therefor.

In addition, the first power storage pack 11 fabricated in the same way as in Example 1 and the second power storage pack 12 fabricated according to Reference Example 1 were connected in parallel, thereby fabricating a power storage system.

Reference Example 2

Figure 21:
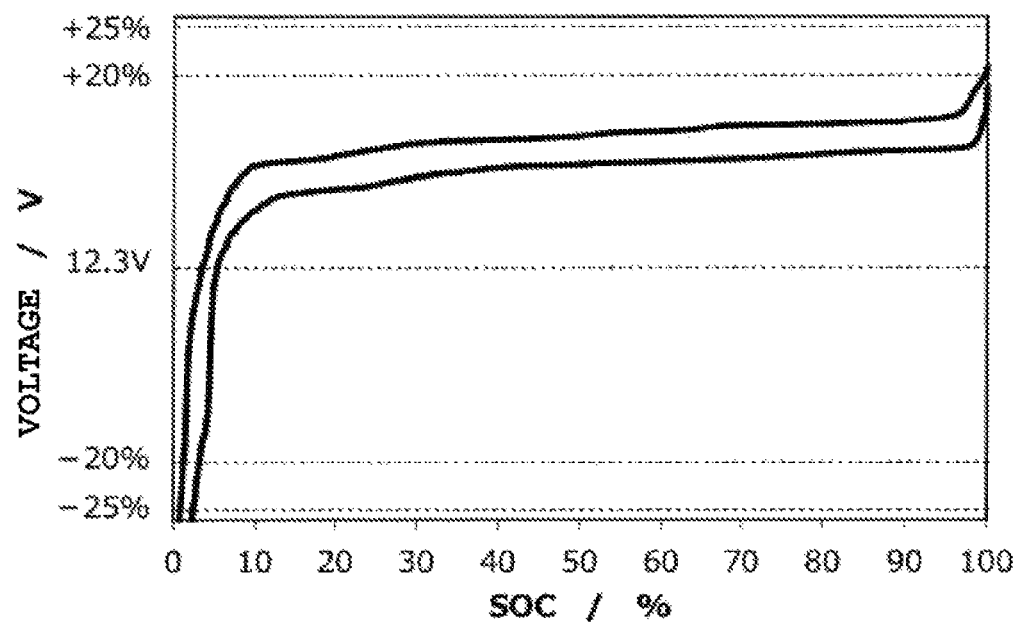
FIG. 21 is a charge/discharge curve for a second power storage pack 12 fabricated according to Reference Example 2.
Figure 22:
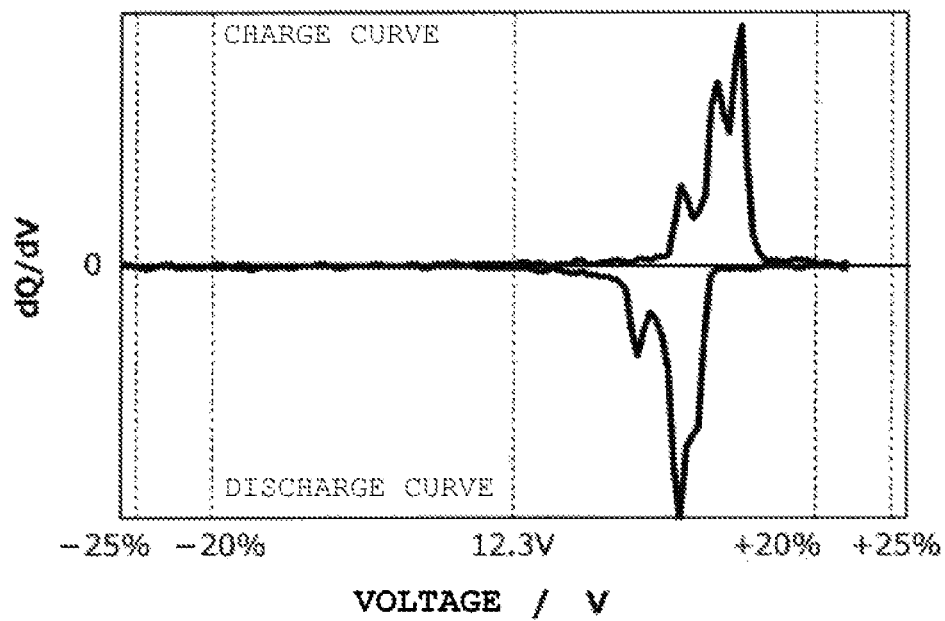
FIG. 22 is a curve (dQ/dV curve) obtained by differentiating the charge/discharge curve for the second power storage pack 12 fabricated according to Reference Example 2 with respect to voltage.

In the same way as in Example 1, except for the use of $Li[Ni_{0.50}Mn_{1.50}]O_4$ as a positive electrode active material, a second power storage pack 12 was fabricated, and a charge/discharge curve was measured. FIG. 21 shows therein a charge/discharge curve for the second power storage pack 12, and FIG. 22 shows therein a dQ/dV curve therefor.

In addition, the first power storage pack 11 fabricated in the same way as in Example 1 and the second power storage pack 12 fabricated according to Reference Example 2 were connected in parallel, thereby fabricating a power storage system.

Example 6

Figure 23:
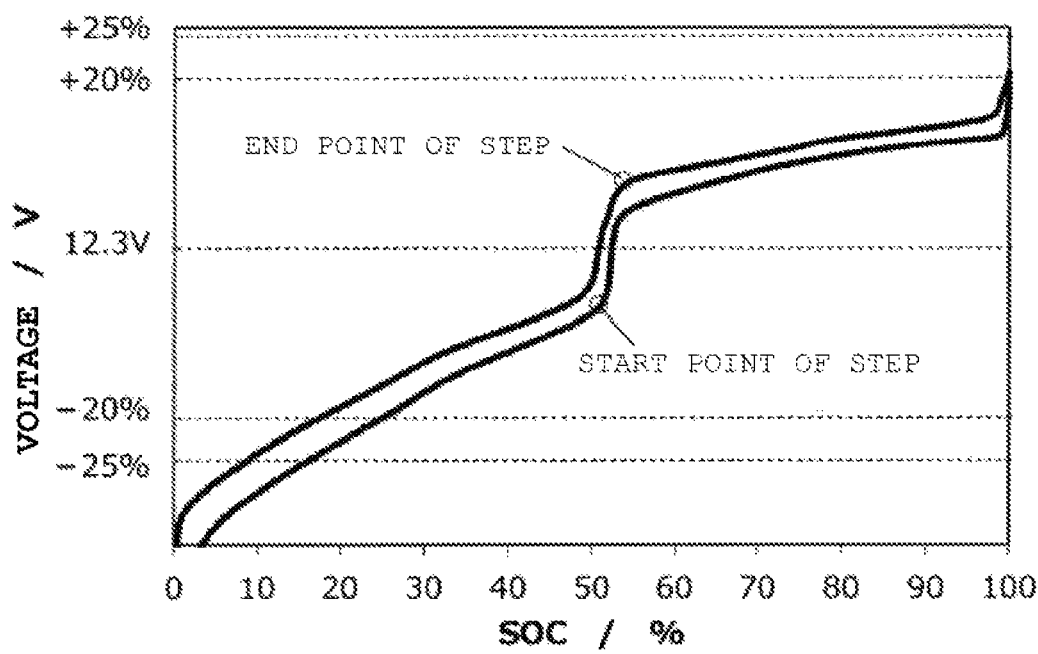
FIG. 23 is a charge/discharge curve for a second power storage pack 12 fabricated according to Example 6.
Figure 24:
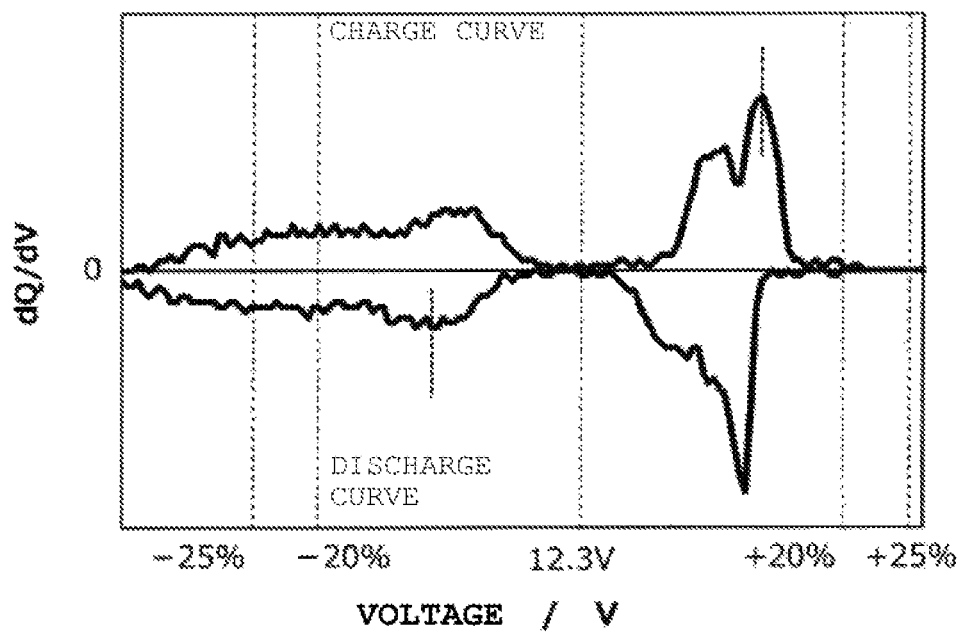
FIG. 24 is a curve (dQ/dV curve) obtained by differentiating the charge/discharge curve for the second power storage pack 12 fabricated according to Example 6 with respect to voltage.

In the same way as in Example 1, except for the use of $Li[Ni_{0.25}Mn_{1.75}]O_4$ as a positive electrode active material and the use of hard carbon as a negative electrode active material, a second power storage pack 12 was fabricated, and a charge/discharge curve was measured. FIG. 23 shows therein a charge/discharge curve for the second power storage pack 12, and FIG. 24 shows therein a dQ/dV curve therefor.

In addition, the first power storage pack 11 fabricated in the same way as in Example 1 and the second power storage pack 12 fabricated according to Example 6 were connected in parallel, thereby fabricating a power storage system.

Example 7

Figure 25:
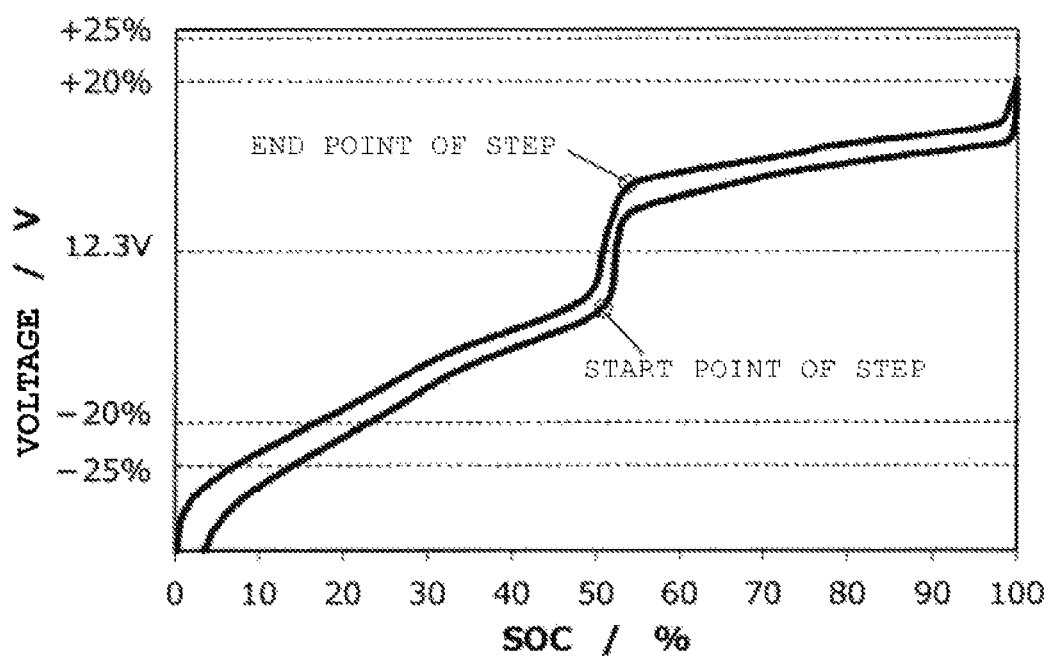
FIG. 25 is a charge/discharge curve for a second power storage pack 12 fabricated according to Example 7.
Figure 26:
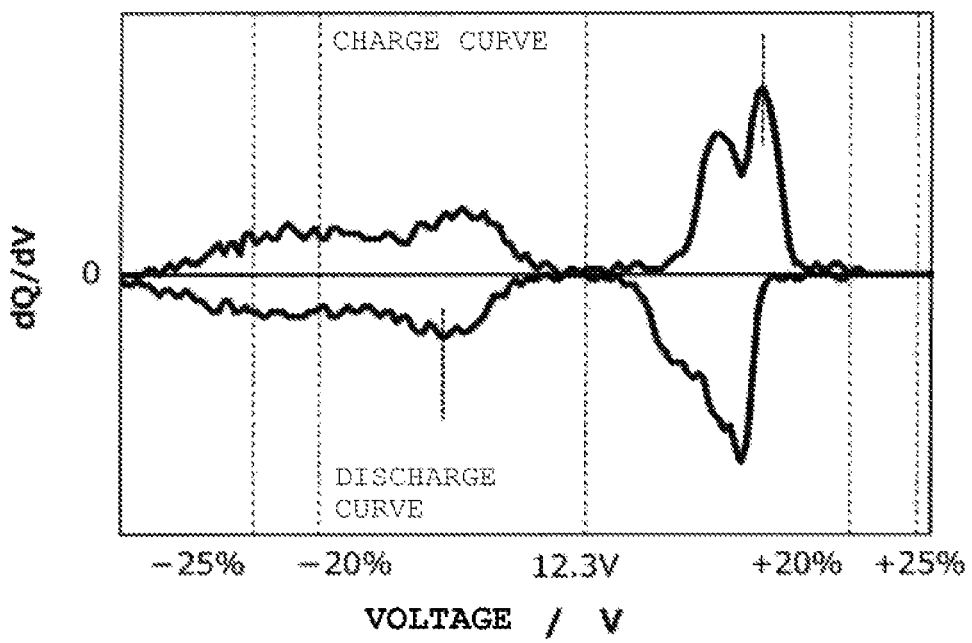
FIG. 26 is a curve (dQ/dV curve) obtained by differentiating the charge/discharge curve for the second power storage pack 12 fabricated according to Example 7 with respect to voltage.

In the same way as in Example 6, except for the use of soft carbon as a negative electrode active material, a second power storage pack 12 was fabricated, and a charge/discharge curve was measured. FIG. 25 shows therein a charge/discharge curve for the second power storage pack 12, and FIG. 26 shows therein a dQ/dV curve therefor.

In addition, the first power storage pack 11 fabricated in the same way as in Example 1 and the second power storage pack 12 fabricated according to Example 7 were connected in parallel, thereby fabricating a power storage system.

Example 8

Figure 27:
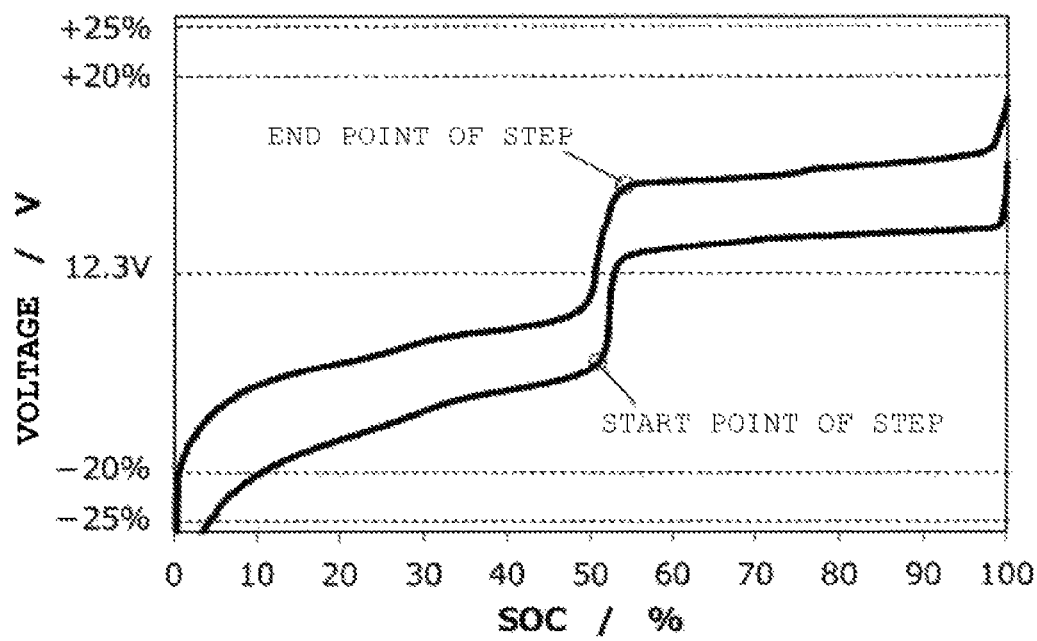
FIG. 27 is a charge/discharge curve for a second power storage pack 12 fabricated according to Example 8.
Figure 28:
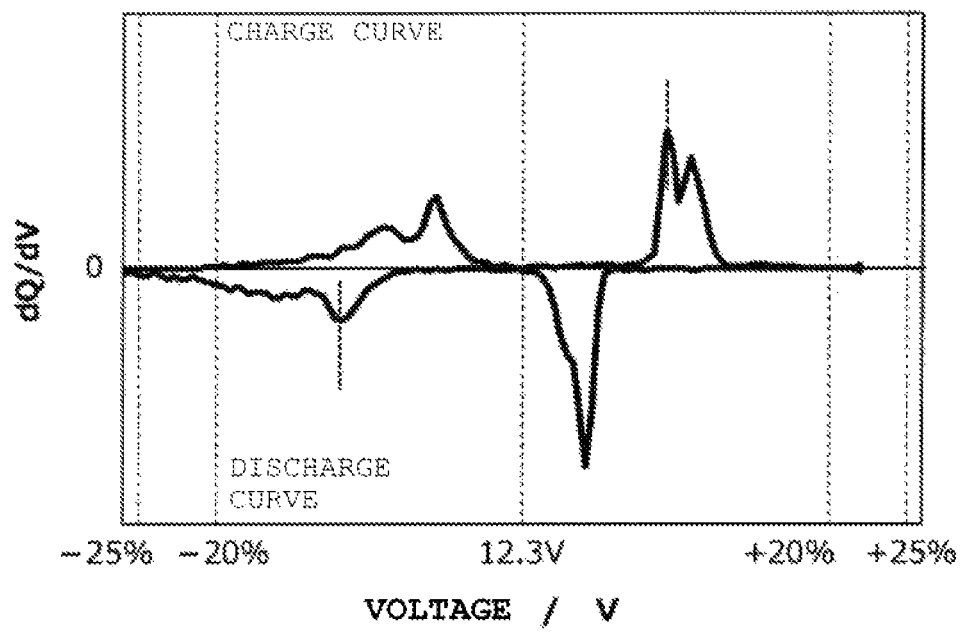
FIG. 28 is a curve (dQ/dV curve) obtained by differentiating the charge/discharge curve for the second power storage pack 12 fabricated according to Example 8 with respect to voltage.

In the same way as in Example 6, except for the use of Si as a negative electrode active material and for the A/C ratio=2.0, a second power storage pack 12 was fabricated, and a charge/discharge curve was measured. FIG. 27 shows therein a charge/discharge curve for the second power storage pack 12, and FIG. 28 shows therein a dQ/dV curve therefor.

In addition, the first power storage pack 11 fabricated in the same way as in Example 1 and the second power storage pack 12 fabricated according to Example 8 were connected in parallel, thereby fabricating a power storage system.

Example 9

Figure 29:
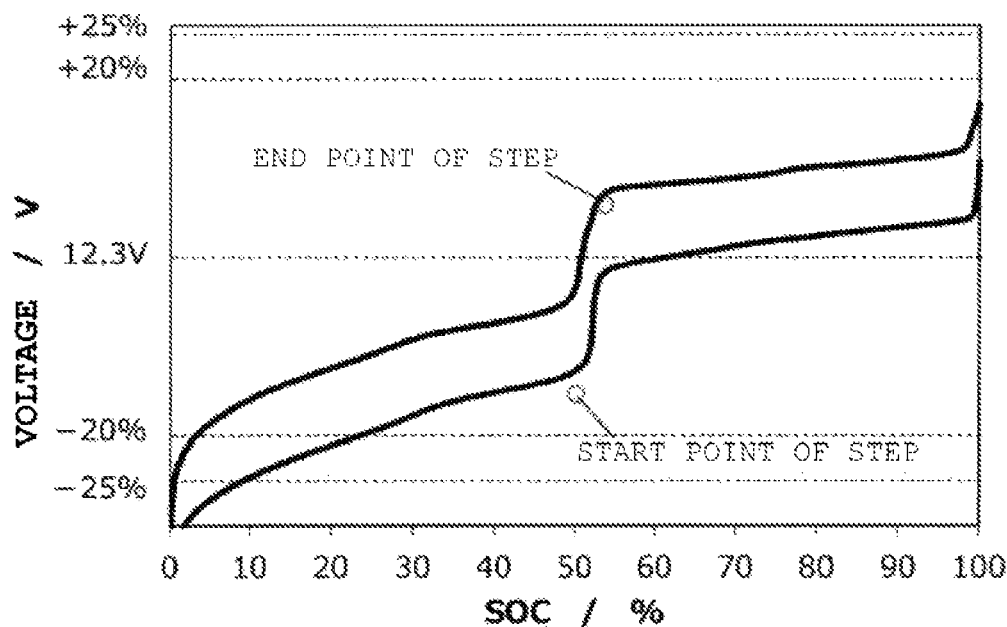
FIG. 29 is a charge/discharge curve for a second power storage pack 12 fabricated according to Example 9.
Figure 30:
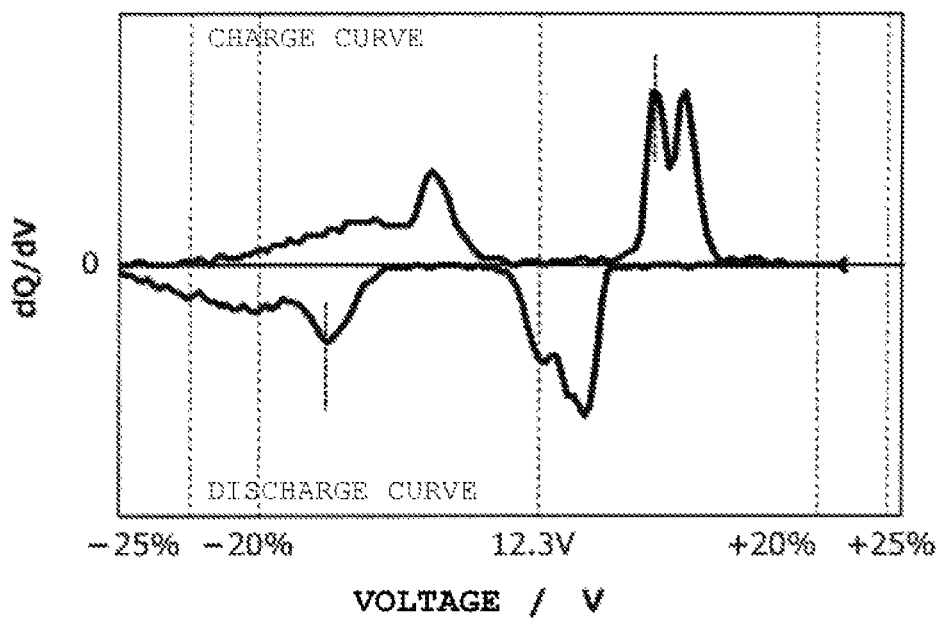
FIG. 30 is a curve (dQ/dV curve) obtained by differentiating the charge/discharge curve for the second power storage pack 12 fabricated according to Example 9 with respect to voltage.

In the same way as in Example 6, except for the use of, as a negative electrode active material, $SnO_2$ subjected to electrochemical pre-doping treatment with lithium ions, and for the A/C ratio=1.5, a second power storage pack 12 was fabricated, and a charge/discharge curve was measured. FIG. 29 shows therein a charge/discharge curve for the second power storage pack 12, and FIG. 30 shows therein a dQ/dV curve therefor.

In addition, the first power storage pack 11 fabricated in the same way as in Example 1 and the second power storage pack 12 fabricated according to Example 9 were connected in parallel, thereby fabricating a power storage system.

Table 1 shows various types of data on the respective examples and reference examples.

From the results of Examples 1 to 9, it is determined that the use of $Li[Ni_xMn_{(2-x)}]O_4$ ($0.05 \leq x \leq 0.45$) as a positive electrode active material for a charge/discharge curve with a step makes it possible to design the second power storage pack 12 that satisfies at least one of the conditions (a), (b), and (c) and conditions (a), (d), and (e) mentioned above, in the case of using a lead storage battery pack as the first power storage pack 11.

In the case of the $Li[Ni_xMn_{(2-x)}]O_4$ ($0.05 \leq x \leq 0.45$), the positions of the start point of the step and of the end point of the step can be easily adjusted by adjusting the value of x in the active material composition and the synthesis condition, and the ratio between the capacity on the lower SOC side of the start point of the step and the capacity on the higher SOC side of the end point of the step can be thus easily adjusted. In addition, the positions of the start point of the step and of the end point of the step can be adjusted by not only the value of x and the synthesis condition, but also the addition of different types of elements (for example, Li, Ti, Al, Mg, B, Cr, Co) or the substitution of the different types of elements for Ni or Mn.

Example 10

Figure 31:
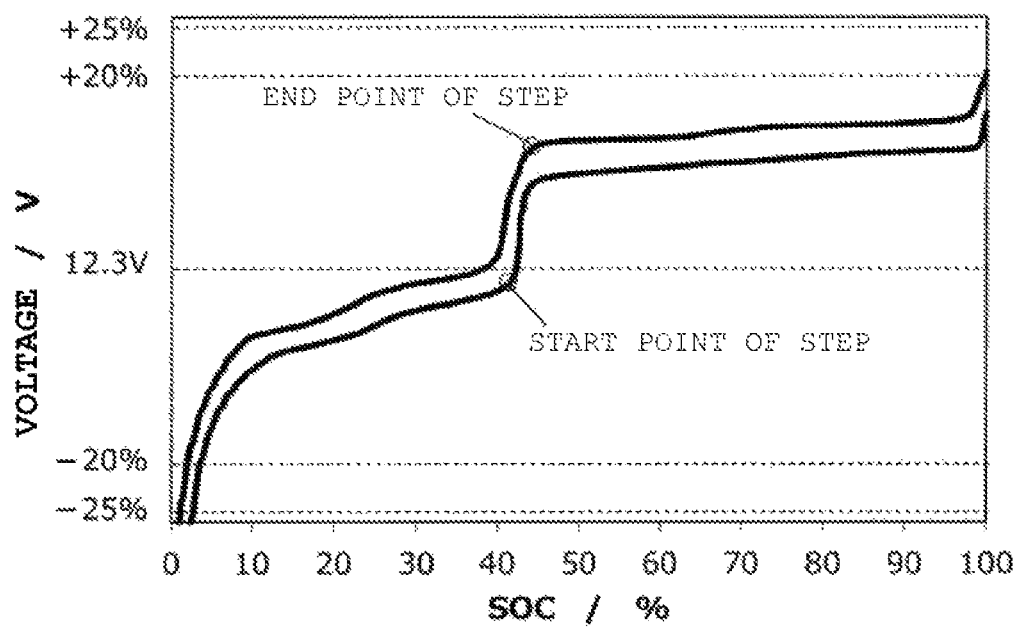
FIG. 31 is a charge/discharge curve for a second power storage pack 12 fabricated according to Example 10.
Figure 32:
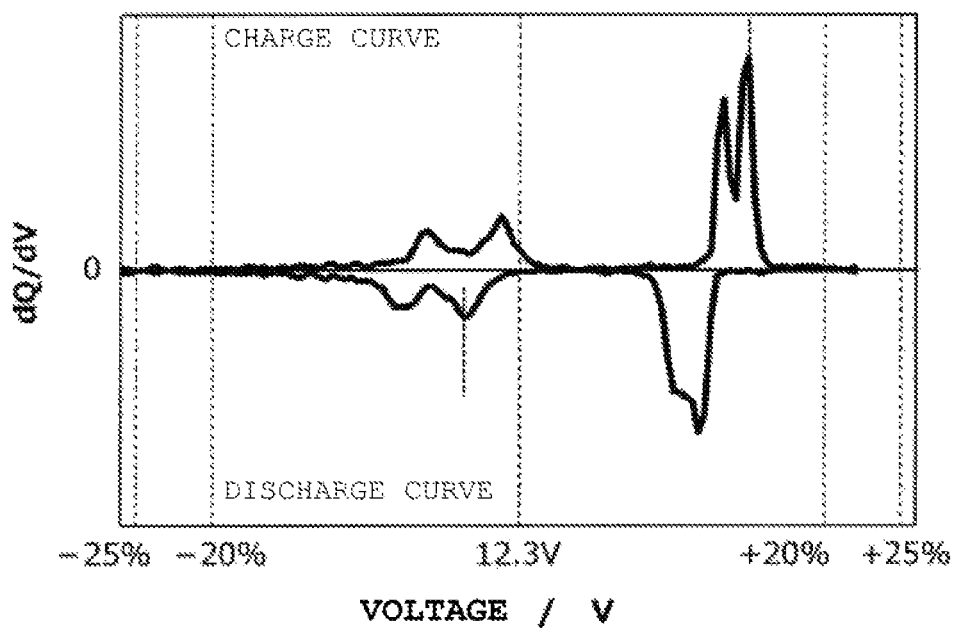
FIG. 32 is a curve (dQ/dV curve) obtained by differentiating the charge/discharge curve for the second power storage pack 12 fabricated according to Example 10 with respect to voltage.

Lithium ion storage battery devices 12a with A/C ratio=1.2 and capacity of 10 Ah were prepared with the use of, as a positive electrode active material, $LiMn_2O_4$ and $Li[Ni_{0.5}Mn_{1.5}]O_4$ mixed at 40:60 in ratio by weight and the use of graphite for a negative electrode active material. Three of the lithium ion storage battery devices 12a were connected in series as shown in FIG. 8, thereby fabricating a second power storage pack 12, and a charge/discharge curve was measured. FIG. 31 shows therein a charge/discharge curve for the second power storage pack 12, and FIG. 32 shows therein a dQ/dV curve therefor.

In addition, the first power storage pack 11 fabricated in the same way as in Example 1 and the second power storage pack 12 fabricated according to Example 10 were connected in parallel, thereby fabricating a power storage system.

Example 11

Figure 33:
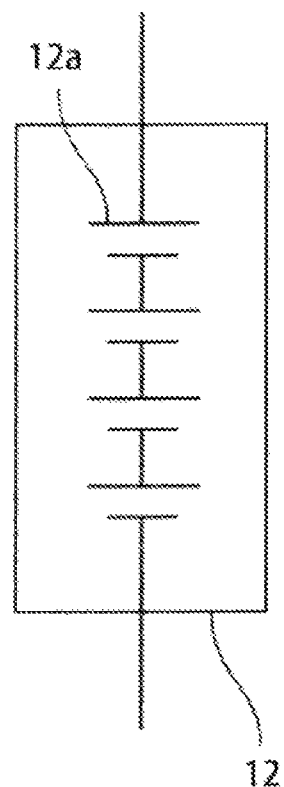
FIG. 33 is a schematic circuit diagram of a second power storage pack fabricated according to Example 11.
Figure 34:
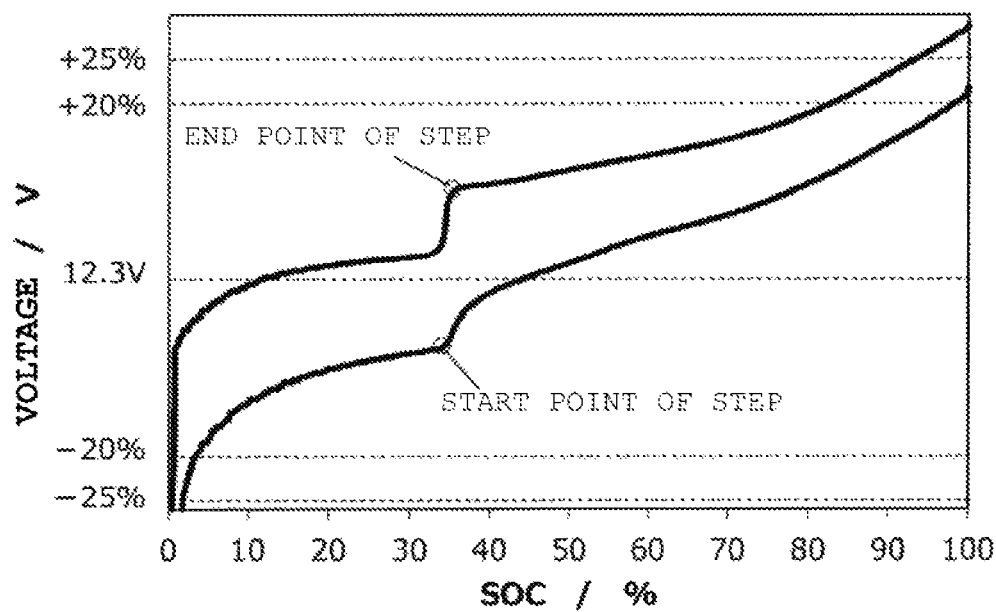
FIG. 34 is a charge/discharge curve for the second power storage pack 12 fabricated according to Example 11.
Figure 35:
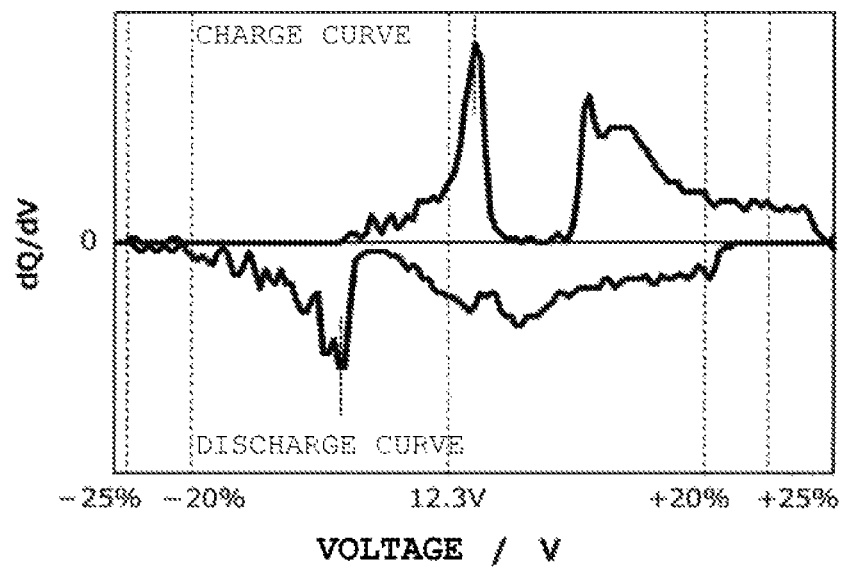
FIG. 35 is a curve (dQ/dV curve) obtained by differentiating the charge/discharge curve for the second power storage pack 12 fabricated according to Example 11 with respect to voltage.

Lithium ion storage batteries 12a with A/C ratio=3.0 and capacity of 10 Ah were prepared with the use of, as a positive electrode active material, $LiFePO_4$ and $LiNi_{1/3}Co_{1/3}Mn_{1/3}O_2$ mixed at 35:65 in ratio by weight and the use of Si as a negative electrode active material. Four of the lithium ion storage batteries 12a were connected in series as shown in FIG. 33, thereby fabricating a second power storage pack 12, and a charge/discharge curve was measured. FIG. 34 shows therein a charge/discharge curve for the second power storage pack 12, and FIG. 35 shows therein a dQ/dV curve therefor.

In addition, the first power storage pack 11 fabricated in the same way as in Example 1 and the second power storage pack 12 fabricated according to Example 11 were connected in parallel, thereby fabricating a power storage system.

Example 12

Figure 36:
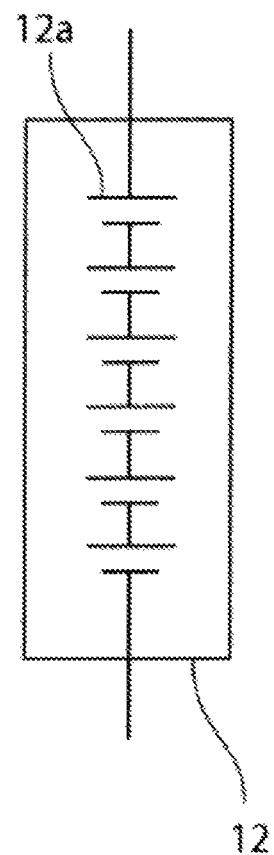
FIG. 36 is a schematic circuit diagram of a second power storage pack fabricated according to Example 12.
Figure 37:
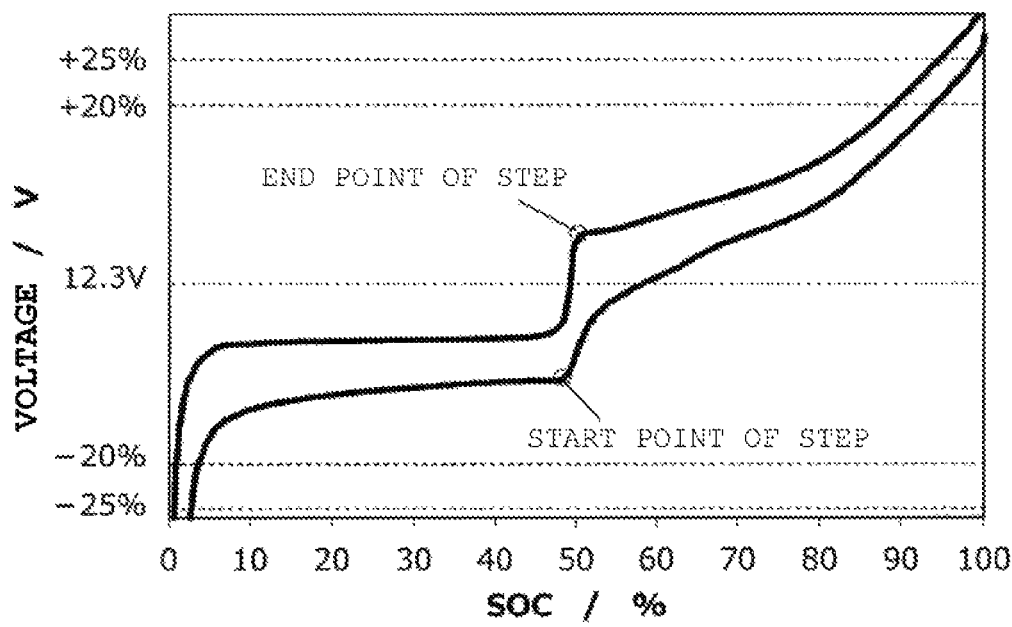
FIG. 37 is a charge/discharge curve for the second power storage pack 12 fabricated according to Example 12.
Figure 38:
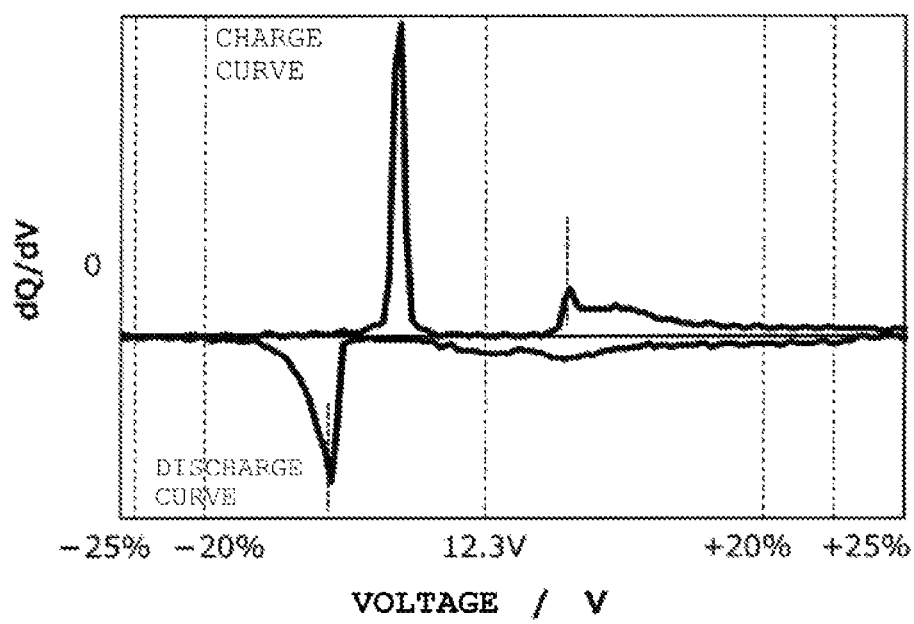
FIG. 38 is a curve (dQ/dV curve) obtained by differentiating the charge/discharge curve for the second power storage pack 12 fabricated according to Example 12 with respect to voltage.

Lithium ion storage batteries 12a with A/C ratio=1.2 and capacity of 10 Ah were prepared with the use of, as a positive electrode active material, $LiFePO_4$ and $LiNi_{1/3}Co_{1/3}Mn_{1/3}O_2$ mixed at 50:50 in ratio by weight and the use of $Li_4Ti_5O_{12}$ as a negative electrode active material. Six of the lithium ion storage batteries 12a were connected in series as shown in FIG. 36, thereby fabricating a second power storage pack 12, and a charge/discharge curve was measured. FIG. 37 shows therein a charge/discharge curve for the second power storage pack 12, and FIG. 38 shows therein a dQ/dV curve therefor.

In addition, the first power storage pack 11 fabricated in the same way as in Example 1 and the second power storage pack 12 fabricated according to Example 12 were connected in parallel, thereby fabricating a power storage system.

From the results of Examples 10 to 12, it is determined that the use of multiple types of positive electrode active materials makes it possible to design the second power storage pack 12 that satisfies at least one of the conditions (a), (b), and (c) and conditions (a), (d), and (e) mentioned above, in the case of using a lead storage battery pack as the first power storage pack 11. In addition, the positions of the start point and end point of the step of the charge/discharge curve can be easily adjusted by changing the mixture ratio of the positive electrode active material. Thus, the ratio between the capacity on the lower SOC side of the start point of the step and the capacity on the higher SOC side of the end point of the step can be easily adjusted.

Example 13

Figure 39:
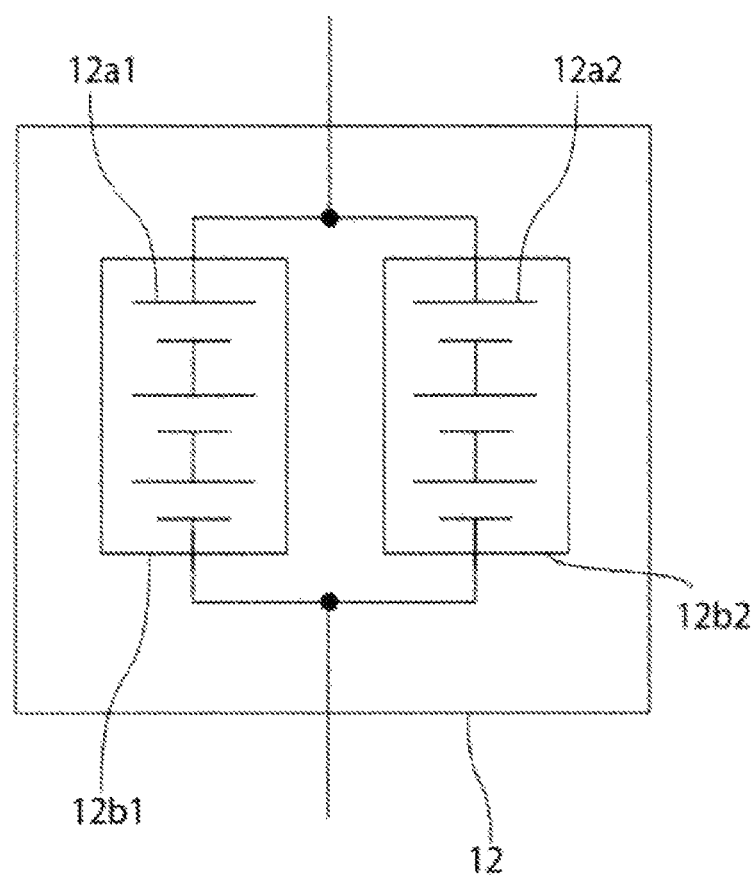
FIG. 39 is a schematic circuit diagram of a second power storage pack fabricated according to Example 13.

Lithium ion storage batteries 12a1 with A/C ratio=1.2 and capacity of 4 Ah were prepared with the use of $LiMn_2O_4$ as a positive electrode active material and the use of graphite as a negative electrode active material. In addition, lithium ion storage batteries 12a2 with A/C ratio=1.2 and capacity of 6 Ah were prepared with the use of $Li[Ni_{0.5}Mn_{1.5}]O_4$ as a positive electrode active material and the use of graphite as a negative electrode active material. Next, as shown in FIG. 39, a lithium ion power storage module 12b1 with three of the lithium ion storage batteries 12a1 connected in series and a lithium ion power storage module 12b2 with three of the lithium ion storage batteries 12a2 connected in series were connected in parallel, thereby fabricating a second power storage pack 12, and a charge/discharge curve was measured. The measured charge/discharge curve was similar to the charge/discharge curve (FIGS. 31, 32) according to Example 10.

In addition, the first power storage pack 11 fabricated in the same way as in Example 1 and the second power storage pack 12 fabricated according to Example 13 were connected in parallel, thereby fabricating a power storage system.

Example 14

Figure 40:
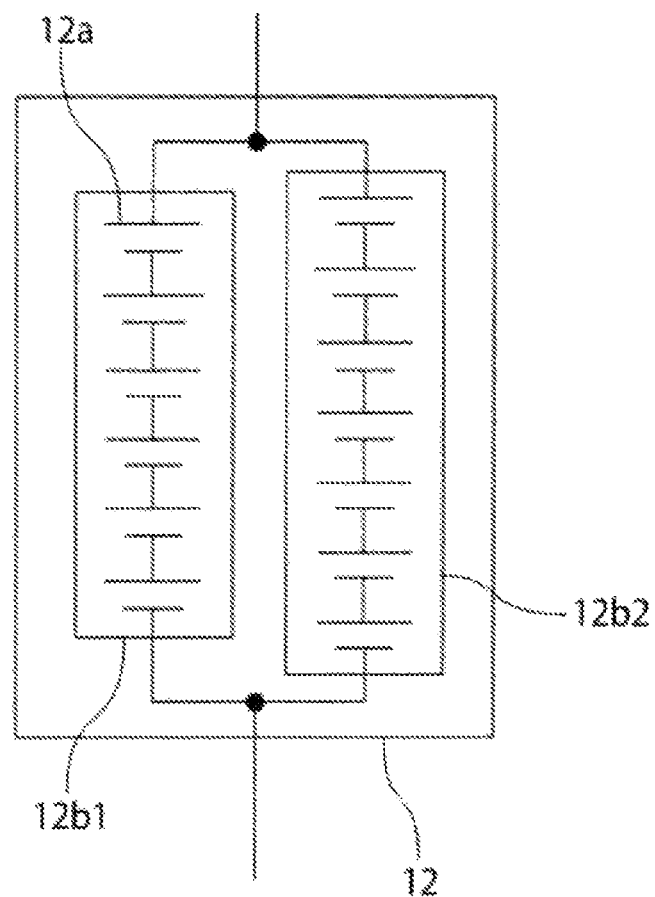
FIG. 40 is a schematic circuit diagram of a second power storage pack fabricated according to Example 14.
Figure 41:
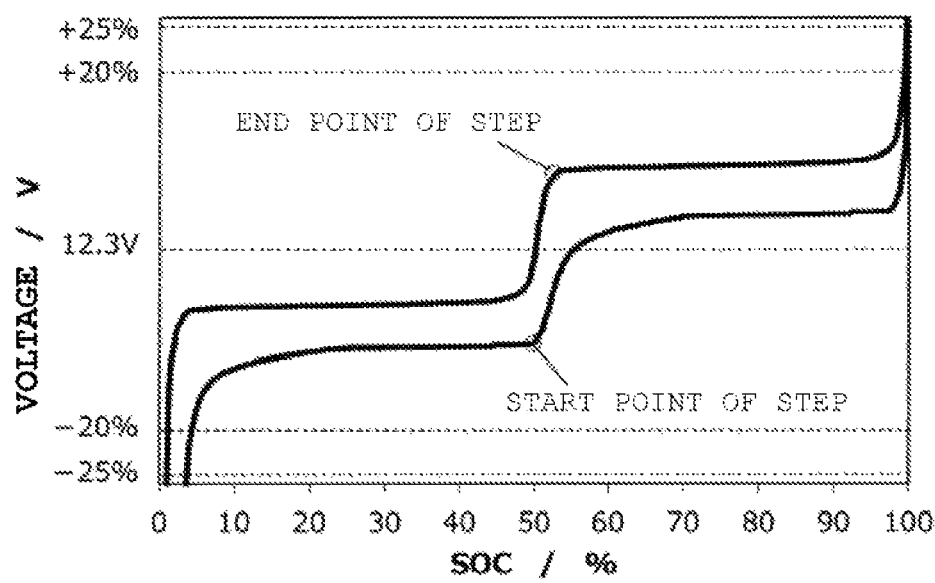
FIG. 41 is a charge/discharge curve for the second power storage pack 12 fabricated according to Example 14.
Figure 42:
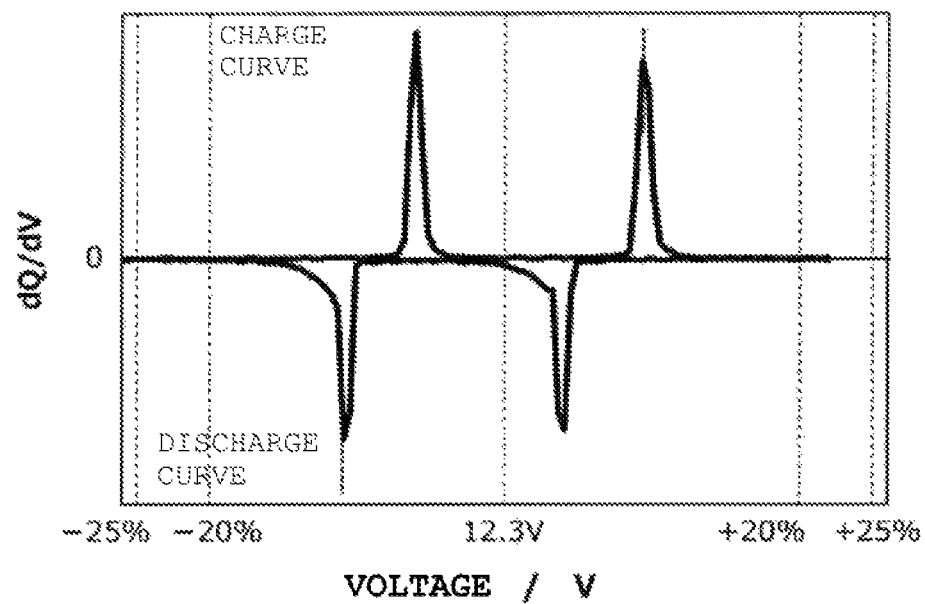
FIG. 42 is a curve (dQ/dV curve) obtained by differentiating the charge/discharge curve for the second power storage pack 12 fabricated according to Example 14 with respect to voltage.

Lithium ion storage batteries 12a with A/C ratio=1.2 and capacity of 5 Ah were prepared with the use of $LiFePO_4$ as a positive electrode active material and the use of $Li_4Ti_5O_{12}$ as a negative electrode active material. Next, as shown in FIG. 40, a lithium ion power storage module 12b1 composed of six of the lithium ion storage batteries 12a connected in series and a lithium ion power storage module 12b2 composed of seven of the lithium ion storage batteries 12a connected in series were connected in parallel, thereby fabricating a second power storage pack 12, and a charge/discharge curve was measured. FIG. 41 shows therein a charge/discharge curve for the second power storage pack 12, and FIG. 42 shows therein a dQ/dV curve therefor.

In addition, the first power storage pack 11 fabricated in the same way as in Example 1 and the second power storage pack 12 fabricated according to Example 14 were connected in parallel, thereby fabricating a power storage system.

As can be seen from the result of Example 14, it is determined that the parallel connection of multiple power storage modules that differ in number of series connections makes it possible to design the second power storage pack 12 that satisfies at least one of the conditions (a), (b), and (c) and conditions (a), (d), and (e) mentioned above, in the case of using a lead storage battery pack as the first power storage pack 11. In addition, when the capacity ratio between the two power storage modules is changed, the positions of the start point of the step and of the end point of the step can be adjusted, and the ratio between the capacity on the lower SOC side of the start point of the step and the capacity on the higher SOC side of the end point of the step can be thus also adjusted.

Example 15

Figure 43:
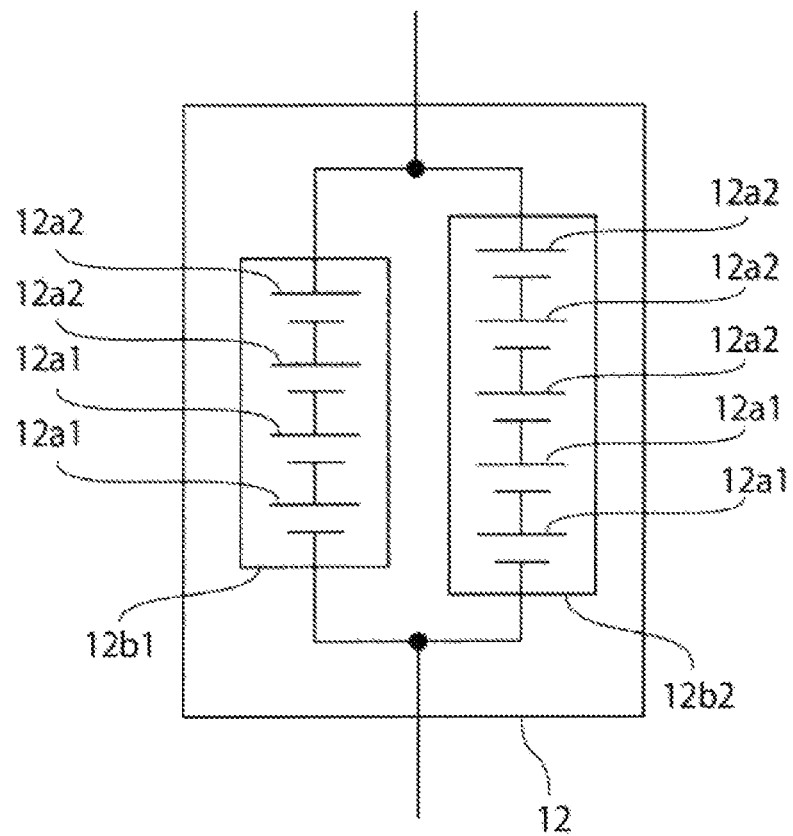
FIG. 43 is a schematic circuit diagram of a second power storage pack fabricated according to Example 15.
Figure 44:
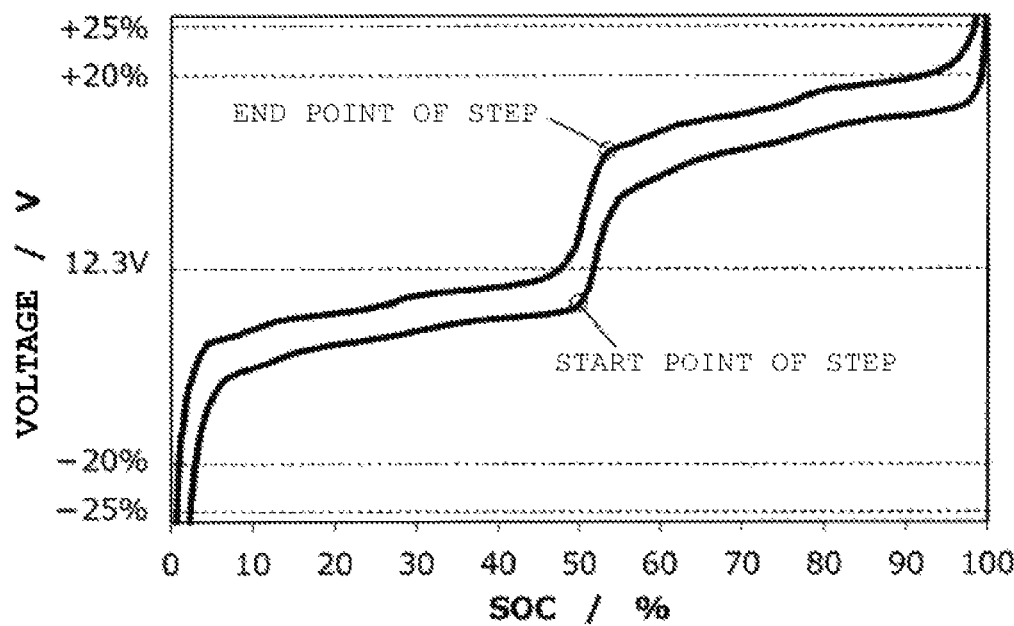
FIG. 44 is a charge/discharge curve for the second power storage pack 12 fabricated according to Example 15.
Figure 45:
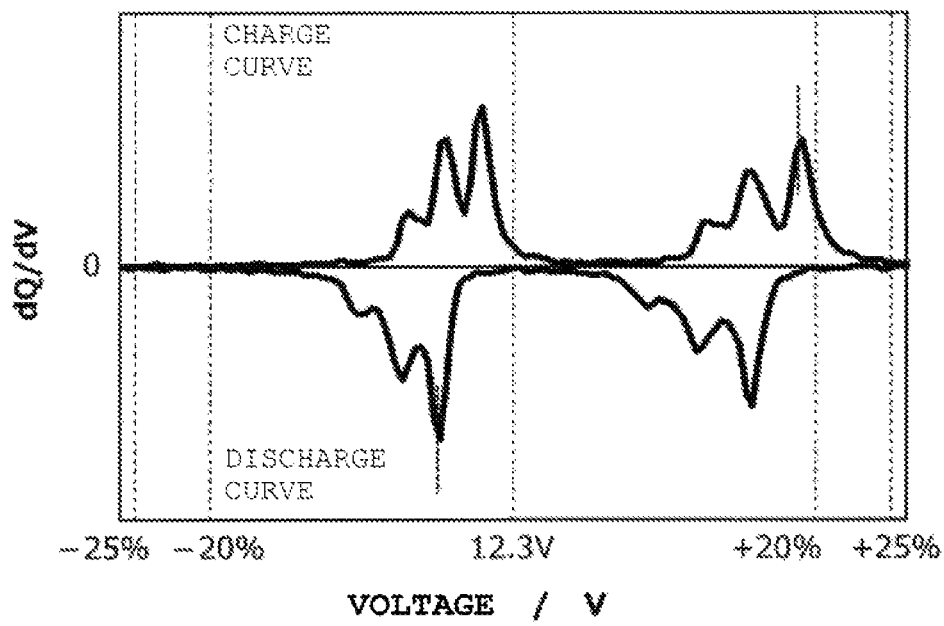
FIG. 45 is a curve (dQ/dV curve) obtained by differentiating the charge/discharge curve for the second power storage pack 12 fabricated according to Example 15 with respect to voltage.

Lithium ion storage batteries 12a1 with A/C ratio=1.2 and capacity of 5 Ah were prepared with the use of $LiFePO_4$ as a positive electrode active material and the use of graphite as a negative electrode active material. Lithium ion storage batteries 12a2 with A/C ratio=1.2 and capacity of 5 Ah were prepared with the use of $LiMn_2O_4$ as a positive electrode active material and the use of $Li_4Ti_5O_{12}$ for a negative electrode active material. Next, as shown in FIG. 43, a lithium ion power storage module 12b1 composed of two of the lithium ion storage batteries 12a1 and two of the lithium ion storage batteries 12a2 connected in series, and a lithium ion power storage module 12b2 composed of two of the lithium ion storage batteries 12a1 and three of the lithium ion storage batteries 12a2 connected in series were connected in parallel, thereby fabricating a second power storage pack 12, and a charge/discharge curve was measured. FIG. 44 shows therein a charge/discharge curve for the second power storage pack 12, and FIG. 45 shows therein a dQ/dV curve therefor.

In addition, the first power storage pack 11 fabricated in the same way as in Example 1 and the second power storage pack 12 fabricated according to Example 15 were connected in parallel, thereby fabricating a power storage system.

From the result presented in Example 15, it is determined that the parallel connection of multiple power storage modules that use different types of lithium ion storage batteries makes it possible to design the second power storage pack 12 that satisfies at least one of the conditions (a), (b), and (c) and conditions (a), (d), and (e) mentioned above, in the case of using a lead storage battery pack as the first power storage pack 11. In addition, changing the capacity ratio between the two power storage modules can adjust the positions of the start point of the step and of the end point of the step, and thus also adjust the ratio between the capacity on the lower SOC side of the start point of the step and the capacity on the higher SOC side of the end point of the step.

Example 16

Figure 46:
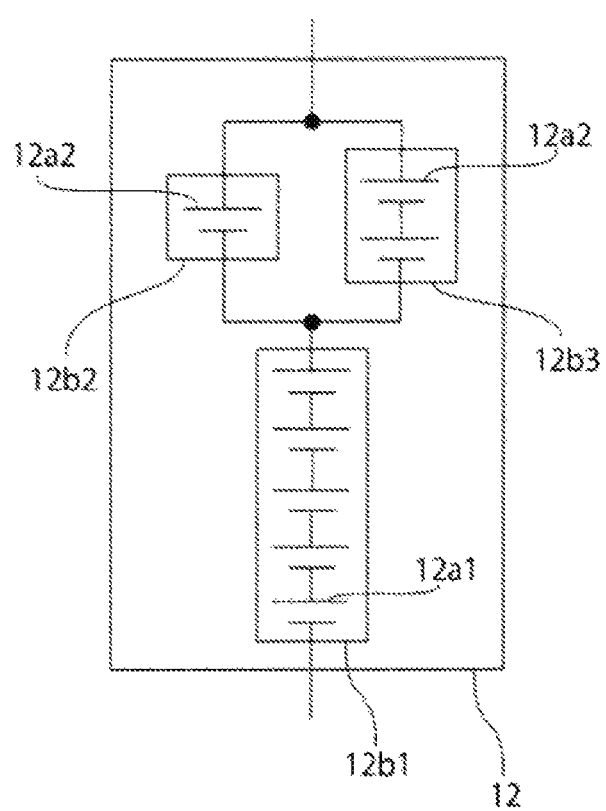
FIG. 46 is a schematic circuit diagram of a second power storage pack fabricated according to Example 16.

Lithium ion storage batteries 12a1 with A/C ratio=0.8 and capacity of 10 Ah were prepared with the use of $LiFePO_4$ for a positive electrode active material and the use of $Li_4Ti_5O_{12}$ for a negative electrode active material. Next, lithium ion storage batteries 12a2 with A/C ratio=0.8 and capacity of 5 Ah were prepared with the use of the same positive electrode active material and negative electrode active material as used for the preparation of the lithium ion storage batteries 12a1. Next, as shown in FIG. 46, a second power storage pack 12 was fabricated by connecting in series a lithium ion power storage module 12b1 composed of series-connected five of the lithium ion storage batteries 12a1 and a lithium ion power storage module 12b2 composed of one of the lithium ion storage batteries 12a2, and furthermore, connecting a lithium ion power storage module 12b3 composed of series-connected two of the lithium ion storage batteries 12a2 in parallel to the lithium ion power storage module 12b2, and a charge/discharge curve was measured. The measured charge/discharge curve was similar to the charge/discharge curve (FIGS. 41, 42) according to Example 14.

In addition, the first power storage pack 11 fabricated in the same way as in Example 1 and the second power storage pack 12 fabricated according to Example 16 were connected in parallel, thereby fabricating a power storage system.

Example 17

Figure 47:
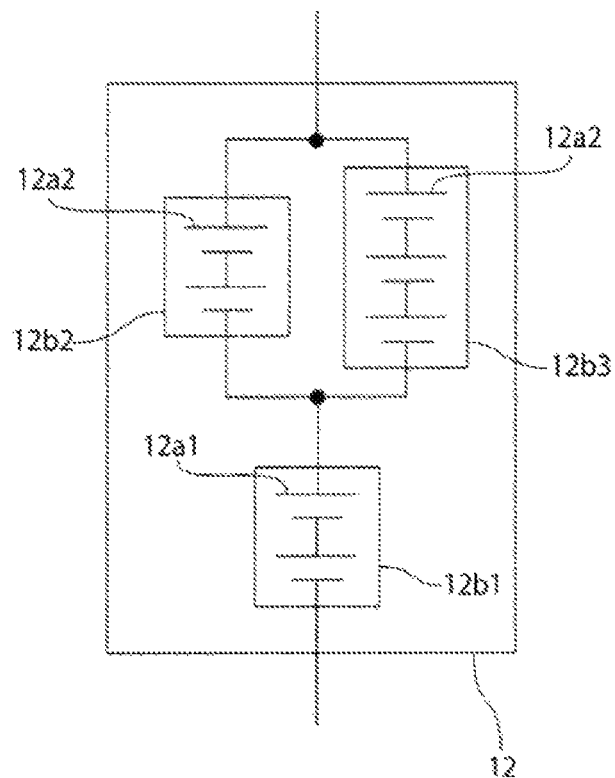
FIG. 47 is a schematic circuit diagram of a second power storage pack fabricated according to Example 17.

Lithium ion storage batteries 12a1 with A/C ratio=1.2 and capacity of 10 Ah were prepared with the use of $LiFePO_4$ as a positive electrode active material and the use of graphite as a negative electrode active material. In addition, lithium ion storage batteries 12a2 with A/C ratio=1.2 and capacity of 5 Ah were prepared with the use of LiMn$_2$O$_4$ as a positive electrode active material and the use of Li$_4$Ti$_5$O$_{12}$ as a negative electrode active material. Next, as shown in FIG. 47, a second power storage pack 12 was fabricated by connecting in series a lithium ion power storage module 12b1 composed of series-connected two of the lithium ion storage batteries 12a1 and a lithium ion power storage module 12b2 composed of series-connected two of the lithium ion storage batteries 12a2, and furthermore, connecting series-connected three lithium ion power storage modules 12b3 in parallel to the lithium ion power storage module 12b2, and a charge/discharge curve was measured. The measured charge/discharge curve was similar to the charge/discharge curve (FIGS. 44, 45) according to Example 15.

In addition, the first power storage pack 11 fabricated in the same way as in Example 1 and the second power storage pack 12 fabricated according to Example 17 were connected in parallel, thereby fabricating a power storage system.

Reference Example 3

Figure 48:
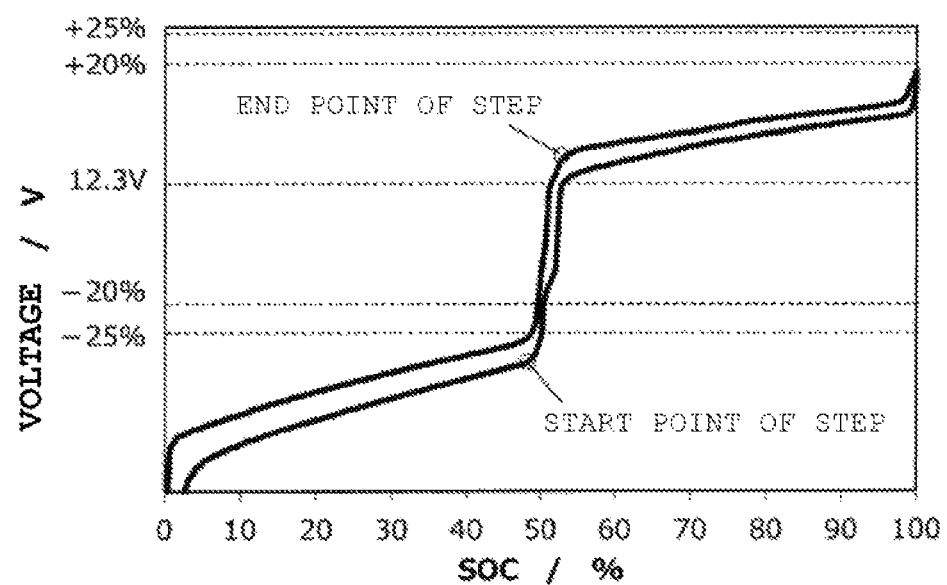
FIG. 48 is a charge/discharge curve for a second power storage pack 12 fabricated according to Reference Example 3.
Figure 49:
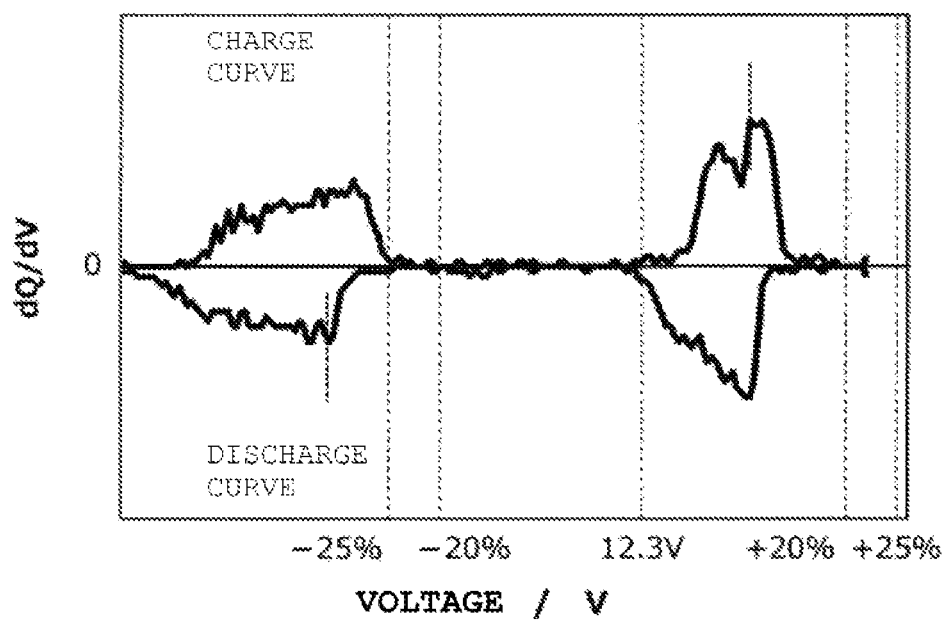
FIG. 49 is a curve (dQ/dV curve) obtained by differentiating the charge/discharge curve for the second power storage pack 12 fabricated according to Reference Example 3 with respect to voltage.

Lithium ion storage batteries 12a with A/C ratio=1.5 and capacity of 10 Ah were prepared with the use of, as a positive electrode active material, LiFePO$_4$ and Li[Ni$_{0.50}$Mn$_{1.50}$]O$_4$ mixed at 50:50 in ratio by weight and the use of hard carbon as a negative electrode active material. Three of the lithium ion storage batteries 12a were connected in series as shown in FIG. 8 as in Example 1, thereby fabricating a second power storage pack 12, and a charge/discharge curve was measured. FIG. 48 shows therein a charge/discharge curve for the second power storage pack 12, and FIG. 49 shows therein a dQ/dV curve therefor.

In addition, the first power storage pack 11 fabricated in the same way as in Example 1 and the second power storage pack 12 fabricated according to Reference Example 3 were connected in parallel, thereby fabricating a power storage system.

Reference Example 4

Figure 50:
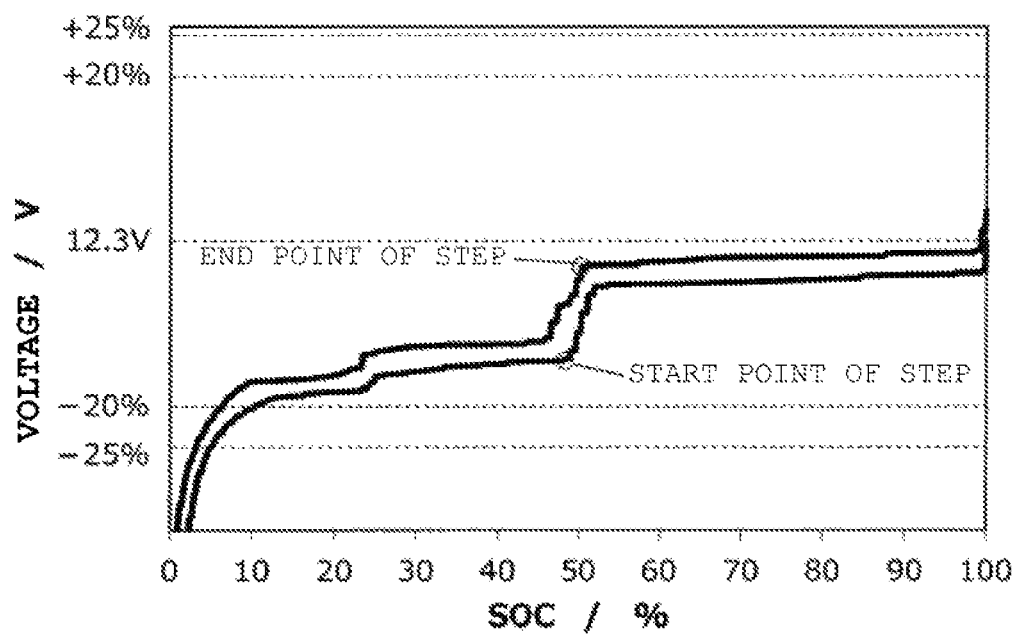
FIG. 50 is charge/discharge curve for a second power storage pack 12 fabricated according to Reference Example 4.
Figure 51:
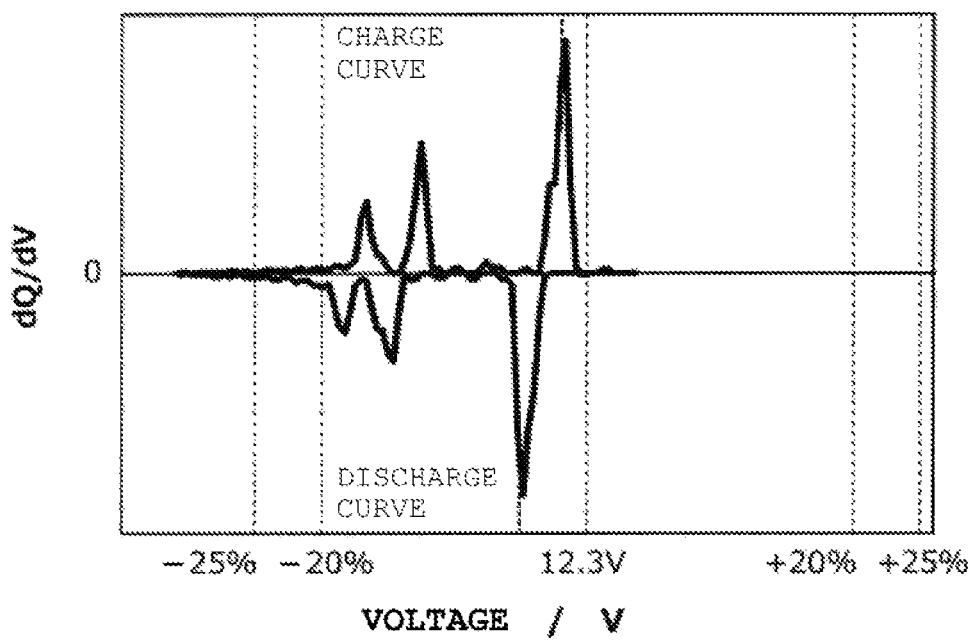
FIG. 51 is a curve (dQ/dV curve) obtained by differentiating the charge/discharge curve for the second power storage pack 12 fabricated according to Reference Example 4 with respect to voltage.

Lithium ion storage batteries 12a with A/C ratio=1.2 and capacity of 10 Ah were prepared with the use of Li$_3$V$_2$(PO$_4$)$_3$ as a positive electrode active material and the use of graphite as a negative electrode active material. The lithium ion storage batteries 12a were connected in series as shown in FIG. 8 as in Example 1, thereby fabricating a second power storage pack 12, and a charge/discharge curve was measured. FIG. 50 shows therein a charge/discharge curve for the second power storage pack 12, and FIG. 51 shows therein a dQ/dV curve therefor.

In addition, the first power storage pack 11 fabricated in the same way as in Example 1 and the second power storage pack 12 fabricated according to Reference Example 4 were connected in parallel, thereby fabricating a power storage system.

Reference Example 5

Figure 52:
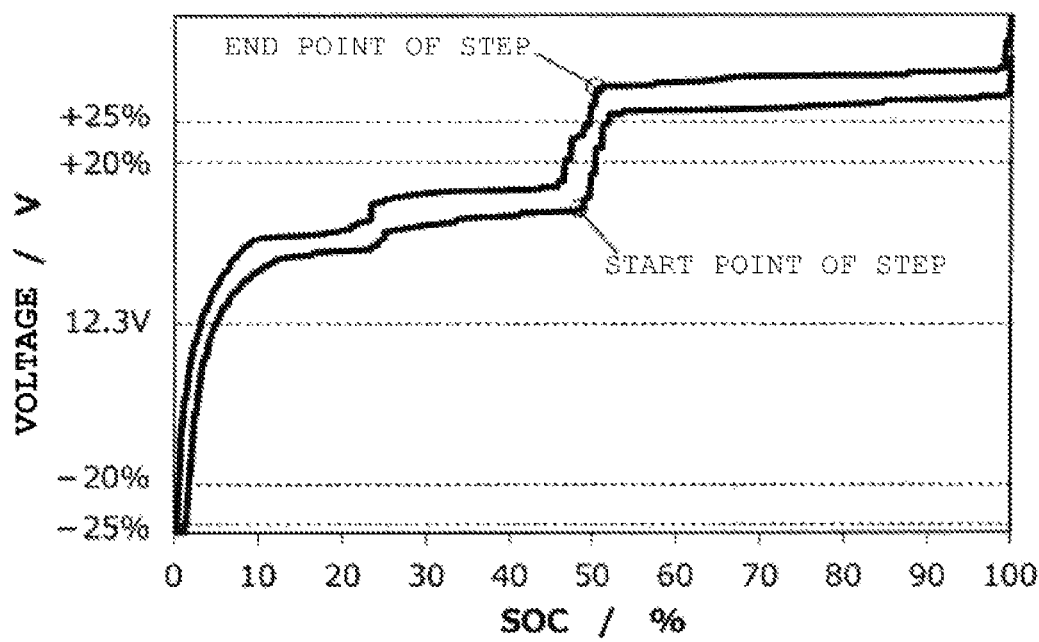
FIG. 52 is a charge/discharge curve for a second power storage pack 12 fabricated according to Reference Example 5.
Figure 53:
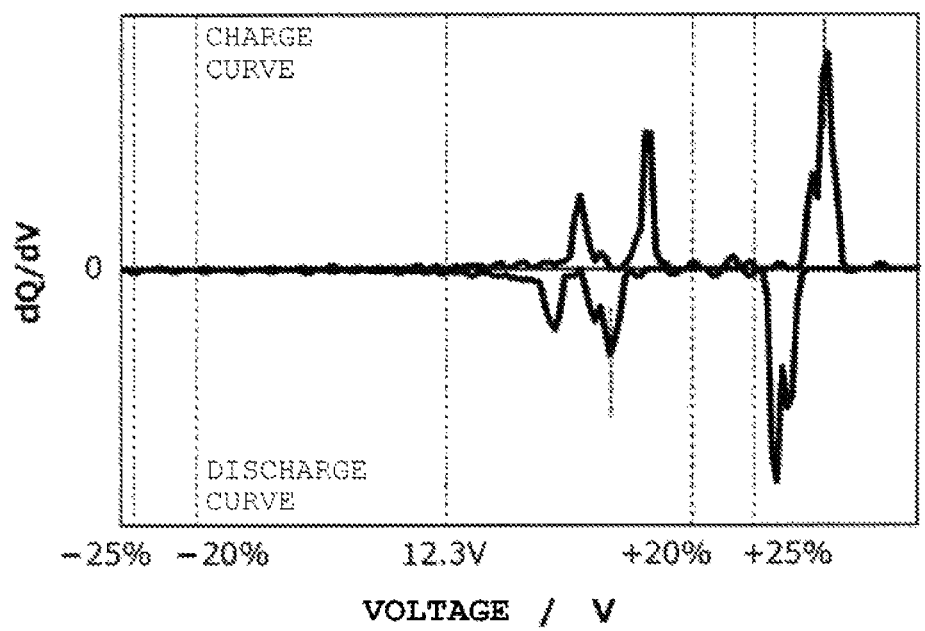
FIG. 53 is a curve (dQ/dV curve) obtained by differentiating the charge/discharge curve for the second power storage pack 12 fabricated according to Reference Example 5 with respect to voltage.

Lithium ion storage batteries 12a with A/C ratio=1.2 and capacity of 10 Ah were prepared with the use of Li$_3$V$_2$(PO$_4$)$_3$ as a positive electrode active material and the use of graphite as a negative electrode active material. Four of the lithium ion storage batteries 12a were connected in series as shown in FIG. 33, thereby fabricating a second power storage pack 12, and a charge/discharge curve was measured. FIG. 52 shows therein a charge/discharge curve for the second power storage pack 12, and FIG. 53 shows therein a dQ/dV curve therefor.

In addition, the first power storage pack 11 fabricated in the same way as in Example 1 and the second power storage pack 12 fabricated according to Reference Example 5 were connected in parallel, thereby fabricating a power storage system.

Reference Example 6

Figure 54:
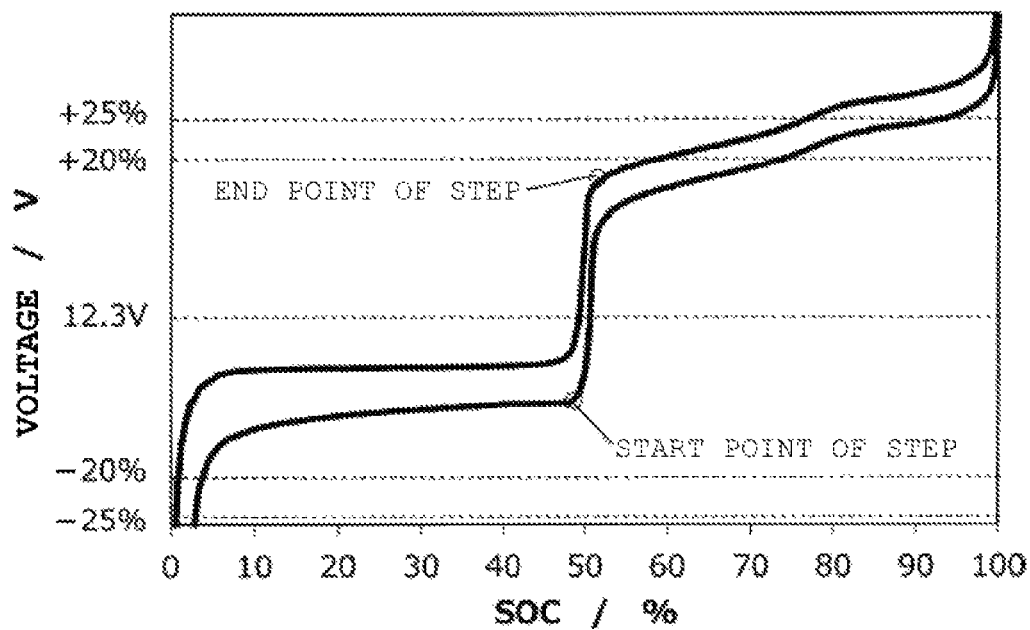
FIG. 54 is a charge/discharge curve for a second power storage pack 12 fabricated according to Reference Example 6.
Figure 55:
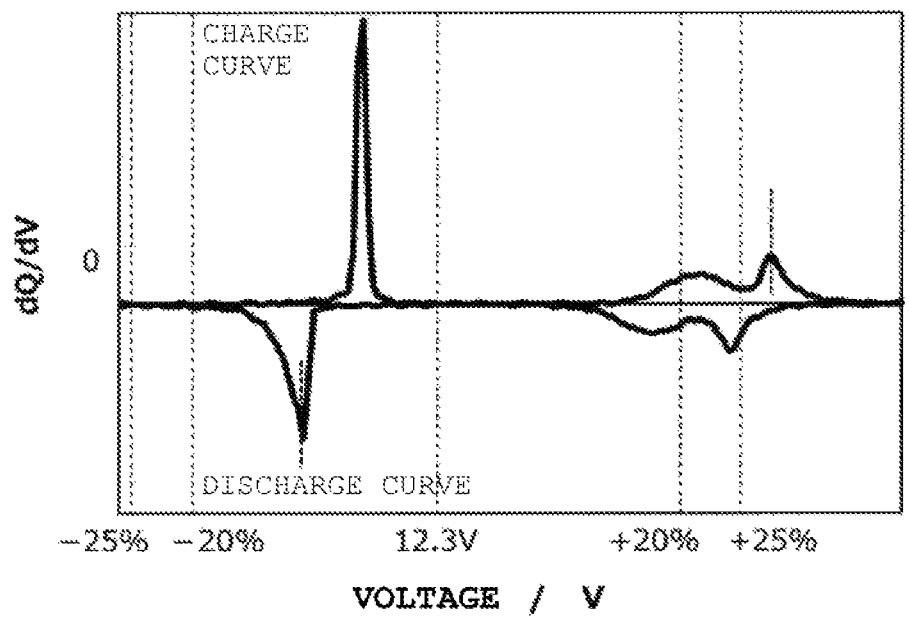
FIG. 55 is a curve (dQ/dV curve) obtained by differentiating the charge/discharge curve for the second power storage pack 12 fabricated according to Reference Example 6 with respect to voltage.

Lithium ion storage batteries 12a with A/C ratio=1.2 and capacity of 10 Ah were fabricated with the use of, as a positive electrode active material, LiFePO$_4$ and LiMn$_2$O$_4$ mixed at 50:50 in ratio by weight and the use of Li$_4$Ti$_5$O$_{12}$ as a negative electrode active material. Six of the lithium ion storage batteries 12a were connected in series as shown in FIG. 36, thereby fabricating a second power storage pack 12, and a charge/discharge curve was measured. FIG. 54 shows therein a charge/discharge curve for the second power storage pack 12, and FIG. 55 shows therein a dQ/dV curve therefor.

In addition, the first power storage pack 11 fabricated in the same way as in Example 1 and the second power storage pack 12 fabricated according to Reference Example 6 were connected in parallel, thereby fabricating a power storage system.

Reference Example 7

Figure 56:
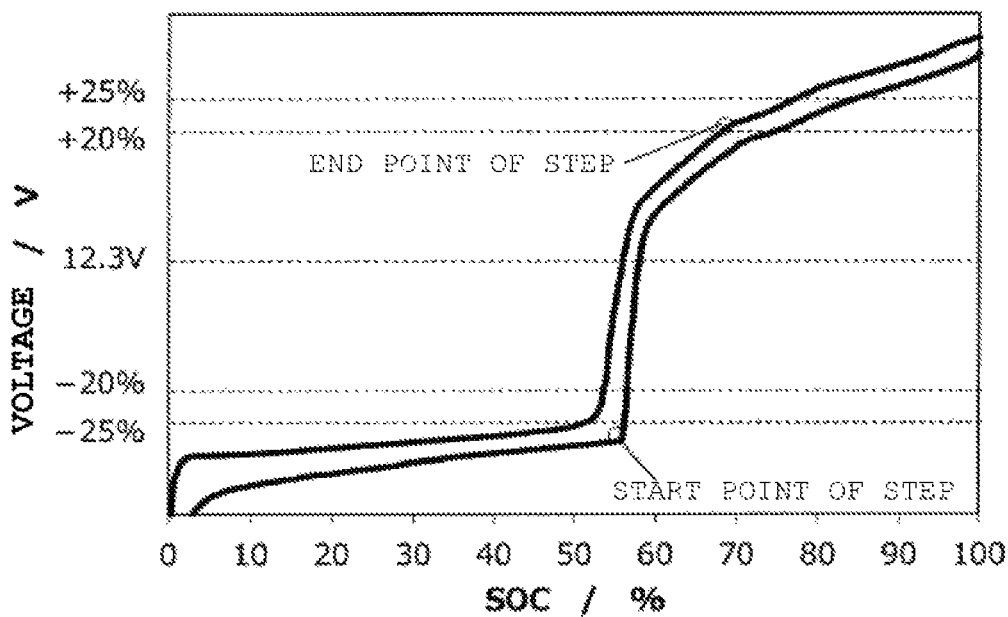
FIG. 56 is a charge/discharge curve for a second power storage pack 12 fabricated according to Reference Example 7.
Figure 57:
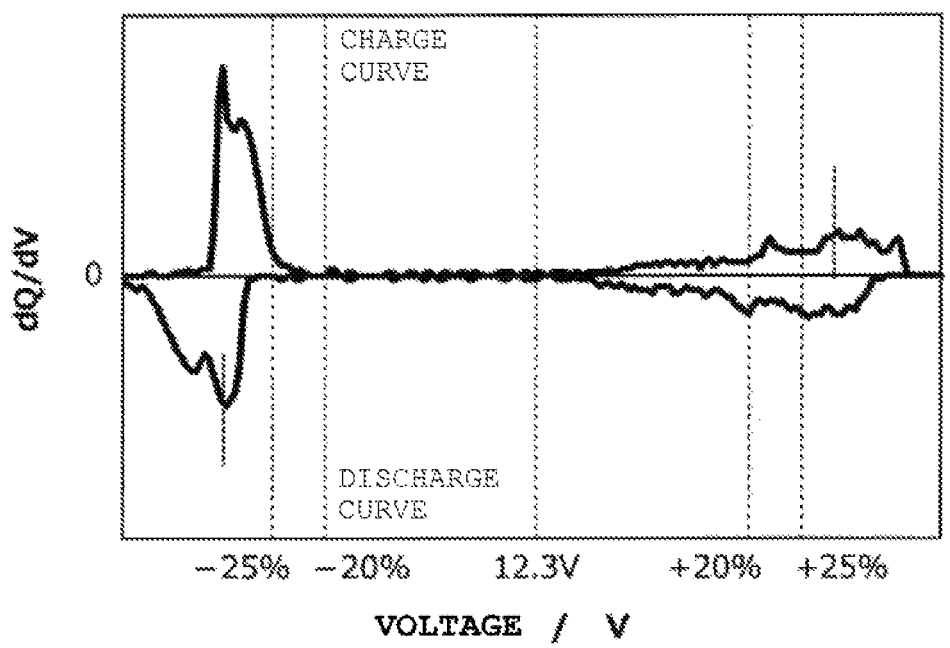
FIG. 57 is a curve (dQ/dV curve) obtained by differentiating the charge/discharge curve for the second power storage pack 12 fabricated according to Reference Example 7 with respect to voltage.

Lithium ion storage batteries 12a with A/C ratio=1.2 and capacity of 10 Ah were prepared with the use of LiNi$_{1/3}$Co$_{1/3}$Mn$_{1/3}$O$_2$ as a positive electrode active material and the use of, as a negative electrode active material, graphite and Li$_4$Ti$_5$O$_{12}$ mixed at 40:60 in ratio by weight. Four of the lithium ion storage batteries 12a were connected in series as shown in FIG. 33, thereby fabricating a second power storage pack 12, and a charge/discharge curve was measured. FIG. 56 shows therein a charge/discharge curve for the second power storage pack 12, and FIG. 57 shows therein a dQ/dV curve therefor.

In addition, the first power storage pack 11 fabricated in the same way as in Example 1 and the second power storage pack 12 fabricated according to Reference Example 7 were connected in parallel, thereby fabricating a power storage system.

Example 18

The 12 V lead storage battery packs used in Example 1 were connected in the form of two in series and two in parallel, thereby fabricating a 24 V first power storage pack 11. The open-circuit voltage of the first power storage pack 11 at SOC 50% was 24.6 V.

Figure 58:
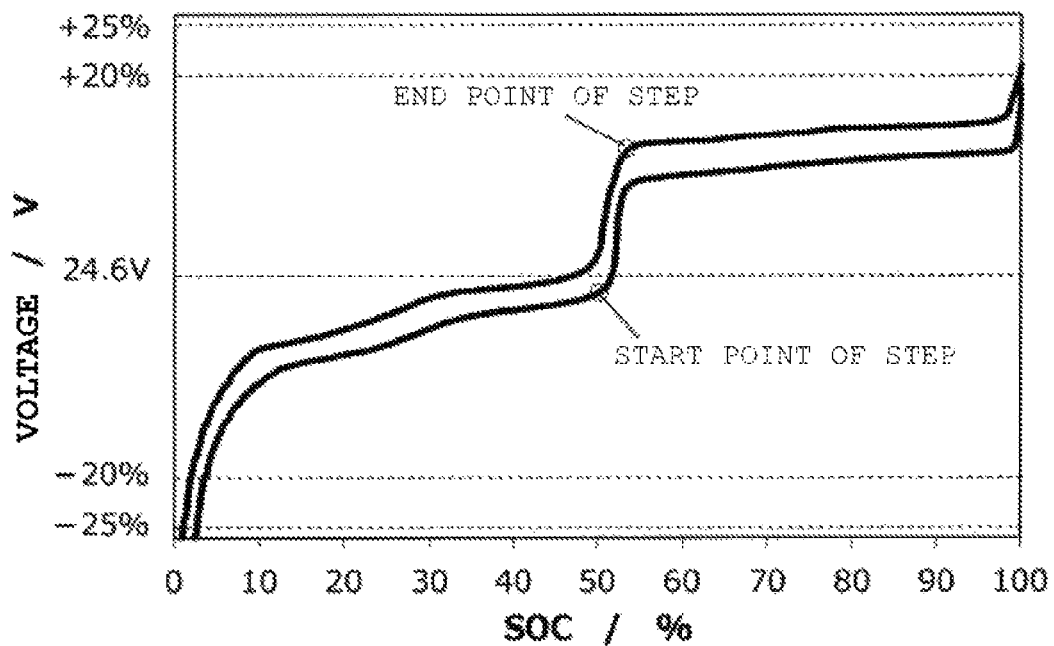
FIG. 58 is a charge/discharge curve for a second power storage pack 12 fabricated according to Example 18.
Figure 59:
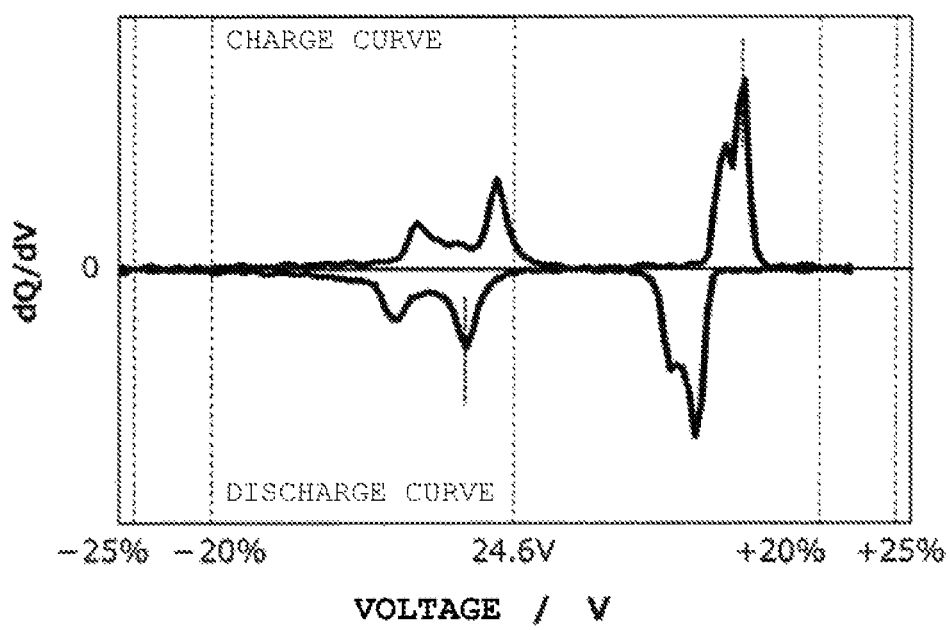
FIG. 59 is a curve (dQ/dV curve) obtained by differentiating the charge/discharge curve for the second power storage pack 12 fabricated according to Example 18 with respect to voltage.

Lithium ion storage batteries 12a with A/C ratio=1.2 and capacity of 20 Ah were prepared with the use of Li[Ni$_{0.25}$Mn$_{1.75}$]O$_4$ as a positive electrode active material and the use of graphite as a negative electrode active material. Six of the lithium ion storage batteries 12a were connected in series as shown in FIG. 36, thereby fabricating a second power storage pack 12, and a charge/discharge curve was measured. FIG. 58 shows therein a charge/discharge curve for the second power storage pack 12, and FIG. 59 shows therein a dQ/dV curve therefor.

In addition, the first power storage pack 11 and the second power storage pack fabricated according to Example 18 were connected in parallel, thereby fabricating a power storage system.

Example 19

The 12 V lead storage battery packs used in Example 1 were connected in the form of four in series and six in parallel, thereby fabricating a 48 V first power storage pack 11. The open-circuit voltage of the first power storage pack 11 at SOC 50% was 49.2 V.

Figure 60:
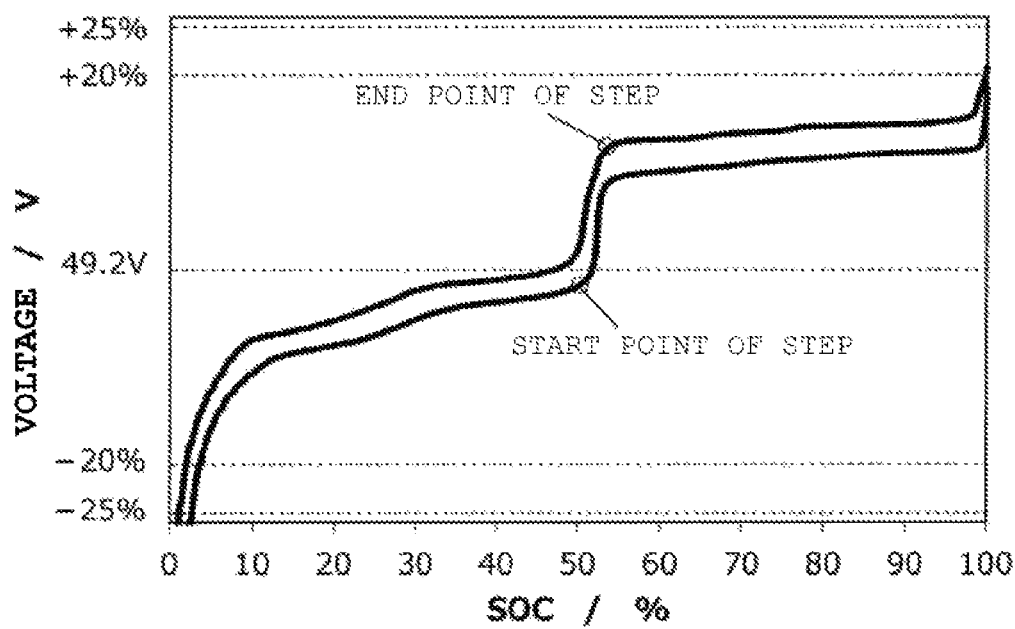
FIG. 60 is a charge/discharge curve for a second power storage pack 12 fabricated according to Example 19.
Figure 61:
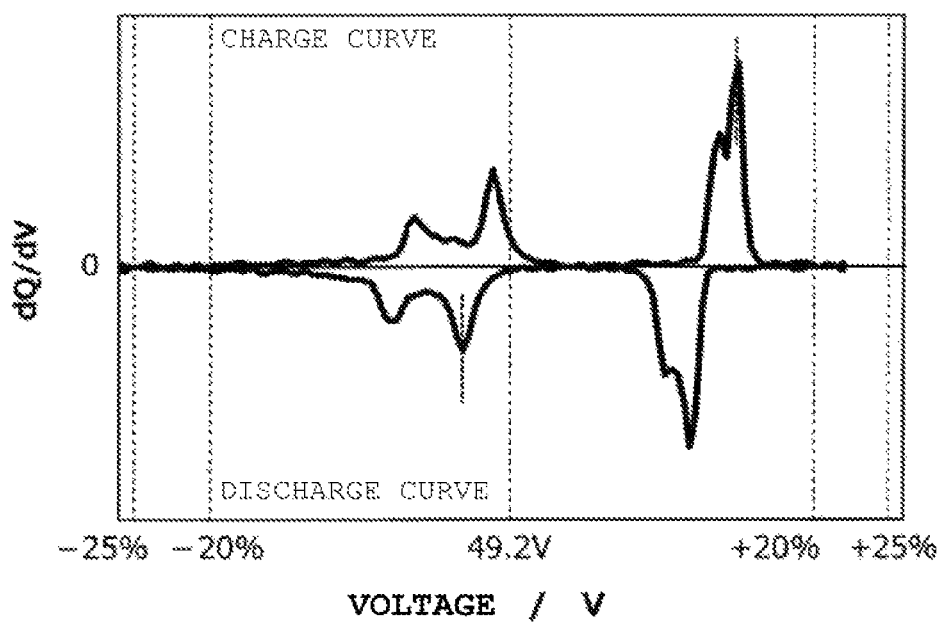
FIG. 61 is a curve (dQ/dV curve) obtained by differentiating the charge/discharge curve for the second power storage pack 12 fabricated according to Example 19 with respect to voltage.

Lithium ion storage batteries 12a with A/C ratio=1.2 and capacity of 50 Ah were prepared with the use of Li[Ni$_{0.25}$Mn$_{1.75}$]O$_4$ as a positive electrode active material and the use of graphite as a negative electrode active material. Twelve of the lithium ion storage batteries 12a were connected in series, thereby fabricating a second power storage pack 12, and a charge/discharge curve was measured. FIG. 60 shows therein a charge/discharge curve for the second power storage pack 12, and FIG. 61 shows therein a dQ/dV curve therefor.

In addition, the first power storage pack 11 and the second power storage pack fabricated according to Example 19 were connected in parallel, thereby fabricating a power storage system.

Example 20

The 12 V lead storage battery packs used in Example 1 were connected in the form of thirty in series and twenty in parallel, thereby fabricating a 360 V first power storage pack 11. The open-circuit voltage of the first power storage pack 11 at SOC 50% was 369 V.

Figure 62:
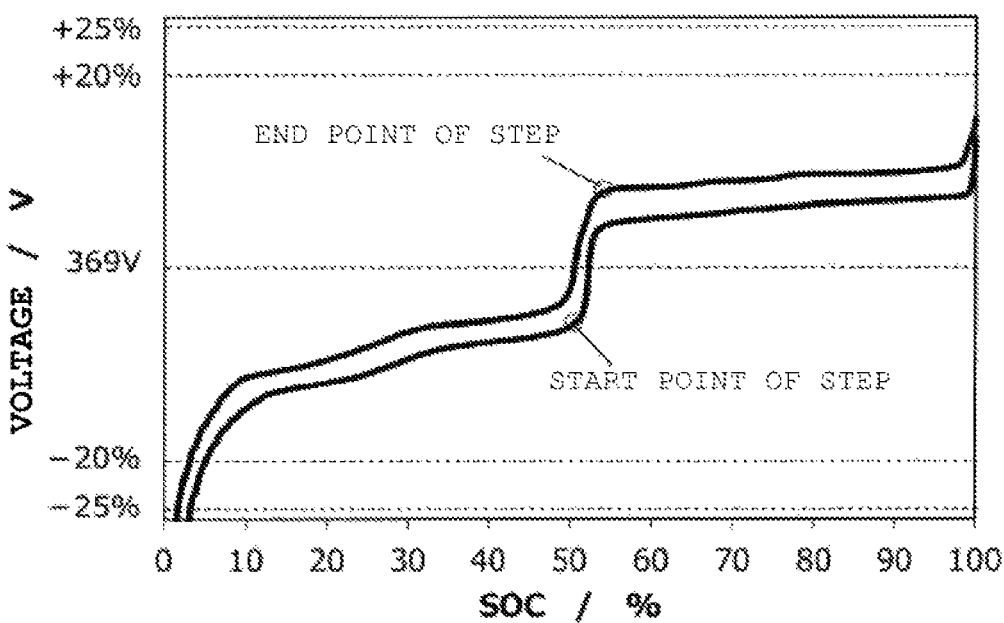
FIG. 62 is a charge/discharge curve for a second power storage pack 12 fabricated according to Example 20.
Figure 63:
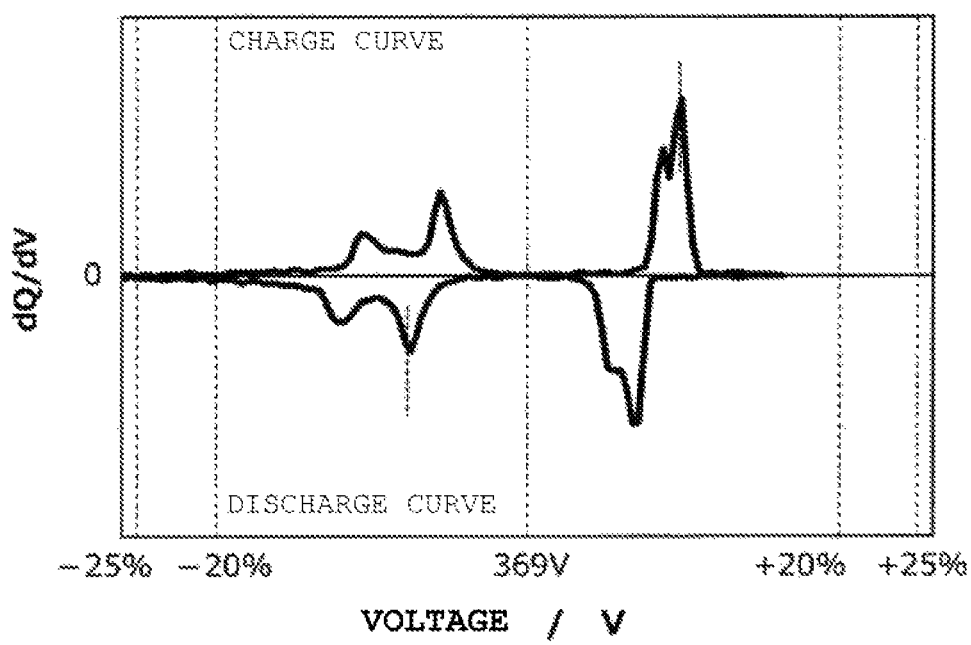
FIG. 63 is a curve (dQ/dV curve) obtained by differentiating the charge/discharge curve for the second power storage pack 12 fabricated according to Example 20 with respect to voltage.

Lithium ion storage batteries 12a with A/C ratio=1.2 and capacity of 100 Ah were prepared with the use of Li[Ni$_{0.25}$Mn$_{1.75}$]O$_4$ as a positive electrode active material and the use of graphite as a negative electrode active material. Eighty six of the lithium ion storage batteries 12a were connected in series, thereby fabricating a second power storage pack 12, and a charge/discharge curve was measured. FIG. 62 shows therein a charge/discharge curve for the second power storage pack 12, and FIG. 63 shows therein a dQ/dV curve therefor.

In addition, the first power storage pack 11 and the second power storage pack fabricated according to Example 20 were connected in parallel, thereby fabricating a power storage system.

Example 21

The 12 V lead storage battery packs used in Example 1 were connected in the form of forty in series and one hundred and twenty five in parallel, thereby fabricating a 1500 V first power storage pack 11. The open-circuit voltage of the first power storage pack 11 at SOC 50% was 1538 V.

Figure 64:
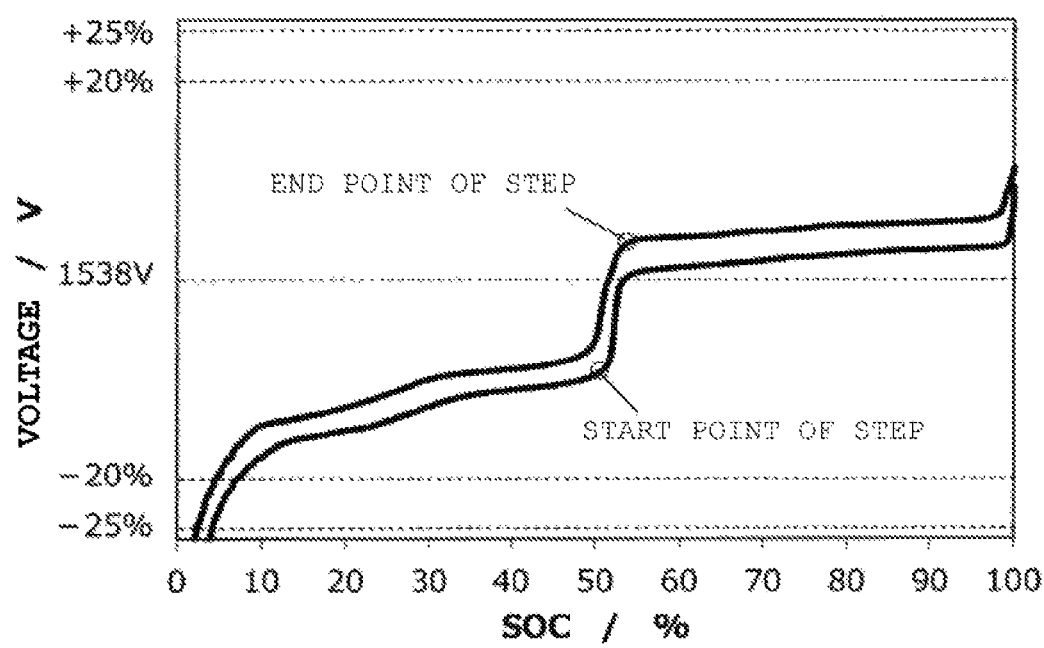
FIG. 64 is a charge/discharge curve for a second power storage pack 12 fabricated according to Example 21.
Figure 65:
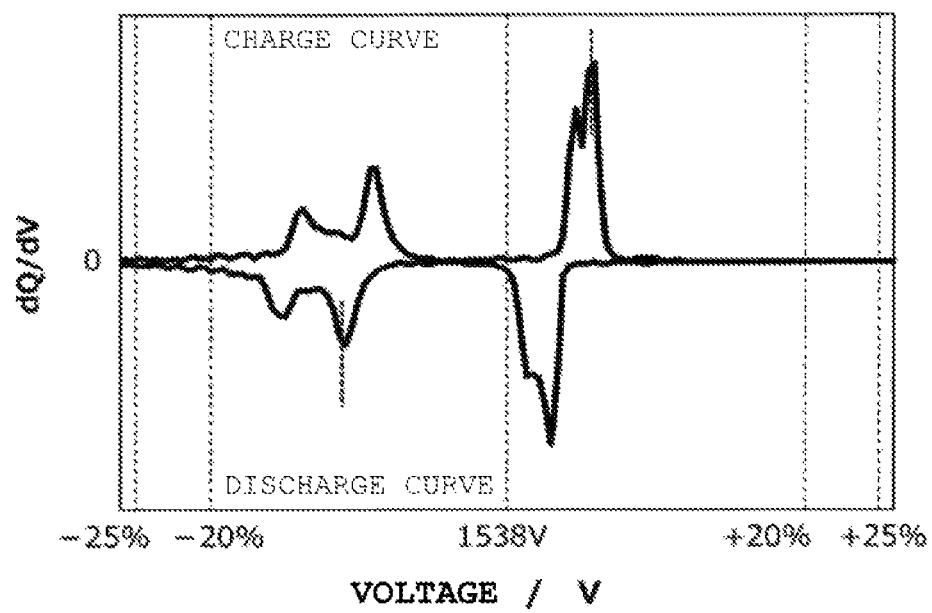
FIG. 65 is a curve (dQ/dV curve) obtained by differentiating the charge/discharge curve for the second power storage pack 12 fabricated according to Example 21 with respect to voltage.

Lithium ion storage batteries 12a with A/C ratio=1.2 and capacity of 200 Ah were prepared with the use of Li[Ni$_{0.25}$Mn$_{1.75}$]O$_4$ as a positive electrode active material and the use of graphite as a negative electrode active material. Three hundred and forty five of the lithium ion storage batteries 12a were connected in series, thereby fabricating a second power storage pack 12, and a charge/discharge curve was measured. FIG. 64 shows therein a charge/discharge curve for the second power storage pack 12, and FIG. 65 shows therein a dQ/dV curve therefor.

In addition, the first power storage pack 11 and the second power storage pack 12 fabricated according to Example 21 were connected in parallel, thereby fabricating a power storage system.

Example 22

Lithium ion storage batteries 12a with A/C ratio=1.2 and capacity of 0.5 Ah were prepared with the use of Li[Ni$_{0.25}$Mn$_{1.75}$]O$_4$ as a positive electrode active material and the use of graphite as a negative electrode active material. Three of the lithium ion storage batteries 12a were connected in series as shown in FIG. 8, thereby fabricating a second power storage pack 12. In addition, the first power storage pack 11 fabricated in the same way as in Example 1 and the second power storage pack fabricated according to Example 22 were connected in parallel, thereby fabricating a power storage system.

Example 23

Lithium ion storage batteries 12a with A/C ratio=1.2 and capacity of 1 Ah were prepared with the use of Li[Ni$_{0.25}$Mn$_{1.75}$]O$_4$ as a positive electrode active material and the use of graphite as a negative electrode active material. Three of the lithium ion storage batteries 12a were connected in series as shown in FIG. 8, thereby fabricating a second power storage pack 12. In addition, the first power storage pack 11 fabricated in the same way as in Example 1 and the second power storage pack fabricated according to Example 23 were connected in parallel, thereby fabricating a power storage system.

Example 24

Lithium ion storage batteries 12a with A/C ratio=1.2 and capacity of 5 Ah were prepared with the use of Li[Ni$_{0.25}$Mn$_{1.75}$]O$_4$ as a positive electrode active material and the use of graphite as a negative electrode active material. Three of the lithium ion storage batteries 12a were connected in series as shown in FIG. 8, thereby fabricating a second power storage pack 12. In addition, the first power storage pack 11 fabricated in the same way as in Example 1 and the second power storage pack fabricated according to Example 24 were connected in parallel, thereby fabricating a power storage system.

Example 25

Lithium ion storage batteries 12a with A/C ratio=1.2 and capacity of 20 Ah were prepared with the use of Li[Ni$_{0.25}$Mn$_{1.75}$]O$_4$ as a positive electrode active material and the use of graphite as a negative electrode active material. Three of the lithium ion storage batteries 12a were connected in series as shown in FIG. 8, thereby fabricating a second power storage pack 12. In addition, the first power storage pack 11 fabricated in the same way as in Example 1 and the second power storage pack fabricated according to Example 25 were connected in parallel, thereby fabricating a power storage system.

Example 26

Lithium ion storage batteries 12a with A/C ratio=1.2 and capacity of 45 Ah were prepared with the use of Li[Ni$_{0.25}$Mn$_{1.75}$]O$_4$ as a positive electrode active material and the use of graphite as a negative electrode active material. Three of the lithium ion storage batteries 12a were connected in series as shown in FIG. 8, thereby fabricating a second power storage pack 12. In addition, the first power storage pack 11 fabricated in the same way as in Example 1 and the second power storage pack fabricated according to Example 26 were connected in parallel, thereby fabricating a power storage system.

It is to be noted that the charge/discharge curves for the second power storage packs 12 fabricated according to Examples 22 to 26 are similar to the charge/discharge curve shown in FIG. 9. The dQ/dV curves for the second power storage packs 12 fabricated according to Examples 22 to 26 are similar to the dQ/dV curve shown in FIG. 10.

Example 27

Figure 66:
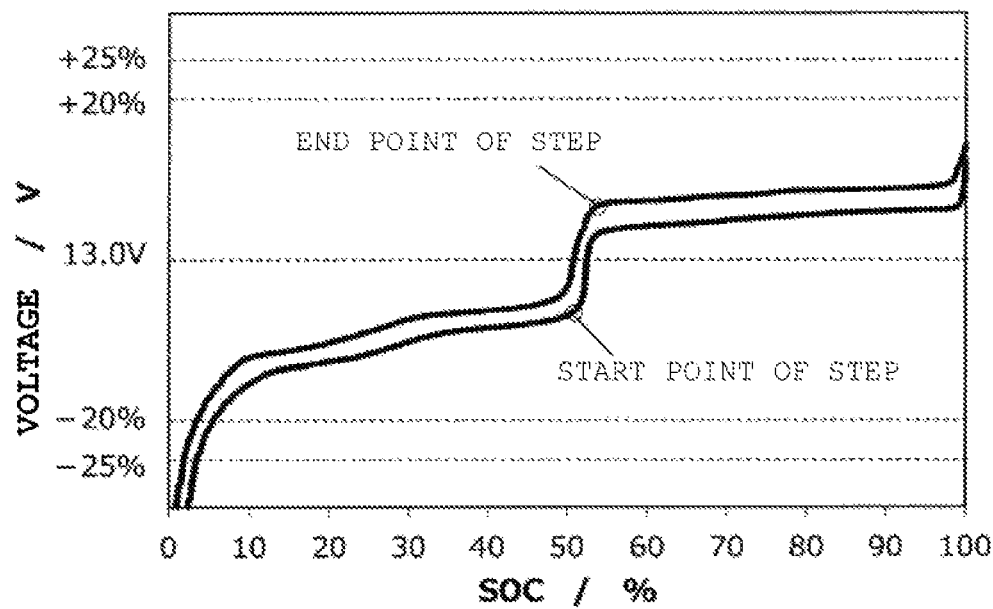
FIG. 66 is a charge/discharge curve for a second power storage pack 12 fabricated according to Example 27.
Figure 67:
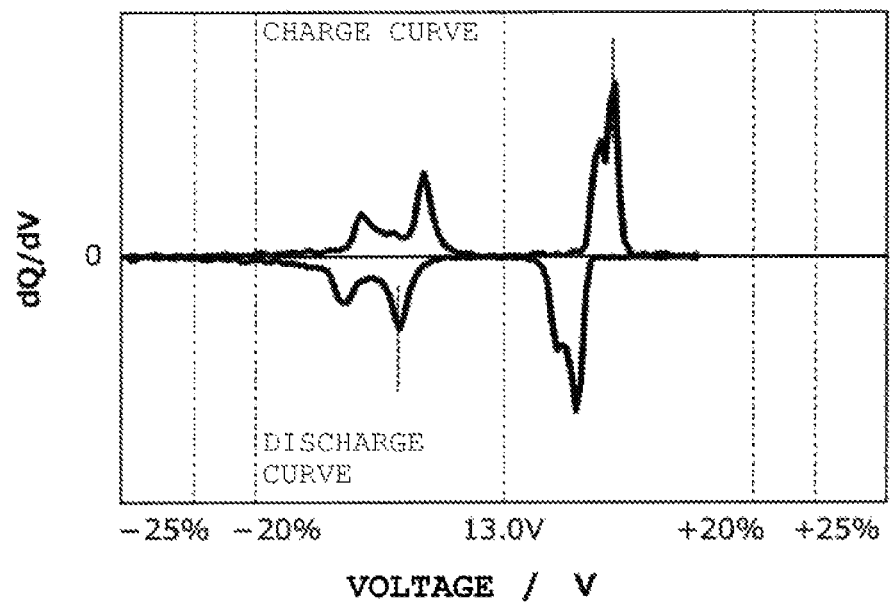
FIG. 67 is a curve (dQ/dV curve) obtained by differentiating the charge/discharge curve for the second power storage pack 12 fabricated according to Example 27 with respect to voltage.

Ten of nickel-metal-hydride storage batteries of 50 Ah in capacity were connected in series, thereby fabricating a first power storage pack 11. The OCV of the first power storage pack 11 at SOC 50% was 13.0 V. This first power storage pack 11 and a second power storage pack 12 fabricated in the same way as in Example 1 were used to fabricate a power storage system. For the second power storage pack 12, a charge/discharge curve was measured. FIG. 66 shows therein a charge/discharge curve for the second power storage pack 12, and FIG. 67 shows therein a dQ/dV curve therefor.

Example 28

Figure 68:
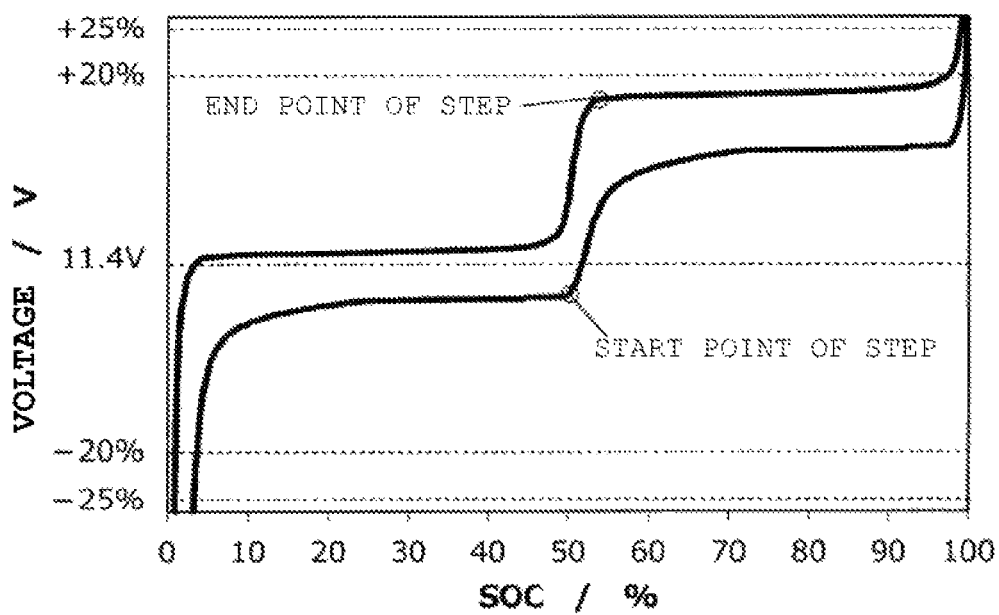
FIG. 68 is a charge/discharge curve for a second power storage pack 12 fabricated according to Example 28.
Figure 69:
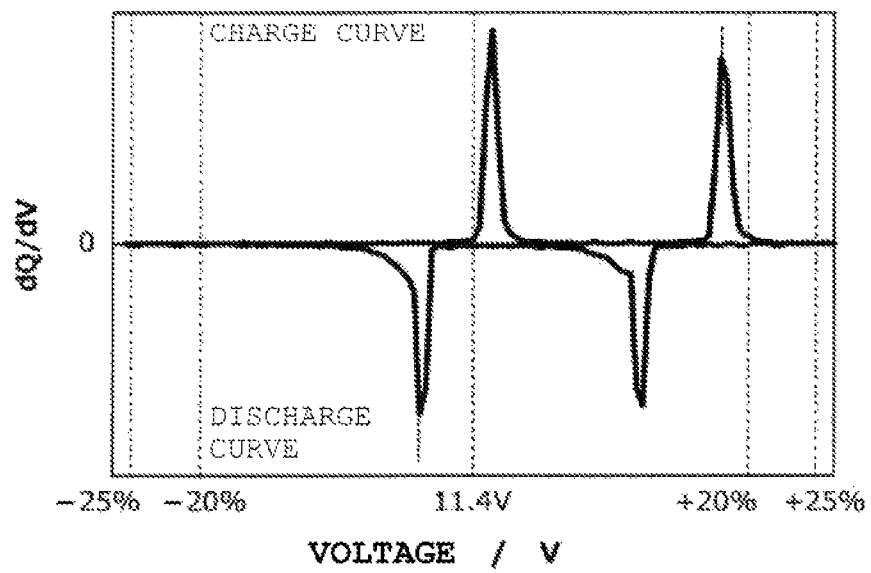
FIG. 69 is a curve (dQ/dV curve) obtained by differentiating the charge/discharge curve for the second power storage pack 12 fabricated according to Example 28 with respect to voltage.

Lithium ion storage batteries with A/C ratio=1.2 and capacity of 50 Ah were prepared with the use of $LiCoO_2$ for a positive electrode active material and the use of graphite for a negative electrode active material. Three of the lithium ion storage batteries were connected in series, thereby fabricating a first power storage pack 11. The OCV of the first power storage pack 11 at SOC 50% was 11.4 V. This first power storage pack 11 and a second power storage pack 12 fabricated in the same way as in Example 14 were used to fabricate a power storage system. For the second power storage pack 12, a charge/discharge curve was measured. FIG. 68 shows therein a charge/discharge curve for the second power storage pack 12, and FIG. 69 shows therein a dQ/dV curve therefor.

Example 29

Figure 70:
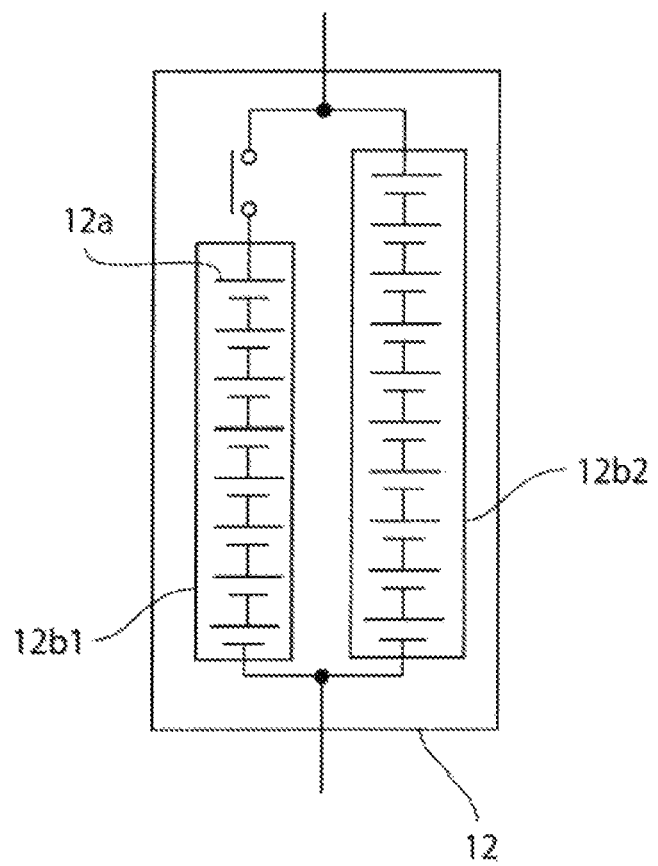
FIG. 70 is a schematic circuit diagram of a second power storage pack fabricated according to Example 29.
Figure 71:
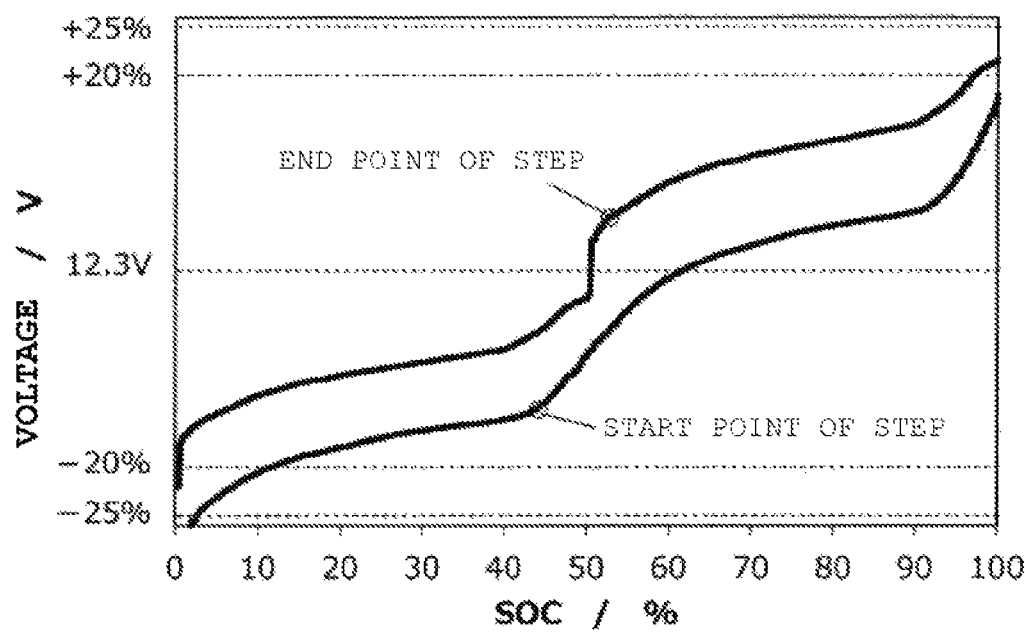
FIG. 71 is a charge/discharge curve for the second power storage pack 12 fabricated according to Example 29.
Figure 72:
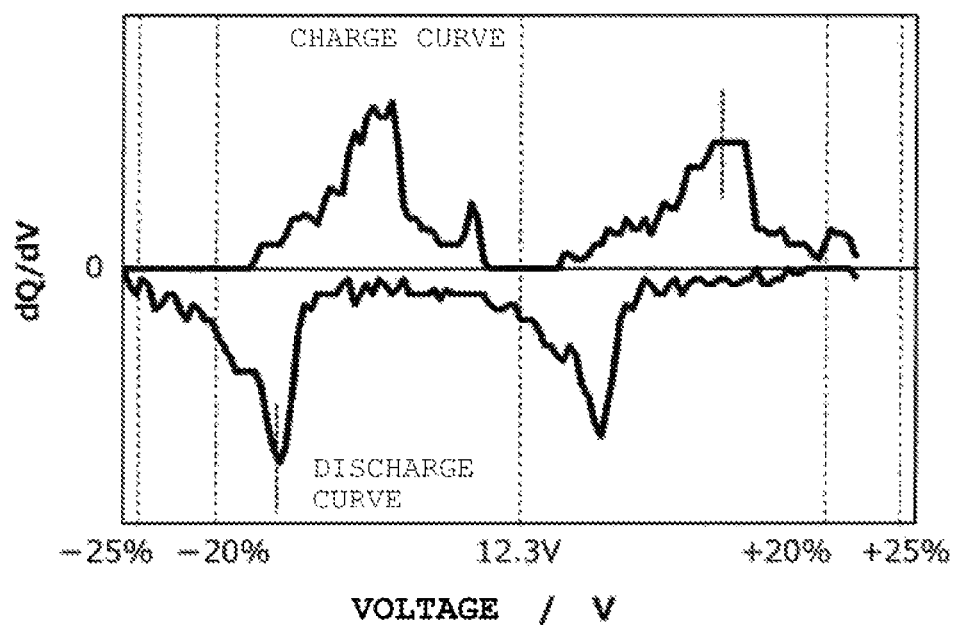
FIG. 72 is a curve (dQ/dV curve) obtained by differentiating the charge/discharge curve for the second power storage pack 12 fabricated according to Example 29 with respect to voltage.

A second power storage pack 12 was fabricated by connecting nickel-metal-hydride storage batteries 12a of 5 Ah each in capacity as shown in FIG. 70 to fabricate a power storage module 12b1 and a power storage module 12b2, and connecting a switch that was turned ON when the voltage of the power storage module 12b1 was 12.0 V or lower and turned OFF when the voltage was higher than 12.0 V. In the same way as in Example 1 except for the foregoing, a power storage system 1 was fabricated. FIG. 71 shows therein a charge/discharge curve for the second power storage pack 12, and FIG. 72 shows therein a dQ/dV curve therefor.

Example 30

Figure 73:
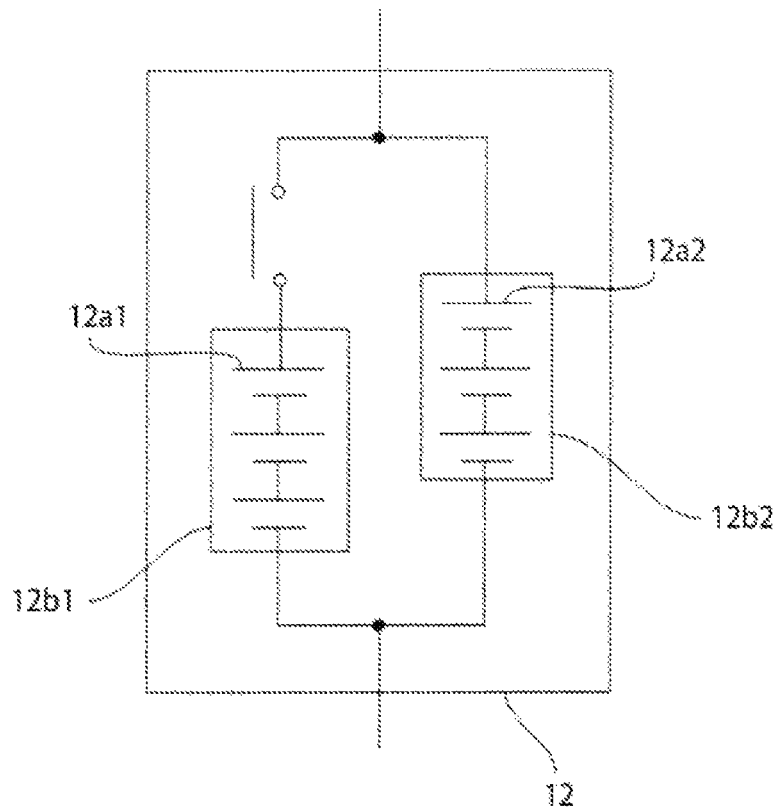
FIG. 73 is a schematic circuit diagram of a second power storage pack fabricated according to Example 30.
Figure 74:
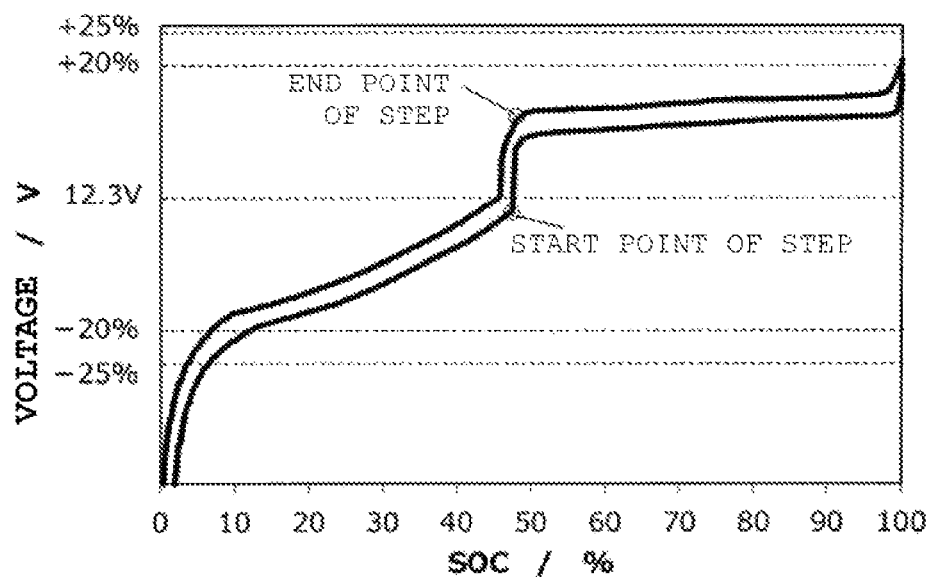
FIG. 74 is a charge/discharge curve for the second power storage pack 12 fabricated according to Example 30.
Figure 75:
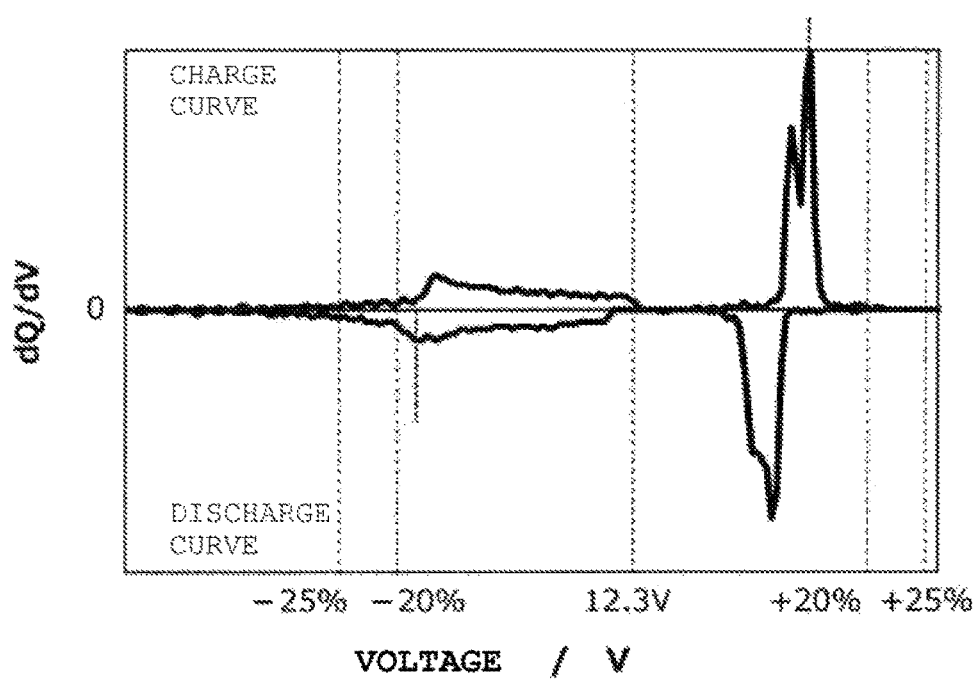
FIG. 75 is a curve (dQ/dV curve) obtained by differentiating the charge/discharge curve for the second power storage pack 12 fabricated according to Example 30 with respect to voltage.

Lithium ion storage batteries 12a1 with A/C ratio=1.2 and capacity of 4.5 Ah were prepared with the use of $LiNi_{0.80}Co_{0.15}Al_{0.05}O_2$ for a positive electrode active material and the use of graphite for a negative electrode active material. Three of the lithium ion storage batteries 12a1 were connected in series, thereby fabricating a power storage module 12b1. Lithium ion storage batteries 12a2 with A/C ratio=1.2 and capacity of 5.5 Ah were prepared with the use of $Li[Ni_{0.50}Mn_{1.50}]O_4$ for a positive electrode active material and the use of graphite for a negative electrode active material. Three of the lithium ion storage batteries 12a2 were connected in series, thereby fabricating a power storage module 12b2. As shown in FIG. 73, a second power storage pack 12 was fabricated by connecting the power storage module 12b1 and the power storage module 12b2 in parallel and connecting a switch that was turned ON when the voltage of the power storage module 12b1 was 12.3 V or lower and turned OFF when the voltage was higher than 12.3 V. In the same way as in Example 1 except for the foregoing, a power storage system 1 was fabricated. FIG. 74 shows therein a charge/discharge curve for the second power storage pack 12, and FIG. 75 shows therein a dQ/dV curve therefor.

As can be seen from the results of Examples 29 to 30, a step can be formed in a charge/discharge curve by placing a switch that is turned ON/OFF at a certain voltage in the second power storage pack 12. In addition, the provision of the switch can prevent the power storage module which is lower in charge/discharge voltage from being overcharged, and prevent the power storage module which is higher in charge/discharge voltage from being overdischarged. For this reason, a nickel-metal-hydride storage battery and a lithium ion storage battery which has low resistance to overcharge can be used for the second power storage pack 12. Accordingly, the second power storage pack 12 can prevent the voltage of the first power storage pack 11 from entering the overcharge region or the overdischarge region.

TABLE 1

| | First power storage pack 11 | | | | Second power storage pack 12 | | | | |
|---|---|---|---|---|---|---|---|---|---|
| | Configuration | | | | Configuration | | | | |
| | | | | | Power storage pack | | | | |
| | Type of power storage device | Capacity (Ah) | Number of series | OCV AT SOC OF 50% (V) | Power storage module Power storage device | Type of power storage device | Positive electrode active material of lithium ion storage battery | Negative electrode active material of lithium ion storage battery | A/C RATIO |
| Example 1 | Lead storage battery | 50 | 6 | 12.3 | Second power storage pack 12 | Lithium ion storage battery | $Li[Ni_{0.25}Mn_{2.75}]O_4$ | Graphite | 1.2 |

TABLE 1-continued

| | | | | | | | | | |
|---|---|---|---|---|---|---|---|---|---|
| Example 2 | Lead storage battery | 50 | 6 | 12.3 | Second power storage pack 12 | Lithium ion storage battery | Li[Ni$_{0.05}$Mn$_{1.25}$]O$_4$ | Graphite | 1.2 |
| Example 3 | Lead storage battery | 50 | 6 | 12.3 | Second power storage pack 12 | Lithium ion storage battery | Li[Ni$_{0.15}$Mn$_{1.85}$]O$_4$ | Graphite | 1.2 |
| Example 4 | Lead storage battery | 50 | 6 | 12.3 | Second power storage pack 12 | Lithium ion storage battery | Li[Ni$_{0.35}$Mn$_{1.55}$]O$_4$ | Graphite | 1.2 |
| Example 5 | Lead storage battery | 50 | 6 | 12.3 | Second power storage pack 12 | Lithium ion storage battery | Li[Ni$_{0.45}$Mn$_{1.55}$]O$_4$ | Graphite | 1.2 |
| Reference Example 1 | Lead storage battery | 50 | 6 | 12.3 | Second power storage pack 12 | Lithium ion storage battery | LiMn$_2$O$_4$ | Graphite | 1.2 |
| Reference Example 2 | Lead storage battery | 50 | 6 | 12.3 | Second power storage pack 12 | Lithium ion storage battery | Li[Ni$_{0.50}$Mn$_{1.50}$]O$_4$ | Graphite | 1.2 |
| Example 6 | Lead storage battery | 50 | 6 | 12.3 | Second power storage pack 12 | Lithium ion storage battery | Li[Ni$_{0.25}$Mn$_{1.75}$]O$_4$ | Hard carbon | 1.2 |
| Example 7 | Lead storage battery | 50 | 6 | 12.3 | Second power storage pack 12 | Lithium ion storage battery | Li[Ni$_{0.25}$Mn$_{1.75}$]O$_4$ | Soft carbon | 1.2 |
| Example 8 | Lead storage battery | 50 | 6 | 12.3 | Second power storage pack 12 | Lithium ion storage battery | Li[Ni$_{0.25}$Mn$_{1.75}$]O$_4$ | Si | 2.0 |
| Example 9 | Lead storage battery | 50 | 6 | 12.3 | Second power storage pack 12 | Lithium ion storage battery | Li[Ni$_{0.25}$Mn$_{1.75}$]O$_4$ | SnO$_2$ | 1.5 |
| Example 10 | Lead storage battery | 50 | 6 | 12.3 | Second power storage pack 12 | Lithium ion storage battery | LiMn$_2$O$_4$:Li[Ni$_{0.50}$Mn$_{1.50}$]O$_4$ = 40:60 (Ratio by weight) | Graphite | 1.2 |
| Example 11 | Lead storage battery | 50 | 6 | 12.3 | Second power storage pack 12 | Lithium ion storage battery | LiFePO$_4$:LiNi$_{1/3}$Co$_{1/3}$Mn$_{1/3}$O$_2$ = 35:65 (Ratio by weight) | Si | 3.0 |
| Example 12 | Lead storage battery | 50 | 6 | 12.3 | Second power storage pack 12 | Lithium ion storage battery | LiFePO$_4$:LiNi$_{1/3}$Co$_{1/3}$Mn$_{1/3}$O$_2$ = 50:50 (Ratio by weight) | Li$_4$Ti$_5$O$_{12}$ | 1.2 |
| Example 13 | Lead storage battery | 50 | 6 | 12.3 | Power storage module 12b1 | Lithium ion storage battery | LiMn$_2$O$_4$ | Graphite | 1.2 |
| | | | | | Power storage module 12b2 | Lithium ion storage battery | Li[Ni$_{0.50}$Mn$_{1.50}$]O$_4$ | Graphite | 1.2 |
| Example 14 | Lead storage battery | 50 | 6 | 12.3 | Power storage module 12b1 | Lithium ion storage battery | LiFePO$_4$ | Li$_4$Ti$_5$O$_{12}$ | 1.2 |
| | | | | | Power storage module 12b2 | Lithium ion storage battery | LiFePO$_4$ | Li$_4$Ti$_5$O$_{12}$ | 1.2 |
| Example 15 | Lead storage battery | 50 | 6 | 12.3 | Lithium ion storage battery 12a1 | Lithium ion storage battery | LiFePO$_4$ | Graphite | 1.2 |
| | | | | | Lithium ion storage battery 12a2 | Lithium ion storage battery | LiMn$_2$O$_4$ | Li$_4$Ti$_5$O$_4$ | 1.2 |

TABLE 1-continued

| | | | | | | | | | | |
|---|---|---|---|---|---|---|---|---|---|---|
| Example 16 | Lead storage battery | 50 | 6 | 12.3 | Lithium ion storage battery12a1 | Lithium ion storage battery | LiFePO$_4$ | | Li$_4$Ti$_5$O$_{12}$ | 1.2 |
| | | | | | Lithium ion storage battery12a2 | Lithium ion storage battery | LiFePO$_4$ | | Li$_4$Ti$_5$O$_{12}$ | 1.2 |
| Example 17 | Lead storage battery | 50 | 6 | 12.3 | Lithium ion storage battery12a1 | Lithium ion storage battery | LiFePO$_4$ | | Graphite | 1.2 |
| | | | | | Lithium ion storage battery12a2 | Lithium ion storage battery | LiMn$_2$O$_4$ | | Li$_4$Ti$_5$O$_{12}$ | 1.2 |

| | Second power storage pack 12 | | | | | | | | | |
|---|---|---|---|---|---|---|---|---|---|---|
| | Configuration | | Start point of step | | End point of step | | Lower SOC side of start point of step | | Higher SOC side of end point of step | |
| | | | | | | | Average discharge voltage (V) | Peak top voltage of dQ/dV curve (V) | Average charge voltage (V) | Peak top voltage of dQ/dV curve (V) |
| | Capacity (Ah) | Number of series | SOC (%) | Voltage (V) | SOC (%) | Voltage (V) | | | | |

| | Capacity (Ah) | Number of series | SOC (%) | Voltage (V) | SOC (%) | Voltage (V) | Average discharge voltage (V) | Peak top voltage of dQ/dV curve (V) | Average charge voltage (V) | Peak top voltage of dQ/dV curve (V) | Capacity ratio Lower SOC side of start point of step | Capacity ratio Higher SOC side of end point of step |
|---|---|---|---|---|---|---|---|---|---|---|---|---|
| Example 1 | 10 | 3 | 50 | 12.1 | 53 | 13.8 | 11.2 | 11.9 | 14.1 | 14.2 | 52 | 48 |
| Example 2 | 10 | 3 | 85 | 12.2 | 89 | 14.0 | 11.4 | 11.9 | 14.1 | 14.1 | 89 | 11 |
| Example 3 | 10 | 3 | 70 | 12.2 | 72 | 13.9 | 11.3 | 11.9 | 14.1 | 14.1 | 72 | 28 |
| Example 4 | 10 | 3 | 32 | 12.0 | 35 | 13.8 | 10.9 | 11.7 | 14.1 | 14.2 | 33 | 87 |
| Example 5 | 10 | 3 | 13 | 11.8 | 16 | 13.6 | 10.3 | 11.7 | 14.1 | 14.2 | 14 | 86 |
| Reference Example 1 | 10 | 3 | No step in range of SOC of 5% to 95% | | | | | | | | | |
| Reference Example 2 | 10 | 3 | No step in range of SOC of 5% to 95% | | | | | | | | | |
| Example 6 | 10 | 3 | 48 | 11.2 | 54 | 13.2 | 9.6 | 10.9 | 13.8 | 14.0 | 51 | 49 |
| Example 7 | 10 | 3 | 48 | 11.3 | 54 | 13.3 | 9.7 | 11.0 | 13.8 | 14.0 | 51 | 49 |
| Example 8 | 10 | 3 | 50 | 11.2 | 54 | 13.4 | 10.2 | 10.9 | 13.6 | 13.5 | 52 | 48 |
| Example 9 | 10 | 3 | 50 | 10.8 | 53 | 13.1 | 9.8 | 12.4 | 13.5 | 13.3 | 52 | 48 |
| Example 10 | 10 | 3 | 41 | 12.1 | 44 | 13.8 | 11.1 | 11.9 | 14.1 | 14.2 | 42 | 58 |
| Example 11 | 10 | 4 | 34 | 11.4 | 36 | 13.5 | 10.6 | 11.3 | 14.4 | 13.7 | 35 | 65 |
| Example 12 | 10 | 6 | 49 | 11.0 | 50 | 13.0 | 10.4 | 11.0 | 14.0 | 13.1 | 49 | 51 |
| Example 13 | 4 / 6 | 3 / 3 | 41 | 12.1 | 44 | 13.8 | 11.1 | 11.9 | 14.1 | 14.2 | 42 | 58 |
| Example 14 | 5 / 5 | 6 / 7 | 50 | 11.0 | 53 | 13.4 | 10.4 | 11.0 | 13.5 | 13.5 | 52 | 48 |
| Example 15 | 5 / 5 | — / — | 50 | 11.9 | 54 | 13.8 | 11.1 | 11.7 | 14.5 | 14.7 | 52 | 48 |
| Example 16 | 10 / 5 | — / — | 50 | 11.0 | 53 | 13.4 | 10.4 | 11.0 | 13.5 | 13.5 | 52 | 48 |
| Example 17 | 10 / 5 | — / — | 50 | 11.9 | 54 | 13.8 | 11.1 | 11.7 | 14.5 | 14.7 | 52 | 48 |

TABLE 2

| [2] | First power storage pack 11 Configuration | | | | Second power storage pack 12 Configuration | | | | | |
|---|---|---|---|---|---|---|---|---|---|---|
| | Type of power storage device | Capacity (Ah) | Number of series | OCV AT SOC OF 50% (V) | Power storage module Power storage device | Type of power storage device | Positive electrode active material of lithium ion storage battery | Negative electrode active material of lithium ion storage battery | A/C RATIO |
| Reference Example 3 | Lead storage battery | 50 | 6 | 12.3 | Second power storage pack 12 | Lithium ion storage battery | LiFePO$_4$:Li[Ni$_{0.50}$Mn$_{1.50}$]O$_4$ = 50:50 (Ratio by weight) | Hard carbon | 1.5 |

TABLE 2-continued

| | | | | | | | | | |
|---|---|---|---|---|---|---|---|---|---|
| Reference Example 4 | Lead storage battery | 50 | 6 | 12.3 | Second power storage pack 12 | Lithium ion storage battery | $Li_3V_2(PO_4)_3$ | Graphite | 1.2 |
| Reference Example 5 | Lead storage battery | 50 | 6 | 12.3 | Second power storage pack 12 | Lithium ion storage battery | $Li_3V_2(PO_4)_3$ | Graphite | 1.2 |
| Reference Example 6 | Lead storage battery | 50 | 6 | 12.3 | Second power storage pack 12 | Lithium ion storage battery | $LiFePO_4:LiMn_2O_4 =$ 50:50 (Ratio by weight) | $Li_4Ti_5O_{12}$ | 1.2 |
| Reference Example 7 | Lead storage battery | 50 | 6 | 12.3 | Second power storage pack 12 | Lithium ion storage battery | $LiNi_{1/3}Co_{1/3}Mn_{1/3}O_2$ | Graphite:$Li_4Ti_5O_{12} =$ 40:60 (ratio by weight) | 1.2 |
| Example 18 | Lead storage battery | 100 | 12 | 24.6 | Second power storage pack 12 | Lithium ion storage battery | $Li[Ni_{0.25}Mn_{1.75}]O_4$ | Graphite | 1.2 |
| Example 19 | Lead storage battery | 300 | 24 | 49.2 | Second power storage pack 12 | Lithium ion storage battery | $Li[Ni_{0.25}Mn_{1.75}]O_4$ | Graphite | 1.2 |
| Example 20 | Lead storage battery | 1000 | 180 | 369 | Second power storage pack 12 | Lithium ion storage battery | $Li[Ni_{0.25}Mn_{1.75}]O_4$ | Graphite | 1.2 |
| Example 21 | Lead storage battery | 2000 | 750 | 1538 | Second power storage pack 12 | Lithium ion storage battery | $Li[Ni_{0.25}Mn_{1.75}]O_4$ | Graphite | 1.2 |
| Example 22 | Lead storage battery | 50 | 6 | 12.3 | Second power storage pack 12 | Lithium ion storage battery | $Li[Ni_{0.25}Mn_{1.75}]O_4$ | Graphite | 1.2 |
| Example 23 | Lead storage battery | 50 | 6 | 12.3 | Second power storage pack 12 | Lithium ion storage battery | $Li[Ni_{0.25}Mn_{1.75}]O_4$ | Graphite | 1.2 |
| Example 24 | Lead storage battery | 50 | 6 | 12.3 | Second power storage pack 12 | Lithium ion storage battery | $Li[Ni_{0.25}Mn_{1.75}]O_4$ | Graphite | 1.2 |
| Example 25 | Lead storage battery | 50 | 6 | 12.3 | Second power storage pack 12 | Lithium ion storage battery | $Li[Ni_{0.25}Mn_{1.75}]O_4$ | Graphite | 1.2 |
| Example 26 | Lead storage battery | 50 | 6 | 12.3 | Second power storage pack 12 | Lithium ion storage battery | $Li[Ni_{0.25}Mn_{1.75}]O_4$ | Graphite | 1.2 |
| Example 27 | Nickel-metal-hydride storage battery | 50 | 10 | 13.0 | Second power storage pack 12 | Lithium ion storage battery | $Li[Ni_{0.25}Mn_{1.75}]O_4$ | Graphite | 1.2 |
| Example 28 | Lithium ion storage battery | 50 | 3 | 11.4 | Power storage module 12b1 | Lithium ion storage battery | $LiFePO_4$ | $Li_4Ti_5O_{12}$ | 1.2 |
| | | | | | Power storage module 12b2 | Lithium ion storage battery | $LiFePO_4$ | $Li_4Ti_5O_{12}$ | 1.2 |
| Example 29 | Lead storage battery | 50 | 6 | 12.3 | Power storage module 12b1 | Nickel-metal-hydride storage battery | — | — | 1.1 |
| | | | | | Power storage module 12b2 | Nickel-metal-hydride storage battery | — | — | 1.1 |

TABLE 2-continued

| | | | | | | | | | | |
|---|---|---|---|---|---|---|---|---|---|---|
| Example 30 | Lead storage battery | 50 | 6 | 12.3 | Power storage module 12b1 | Lithium ion storage battery | $LiNi_{0.30}Co_{0.15}Al_{0.05}O_2$ | | Graphite | 1.2 |
| | | | | | Power storage module 12b2 | Lithium ion storage battery | $Li[Ni_{0.50}Mn_{1.50}]O_4$ | | Graphite | 1.2 |

| | Second power storage pack 12 | | | | | | | | | |
|---|---|---|---|---|---|---|---|---|---|---|
| | Configuration | | Start point of step | | End point of step | | Lower SOC side of start point of step | | Higher SOC side of end point of step | | Capacity ratio | |
| | | | | | | | | Peak top | | Peak top | | |
| | | | | | | | Average discharge voltage (V) | voltage of dQ/dV curve (V) | Average charge voltage (V) | voltage of dQ/dV curve (V) | Lower SOC side of start point of step | Higher SOC side of end point of step |
| [2] | Capacity (Ah) | Number of series | SOC (%) | Voltage (V) | SOC (%) | Voltage (V) | | | | | | |
| Reference Example 3 | 10 | 3 | 48 | 8.6 | 54 | 13.0 | 7.4 | 6.5 | 13.5 | 13.8 | 51 | 49 |
| Reference Example 4 | 10 | 3 | 48 | 10.5 | 51 | 11.9 | 9.9 | 11.7 | 12.1 | 12.1 | 50 | 50 |
| Reference Example 5 | 10 | 4 | 48 | 14.1 | 51 | 15.9 | 13.2 | 14.3 | 16.1 | 15.6 | 50 | 50 |
| Reference Example 6 | 10 | 6 | 49 | 11.0 | 53 | 14.5 | 10.4 | 11.0 | 15.4 | 15.7 | 51 | 49 |
| Reference Example 7 | 10 | 4 | 56 | 9.0 | 70 | 14.9 | 8.3 | 8.7 | 15.8 | 15.8 | 65 | 35 |
| Example 18 | 20 | 6 | 50 | 24.2 | 53 | 27.7 | 22.4 | 23.8 | 28.2 | 28.3 | 52 | 48 |
| Example 19 | 50 | 12 | 50 | 48.5 | 53 | 55.3 | 44.7 | 47.6 | 56.3 | 56.6 | 52 | 48 |
| Example 20 | 100 | 86 | 50 | 347.5 | 53 | 396.7 | 320.7 | 341.1 | 403.8 | 405.6 | 52 | 48 |
| Example 21 | 200 | 345 | 50 | 1394 | 53 | 1591 | 1287 | 1369 | 1620 | 1627 | 52 | 48 |
| Example 22 | 0.5 | 3 | 50 | 12.1 | 53 | 13.8 | 11.2 | 11.9 | 14.1 | 14.2 | 52 | 48 |
| Example 23 | 1 | 3 | 50 | 12.1 | 53 | 13.8 | 11.2 | 11.9 | 14.1 | 14.2 | 52 | 48 |
| Example 24 | 5 | 3 | 50 | 12.1 | 53 | 13.8 | 11.2 | 11.9 | 14.1 | 14.2 | 52 | 48 |
| Example 25 | 20 | 3 | 50 | 12.1 | 53 | 13.8 | 11.2 | 11.9 | 14.1 | 14.2 | 52 | 48 |
| Example 26 | 45 | 3 | 50 | 12.1 | 53 | 13.8 | 11.2 | 11.9 | 14.1 | 14.2 | 52 | 48 |
| Example 27 | 10 | 3 | 50 | 12.1 | 53 | 13.8 | 11.2 | 11.9 | 14.1 | 14.2 | 52 | 48 |
| Example 28 | 5 5 | 6 7 | 50 | 11.0 | 53 | 13.4 | 10.4 | 11.0 | 13.5 | 13.5 | 52 | 48 |
| Example 29 | 5 5 | 8 10 | 47 | 10.8 | 52 | 12.9 | 10.0 | 10.4 | 13.9 | 13.9 | 49 | 51 |
| Example 30 | 4.5 5.5 | 3 3 | 47 | 12.0 | 48 | 13.7 | 10.2 | 10.1 | 14.1 | 14.2 | 47 | 53 |

DESCRIPTION OF REFERENCE SYMBOLS

1: power storage system
2: vehicle
11: first power storage pack
12: second power storage pack
13: electric load
14: recharger

The invention claimed is:

1. A power storage system comprising:
a first power storage pack; and
a second power storage pack connected in parallel to the first power storage pack,
wherein
a charge/discharge curve for the second power storage pack has a step passing through an open-circuit voltage of the first power storage pack at a SOC of 50%,
an average discharge voltage on a lower SOC side of a start point of the step of the charge/discharge curve for the second power storage pack is −25% or more of the open-circuit voltage of the first power storage pack at the SOC of 50%, and
an average charge voltage on a higher SOC side of an end point of the step of the charge/discharge curve for the second power storage pack is +25% or less of the open-circuit voltage of the first power storage pack at the SOC of 50%,
where the start point of the step is equal to or lower than the open-circuit voltage of the first power storage pack at the SOC of 50%, and the end point of the step is equal to or higher than the open-circuit voltage of the first power storage pack at the SOC of 50%.

2. The power storage system according to claim 1, wherein
the average discharge voltage on the lower SOC side of the start point of the step of the charge/discharge curve for the second power storage pack is −2% or less of the open-circuit voltage of the first power storage pack at the SOC of 50%, and
the average charge voltage on the higher SOC side of the end point of the step of the charge/discharge curve for the second power storage pack is +2% or more of the open-circuit voltage of the first power storage pack at the SOC of 50%.

3. The power storage system according to claim 1, wherein the first power storage pack is a lead storage battery pack.

4. The power storage system according to claim 1, wherein the second power storage pack is a lithium ion storage battery pack or a nickel-metal-hydride storage battery pack.

5. The power storage system according to claim 4, wherein
the second power storage pack is a lithium ion storage battery pack comprising a lithium ion storage battery, and
a positive electrode of the lithium ion storage battery includes a positive electrode active material selected from at least one of Li[Ni$_x$Mn$_{(2-x)}$]O$_4$ (0.05≤x≤0.45), Li[Co$_x$Mn$_{(2-x)}$]O$_4$ (0.1≤x≤1), Li[Fe$_x$Mn$_{(2-x)}$]O$_4$ (0.05≤x≤0.45), LiFe$_a$Mn$_b$Co$_c$Ni$_d$PO$_4$ (0≤a≤1, 0≤b≤1, 0≤c≤1, 0≤d≤1, a+b+c+d=1), and Li$_3$V$_2$(PO$_4$)$_3$.

6. The power storage system according to claim 4, wherein the second power storage pack is a lithium ion storage battery pack comprising a lithium ion storage battery, and a positive electrode of the lithium ion storage battery comprises multiple types of positive electrode active materials.

7. The power storage system according to claim 1, wherein
the second power storage pack has a plurality of power storage modules connected in parallel, each of the plurality of power storage modules comprising a plurality of power storage devices connected in series, and
the plurality of power storage modules differ from each other in number of connection stages.

8. The power storage system according to claim 1, wherein a ratio between a first capacity on the lower SOC side of the start point of the step of the charge/discharge curve for the second power storage pack and a second capacity on the higher SOC side of the end point of the step of the charge/discharge curve for the second power storage pack in the second power storage pack falls within a range of 10:90 to 90:10.

9. The power storage system according to claim 1, wherein the first power storage pack has a higher capacity than the second power storage pack.

10. The power storage system according to claim 1, wherein a ratio between a first capacity of the first power storage pack and a second capacity of the second power storage pack falls within a range of 55:45 to 99:1.

11. A power storage system comprising:
a first power storage pack; and
a second power storage pack connected in parallel to the first power storage pack,
wherein
a charge/discharge curve for the second power storage pack has a step passing through an open-circuit voltage of the first power storage pack at a SOC of 50%,
on a lower SOC side of a start point of the step of the charge/discharge curve for the second power storage pack, a first voltage at a peak top obtained by differentiating, with respect to voltage, the discharge curve for the second power storage pack is −25% or more of the open-circuit voltage of the first power storage pack at the SOC of 50%, and
on a higher SOC side of an end point of the step of the charge/discharge curve for the second power storage pack, a second voltage at a peak top obtained by differentiating, with respect to voltage, the charge curve for the second power storage pack is +25% or less of the open-circuit voltage of the first power storage pack at the SOC of 50%,
where the start point of the step is equal to or lower than the open-circuit voltage of the first power storage pack at the SOC of 50%, and the end point of the step is equal to or higher than the open-circuit voltage of the first power storage pack at the SOC of 50%.

12. The power storage system according to claim 11, wherein
on the lower SOC side of the start point of the step of the charge/discharge curve for the second power storage pack, the first voltage is −2% or less of the open-circuit voltage of the first power storage pack at the SOC of 50%, and
on the higher SOC side of the end point of the step of the charge/discharge curve for the second power storage pack, the second voltage is +2% or more of the open-circuit voltage of the first power storage pack at the SOC of 50%.

13. The power storage system according to claim 11, wherein the first power storage pack is a lead storage battery pack.

14. The power storage system according to claim 11, wherein the second power storage pack is a lithium ion storage battery pack or a nickel-metal-hydride storage battery pack.

15. The power storage system according to claim 14, wherein
the second power storage pack is a lithium ion storage battery pack comprising a lithium ion storage battery, and
a positive electrode of the lithium ion storage battery includes a positive electrode active material selected from Li[Ni$_x$Mn$_{(2-x)}$]O$_4$ (0.05≤x≤0.45), Li[Co$_x$Mn$_{(2-x)}$]O$_4$ (0.1≤x≤1), Li[Fe$_x$Mn$_{(2-x)}$]O$_4$ (0.05≤x≤0.45), LiFe$_a$Mn$_b$Co$_c$Ni$_d$PO$_4$ (0≤a≤1, 0≤b≤1, 0≤c≤1, 0≤d≤1, a+b+c+d=1), and Li$_3$V$_2$(PO$_4$)$_3$.

16. The power storage system according to claim 14, wherein the second power storage pack is a lithium ion storage battery pack comprising a lithium ion storage battery, and a positive electrode of the lithium ion storage battery comprises multiple types of positive electrode active materials.

17. The power storage system according to claim 11, wherein
the second power storage pack has a plurality of power storage modules connected in parallel, each of the plurality of power storage modules comprising a plurality of power storage devices connected in series, and
the plurality of power storage modules differ from each other in number of connection stages.

18. The power storage system according to claim 11, wherein a ratio between a first capacity on the lower SOC side of the start point of the step of the charge/discharge curve for the second power storage pack and a second capacity on the higher SOC side of the end point of the step of the charge/discharge curve for the second power storage pack in the second power storage pack falls within a range of 10:90 to 90:10.

19. The power storage system according to claim 11, wherein the first power storage pack has a higher capacity than the second power storage pack.

20. The power storage system according to claim 11, wherein a ratio between a first capacity of the first power storage pack and a second capacity of the second power storage pack falls within a range of 55:45 to 99:1.

* * * * *